April 4, 1944. O. E. PIERSON 2,345,628
MULTICHANNEL TELEGRAPH SYSTEM
Filed Jan. 28, 1942 26 Sheets-Sheet 1

FIG. I

INVENTOR
O. E. PIERSON
BY
ATTORNEY

April 4, 1944.   O. E. PIERSON   2,345,628
MULTICHANNEL TELEGRAPH SYSTEM
Filed Jan. 28, 1942   26 Sheets-Sheet 2

INVENTOR
O. E. PIERSON
BY
ATTORNEY

April 4, 1944.    O. E. PIERSON    2,345,628
MULTICHANNEL TELEGRAPH SYSTEM
Filed Jan. 28, 1942    26 Sheets-Sheet 5

INVENTOR
O. E. PIERSON

April 4, 1944.  O. E. PIERSON  2,345,628
MULTICHANNEL TELEGRAPH SYSTEM
Filed Jan. 28, 1942  26 Sheets-Sheet 8

INVENTOR
O. E. PIERSON
BY
ATTORNEY

April 4, 1944.	O. E. PIERSON	2,345,628
MULTICHANNEL TELEGRAPH SYSTEM
Filed Jan. 28, 1942	26 Sheets-Sheet 21

INVENTOR
O. E. PIERSON
BY
ATTORNEY

April 4, 1944.　　　　O. E. PIERSON　　　　2,345,628
MULTICHANNEL TELEGRAPH SYSTEM
Filed Jan. 28, 1942　　　26 Sheets-Sheet 25

INVENTOR
O. E. PIERSON
BY
ATTORNEY

April 4, 1944.　　　　O. E. PIERSON　　　　2,345,628
MULTICHANNEL TELEGRAPH SYSTEM
Filed Jan. 28, 1942　　　26 Sheets-Sheet 26

INVENTOR
O. E. PIERSON
BY
ATTORNEY

Patented Apr. 4, 1944

2,345,628

UNITED STATES PATENT OFFICE 2,345,628

MULTICHANNEL TELEGRAPH SYSTEM

Oscar E. Pierson, Brooklyn, N. Y., assignor to The Western Union Telegraph Company, New York, N. Y., a corporation of New York Application January 28, 1942, Serial No. 428,607

56 Claims. (Cl. 178—52)

This invention relates to signaling systems and more particularly to expanding channel or varioplex telegraph systems, the present invention relating to an improvement upon the system disclosed and claimed in a copending application of O. E. Pierson, M. D. Adams and W. S. W. Edgar, Jr., Serial No. 308,226, filed December 8, 1939, now Patent No. 2,282,341, granted May 12, 1942.

The term "expanding channel or varioplex system" as used herein refers to a system in which a variable number of telegraph transmitting subchannels share a common lane of traffic, substantially the entire lane time in the preferred system being divided among the operating transmitters or subchannels. The system thus distributes the use of the lane of traffic, which may consist of one or more channels of a synchronous multiplex system, among any busy combination of a number of traffic sources or telegraph transmitters. While the lane of traffic referred to generally comprises a channel or channels of a multiplex system, any equivalent communication system may be utilized, such as one or more radio or carrier channels, or one or more cable conductors or a direct wire, or combinations of different types of communication channels. Hence, the expression "lane of traffic" as used herein designates any suitable route or medium over which signaling is accomplished.

The expanding channel system thus comprises a multichannel system in which the number of subchannels operating over the connecting circuit or lane of traffic may be expanded or contracted by cutting in or out simultaneously transmitting and receiving devices at opposite ends of the system. The present invention is embodied in a printing telegraph system of this character in which message characters are sent from operating transmitters in sequence and printed on the corresponding receiving devices, one busy subchannel being rendered operative after another while omitting the idle or inoperative subchannels.

In the system disclosed in the copending case of Pierson et al referred to and in all other prior systems, each transmitting device and its corresponding receiving device is permanently connected to a subchannel and the equipment associated with a subchannel. Each subchannel is associated with the lane of traffic only when the transmitting and receiving devices are busy. Such systems have been particularly useful in providing each subscriber with the equivalent of a direct communication circuit between the transmitting and receiving apparatus. The successful operation of such systems is predicated on the simultaneous use of the facilities provided by a relatively small number of subscribers. It is then possible to associate a relatively large number of subscribers with such a system and thereby derive the attendant economies of operation.

Such systems have been found to be highly satisfactory, but it also has been found that in order to provide communication facilities for a substantial number of subscribers by means of such a system it is necessary to furnish complete subchannel apparatus for each of the subscribers served by such a system. This apparatus includes a start-stop distributor, a tape reperforator and a tape transmitter. All of these items, particularly the first two, are rather costly instruments and together represent an appreciable proportion of the cost of the subscriber terminal equipment. Experience has shown that any particular unit of this subchannel equipment is actually in use for only a small percentage of the time during which the system is in operation. Accordingly, it is with the view of employing the subchannel apparatus more economically that the system embodying the instant invention has been developed.

One object of the present invention is to provide a multichannel telegraph system in which the subchannel apparatus is utilized to better advantage.

Another object of the invention is to provide a multichannel telegraph system in which the facilities equivalent to a direct wire connection are made available to a greater number of subscribers at a cost which is less per subscriber than that of prior systems.

A further object of the invention is to provide a multichannel telegraph system of the character described which is more flexible than prior systems.

Still another object of the invention is to provide a multichannel telegraph system in which a relatively small number of signal storage and retransmitting devices are made available to a relatively large number of subscribers.

A still further object of the invention is to provide a multichannel telegraph system having switching mechanism to connect any one of a large number of subscribers to any one of a smaller number of subchannels and other switching mechanism to connect each of the busy subchannels to a lane of traffic in such a manner that the transmitting time of the lane is shared substantially equally among the busy subchannels.

An additional object of the invention is to provide a multichannel telegraph system of the character set out in the immediately foregoing object and in which a subscriber's apparatus may be semipermanently connected to a selected one of the subchannels.

Another object of the invention is to provide, in an expanding channel or varioplex system having facilities for connecting automatically any one of a plurality of subscribers' stations to any one of a plurality of subchannels and for switching automatically the subchannels into and out of operative association with a lane of traffic, means for maintaining a connection after the connected subchannel is switched out of association with the lane of traffic and for interrupting such a connection only when the subchannel is needed to serve another subscriber and then only if the previously connected subscriber is idle.

Another object of the invention is to provide, in a varioplex system having means for connecting any of a plurality of subscribers to any of a plurality of subchannels, means for determining the identity of the subchannel to which any one of the subscribers is connected.

Another object of the invention is to provide, in a multichannel telegraph system having facilities whereby subscribers' apparatus is switched automatically into and out of operating association with subchannel apparatus and the subchannel apparatus is switched automatically into and out of operative association with the system, improved means to detect failures of the switching operations.

Another object of the invention is to provide, in a multichannel telegraph system having facilities for connecting and disconnecting subchannels to and from the system, switching failure detecting means including a plurality of common conductors to which the contacts of the switching apparatus are connected so as to form a series circuit through the contacts only if the desired switching operation is performed properly.

Another object of the invention is to provide, in a system of the character described, means responsive to the switching failure detection means outlined in the preceding paragraph to interrupt automatically the operation of the system.

Another object of the invention is to provide, in a varioplex system wherein apparatus units are switched in groups and wherein means are employed to detect switching failures, means for indicating the apparatus group in which such failures occur.

Another object of the invention is to provide, in a varioplex system having switching failure detection means which utilize a plurality of conductors multipled to the switching apparatus to form part of a series circuit, means controlled by the switching apparatus for testing periodically said conductors for electrical isolation from one another and from extraneous potentials.

Another object of the invention is to provide, in a multichannel telegraph system including a plurality of subchannels having receiving and retransmitting apparatus, the latter of which may be associated with a common lane of traffic and the former of which may be connected automatically to the transmitting apparatus of any one of a plurality of subscribers in response to a subscriber's calling signal, novel means for rendering the calling subscriber's transmitting apparatus ineffective until the automatic connection is made.

Another object of the invention is to provide means for stopping automatically all transmission in a multichannel telegraph system in the event that the receiving apparatus of an operative one of a plurality of subchannels is not connected to the receiving apparatus of one of a plurality of subscribers.

Another object of the invention is to provide, in a multichannel telegraph system in which the receiving apparatus of any one of a plurality of subchannels may be connected to the receiving apparatus of any one of a plurality of subscribers under the control of special switching signals transmitted over a lane of traffic, means controlled by regular message signals transmitted over the lane of traffic whereby transmission on all operative subchannels is automatically interrupted in the event that any operative subchannel is not connected to a subscriber's receiving apparatus.

Another object of the invention is to provide, in an expanding channel or a varioplex system wherein the apparatus of any one of a plurality of subchannels may be connected to the apparatus of any one of a plurality of subscribers, novel arrangements for operating a character counter associated with the subscriber apparatus under the control of the apparatus of any one of the subchannels to which it may be connected.

Another object of the invention is to provide novel means for coding switching signals to be transmitted over a lane of traffic to represent arrangements of the transmitting apparatus of a multichannel telegraph system of the varioplex type.

Another object of the invention is to provide novel means for decoding switching signals received over a lane of traffic to control switching apparatus whereby the receiving equipment of a multichannel telegraph system of the varioplex type may be connected in a manner to correspond to the connections of the transmitting equipment.

Other objects and advantages of the invention will appear from the following description of an illustrative embodiment thereof shown in the accompanying drawings, wherein.

Figs. 4 to 16, inclusive, show in detail typical circuit connections of the apparatus at the transmitting end of the system; and Figs. 17 to 27, inclusive, show corresponding typical receiver connections.

Figure 1:
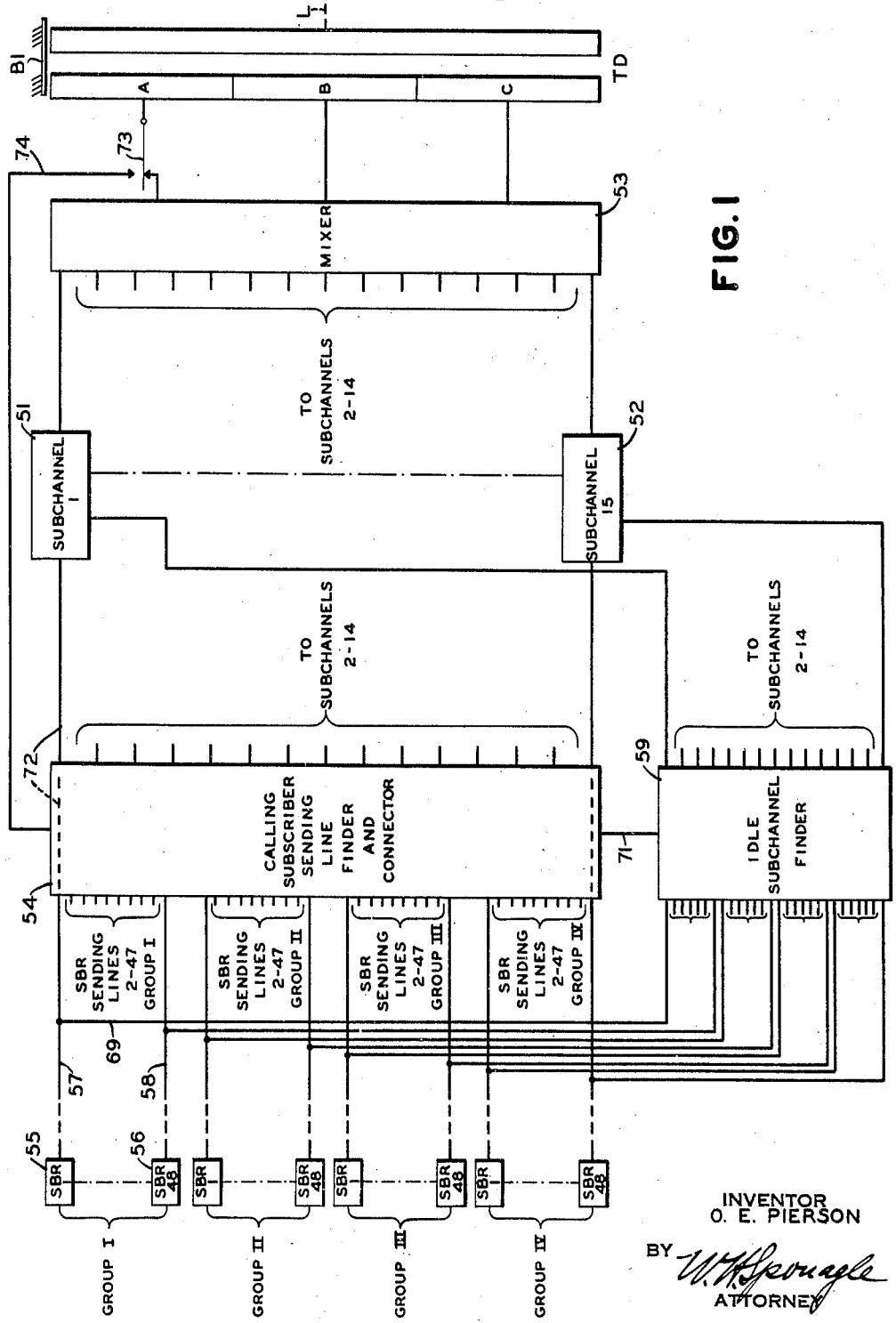
Figs. 1 and 2 illustrate in block diagram form an expanding channel system in accordance with the instant invention.
Figures 2, 3:
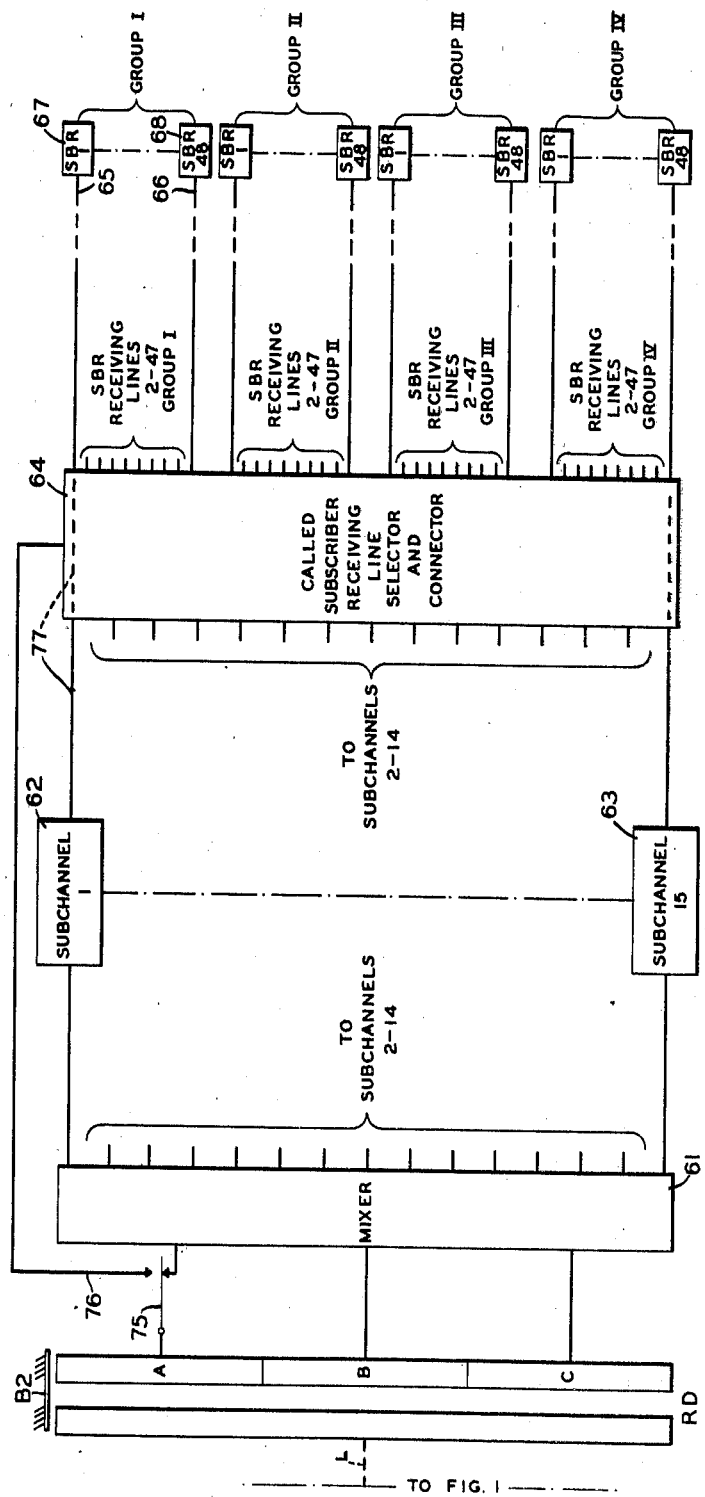
Fig. 3 shows the arrangement of the remaining figures of the drawings to form a complete portion of the system.

Having reference first to Figs. 1 and 2, the general plan of the system may be seen. Three channels of a synchronous multiplex system are used to form the lane of traffic. Such a communication system is illustrated diagrammatically as comprising a transmitting distributor TD which is connected by means of a line wire L to a receiving distributor RD. Each of these distributors is divided into 3 channels A, B and C, and each is traversed by a brush B1, in the case of the transmitting distributor, and B2, in the case of the receiving distributor. The system also comprises 15 subchannels complete with the necessary apparatus for storing and retransmitting signals.

Blocks 51 and 52 represent respectively the apparatus comprising subchannels 1 and 15. Each of these subchannels and any others which may be rendered operative are connected to the multiplex transmitting distributor TD through a mixer 53. This apparatus comprises essentially a chain of relays similar to that disclosed in the copending Pierson et al. case referred to and also in Patent No. 2,233,347, granted on February 25, 1941, to O. E. Pierson and M. D. Adams. The purpose of the mixer is to connect the operative subchannels in sequence to the multiplex subchannels. If no more than 3 subchannels are operative, the mixer serves merely as a means for establishing semipermanent connections between the subchannels and one or more of the multiplex channels. With more than 3 subchannels operative, however, the mixer 53 cycles to connect each of the operative subchannels in turn to one of the multiplex channels.

The input side of each of the 15 subchannels is connected to switching apparatus 54 to which also is connected the sending lines of the subscribers having access to the system. In the present embodiment facilities are provided for connecting any one of 192 subscribers to the expanding channel system. These subscribers are formed into 4 groups of 48 subscribers each. Groups I, II, III and IV each includes subscribers 1 to 48. As will be obvious from the following detailed description of the invention, the number of subscribers in a group is not fixed, and there is nothing inherent in the present system requiring such an arrangement or division of groups and subscribers. The system described is divided into four groups of forty-eight subscribers each for the purpose of illustration, and on review of the description it will be obvious to those skilled in the art that the number of groups and the number of subscribers in a group may be varied. The substation equipment for subscriber 1 of group I is designated by the block 55 and that of subscriber 48 of group I by the block 56. Line wires 57 and 58 connect the subscribers' equipment 55 and 56 respectively, to the switching apparatus 54. Similar connections are made between the apparatus of the other 46 subscribers of this group and the switching apparatus. Similarly, the subscribers' apparatus of groups II, III and IV is connected by suitable line wires to the switching apparatus 54.

Associated with the switching apparatus and the subchannel equipment is auxiliary switching subchannel finder apparatus 59 to which connections from each of the subscriber's lines are made. This auxiliary switching apparatus is also connected to the subchannel apparatus for a purpose to be described.

At the receiving station, the 3 channels A, B and C of the multiplex circuit are connected to a receiving relay chain mixer 61 to which also is connected the receiving subchannel equipment for each of the 15 subchannels. Blocks 62 and 63 represent the apparatus for subchannels 1 and 15, it being understood that similar apparatus is provided for the other 13 subchannels. The subchannel equipment is also connected to switching apparatus 64. There is also connected to this switching apparatus each subscriber's receiving line of which lines 65 and 66 are typical. These lines connect respectively to receive apparatus 67 and 68, the former of which is the apparatus for subscriber 1 of group I, and the latter of which is the receiving apparatus for subscriber 48 of group I.

OPERATION—GENERAL

Without reference to the specific details, the following description covers the general mode of operation of the system. When one of the subscribers desires to transmit, he initiates at his transmitting apparatus a calling signal. Suppose, for example, such a signal is initiated by subscriber 1 of group I. The signal is transmitted over the subscriber's sending line 57 to the central station where it is communicated by means of conductor 69 to the idle subchannel finder apparatus 59. Suitable switching mechanisms forming a part of this apparatus are operated to locate an available subchannel. The system is designed so that, once a subscriber's line is connected to the subchannel apparatus, it remains in connection therewith until the particular subchannel is selected for use with another subscriber's line. As a result of such an arrangement, after the system is placed in operation at the beginning of a business day, for example, the first 15 different subscribers initiating calls are connected in turn to one of the 15 subchannels. Consequently, if the call placed by subscriber 1 of group I is made at a time before all of the available subchannels have been connected to other subscribers' lines, the switching mechanism 59 selects one of the 15 subchannels not already connected to subscribers' lines. However, if such a call is made after 15 other subscribers have made calls, the switching mechanism 59 selects a subchannel which at the time is not busy, even though it is connected to some other subscriber's line. Any such previous connection is then broken, and the subchannel apparatus is prepared for connection with the calling subscriber. The identity of the selected subchannel apparatus is communicated by the switching apparatus 59 to the switching apparatus 54 by a connection represented here as conductor 71.

That portion of the switching apparatus 54 which is associated with the selected subchannel is then operated to find the subscriber's line 57 over which the call is being made. Having found the subscriber's line, this switching apparatus connects it by means of a conductor 72, for example, to the subchannel apparatus 51, it being assumed that subchannel 1 has been selected. Once this connection is established, a signal is sent to the calling subscriber indicating to him that transmission of the message may be started. The message characters are stored in a perforated tape until such time as the subchannel apparatus is connected to the multiplex system.

Having established a connection between the calling subscriber's line and the apparatus of one of the subchannels, it is necessary to effect a similar connection at the receiving station. In order to do this, information must be transmitted over the multiplex circuit from the transmitting station to the receiving station identifying the selected subchannel, the group in which the calling subscriber is located, and finally the identity of the particular subscriber in the designated group. As in the system disclosed in the copending Pierson et al. case to which reference has been made, this information is transmitted over the A channel of the multiplex system, the remaining channels of which continue to operate with the previously connected subchannels, if any. Incidentally, the B channel of the multiplex system also has a part in the switching signaling, as it does in the copending Pierson et al. case, but this will not be considered here. When a switching operation is to be performed, the A multiplex channel at the transmitting station is disconnected from the mixer 53 by a switch 73 and is connected to the switching apparatus 54; the latter connection is made by means of a connection shown here as conductor 74.

Simultaneously, a switch 75 at the receiving station disconnects the receiving end of the A multiplex channel from the receiving mixer 61 and connects it by means of a conductor 76 to the receiving switching apparatus 64. Included in the transmitting switching equipment 54 is coding apparatus by means of which the switching information is translated into a code. The switching apparatus also includes transmitting equipment which sends the coded switching information over the conductor 74 and the A multiplex channel to the receiving station at which this coded information is relayed over conductor 76 to decoding apparatus associated with the receiving switching equipment 64. The decoding apparatus translates the signals into suitable switch operations whereby conductor 77 associated with subchannel 1 is selected and connected through the proper receiving line 65 to the apparatus 67 of subscriber 1 of group I. Following this sequence of operations, switches 73 and 75 are restored to their normal positions, thereby reconnecting the A multiplex channel to the respective mixers 53 and 61.

The subsequent operation of the system is substantially similar to the corresponding operation of the system of the copending Pierson et al. case referred to. Briefly, as soon as a sufficient number of characters has been perforated in the storage tape of subchannel 1, this subchannel is connected to the mixer 53 by means of which it is intermittently connected for the transmission of the stored characters over one of the multiplex channels. At the same time, corresponding connections are made between the receiving mixer 61 and the receiving apparatus 62 of subchannel 1.

After the transmission of signals from the subscriber's station 55 has ceased and all of these characters have been retransmitted by the subchannel apparatus 51 to the receiving end of the system, subchannel 1 transmitting apparatus 51 and receiving apparatus 62 are disconnected from the respective mixers 53 and 61, but as previously indicated, the connections from the subchannel apparatus to the subscriber's transmitting and receiving apparatus are left intact. These connections remain undisturbed until the apparatus of subchannel 1 is required for use with another subscriber. It will be readily seen that, if subscriber 1 of group I again desires to transmit before the connection with the apparatus of subchannel 1 has been broken, it will not be necessary to initiate a new call. Each subscriber is provided with suitable signals to keep him informed as to his status and as long as a subscriber is connected to some subchannel apparatus, he merely starts operating his transmitter keyboard whenever he desires to send in much the same manner as the subscribers of the systems disclosed in the copending Pierson et al. case and the Pierson et al. patent referred to. Consequently, since only the signaling necessary to re-enter a subchannel for operation of the multiplex system is necessary, considerable line time may be saved with such an arrangement.

SENDING APPARATUS—FUNCTIONS

Before proceeding with the detailed description of the operation of the sending end of the system, there will be considered first the functions of the apparatus thereat. It will be assumed that facilities are provided for 192 subscribers divided into 4 groups of 48 subscribers each. Apparatus for a total of 15 subchannels, any one of which is accessible to any one of the 192 subscribers, is also provided. The system is disclosed in connection with a three-channel synchronous multiplex over which any combination of the 15 subchannels may operate. Only enough apparatus to illustrate the principles of the invention is illustrated. Such apparatus includes that necessary to show the operation of subscriber 1 of group I and subscriber 48 of group IV in connection with either subchannel 1 or subchannel 15.

Figure 4:
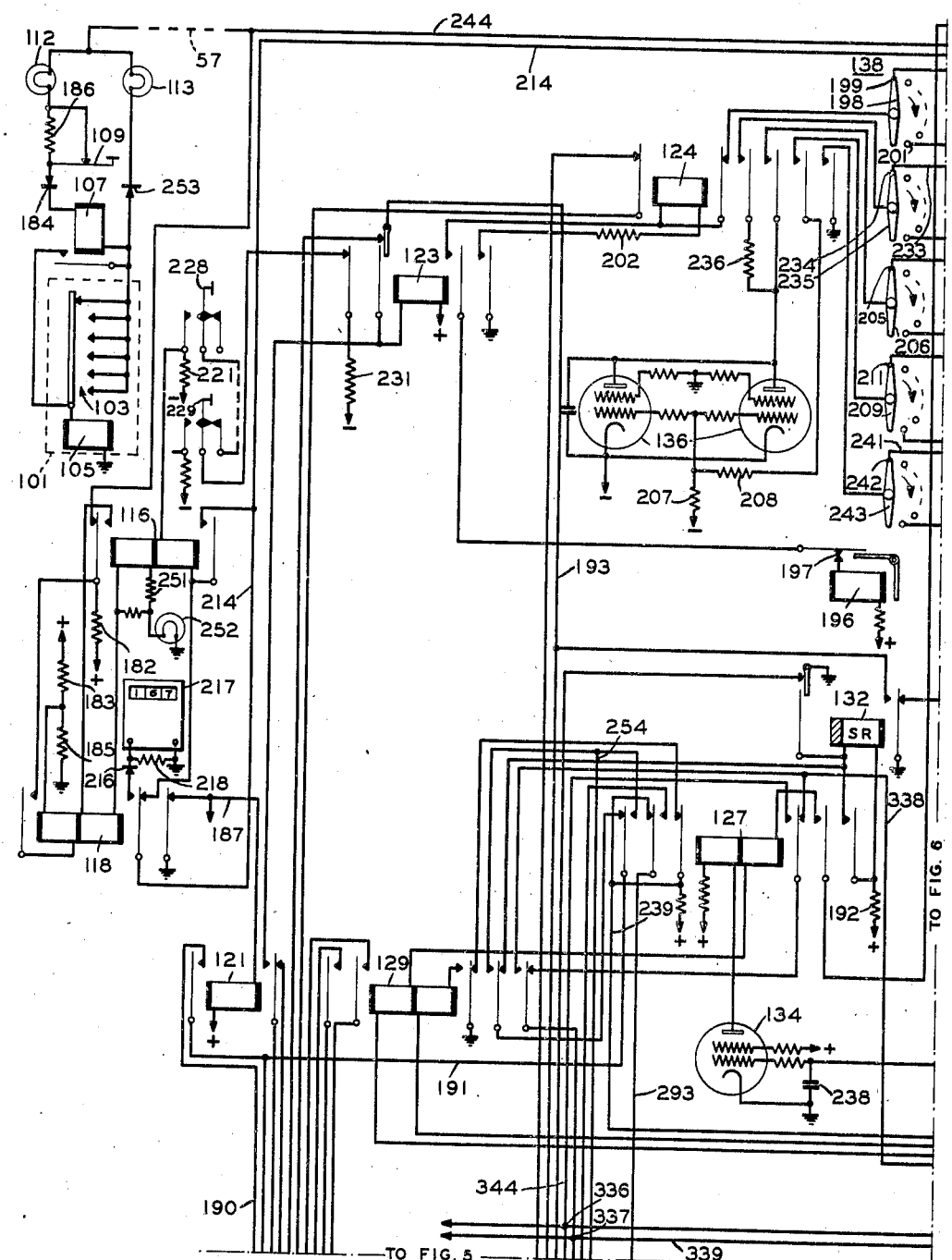
Figure 5:
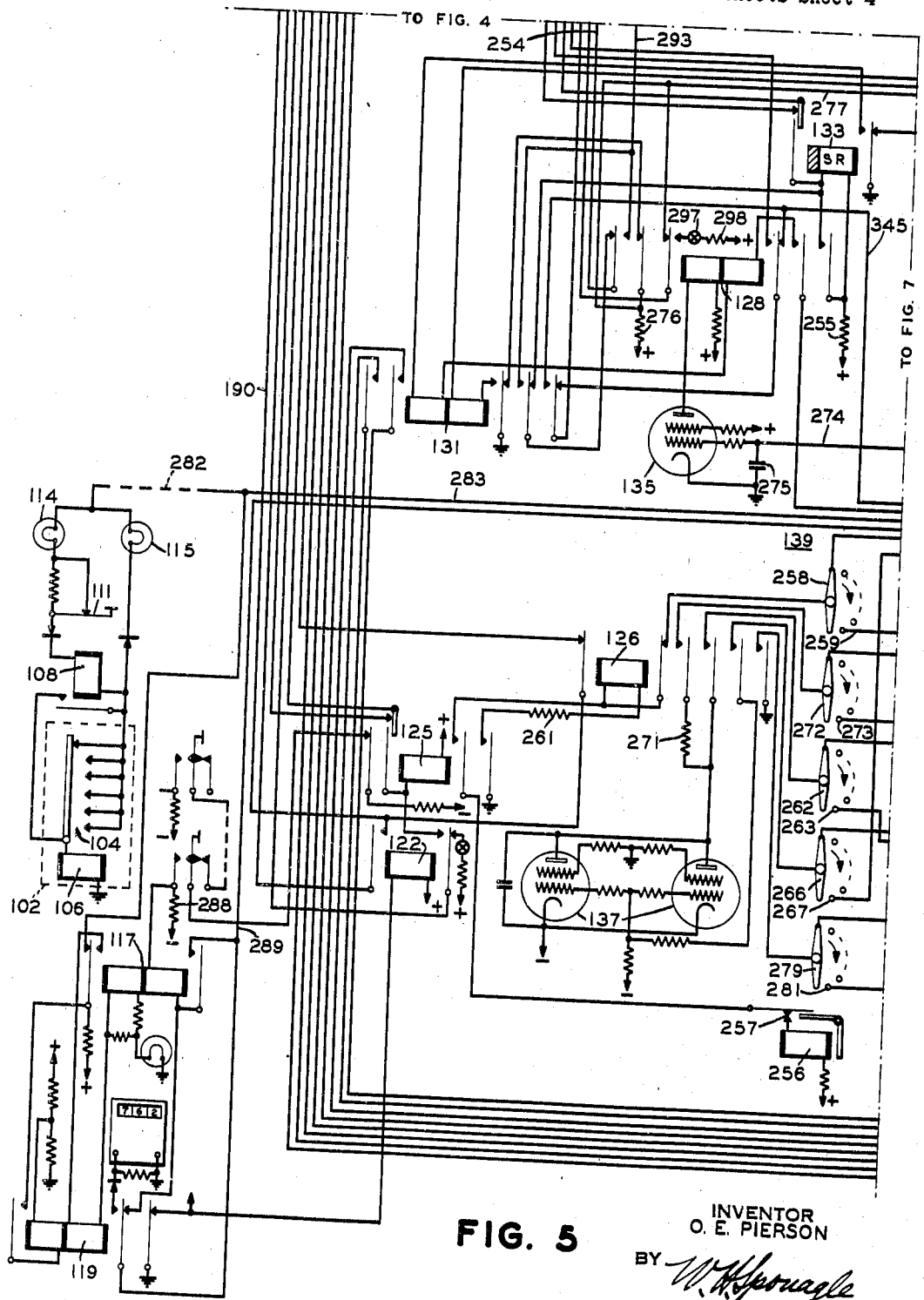
Figure 6:
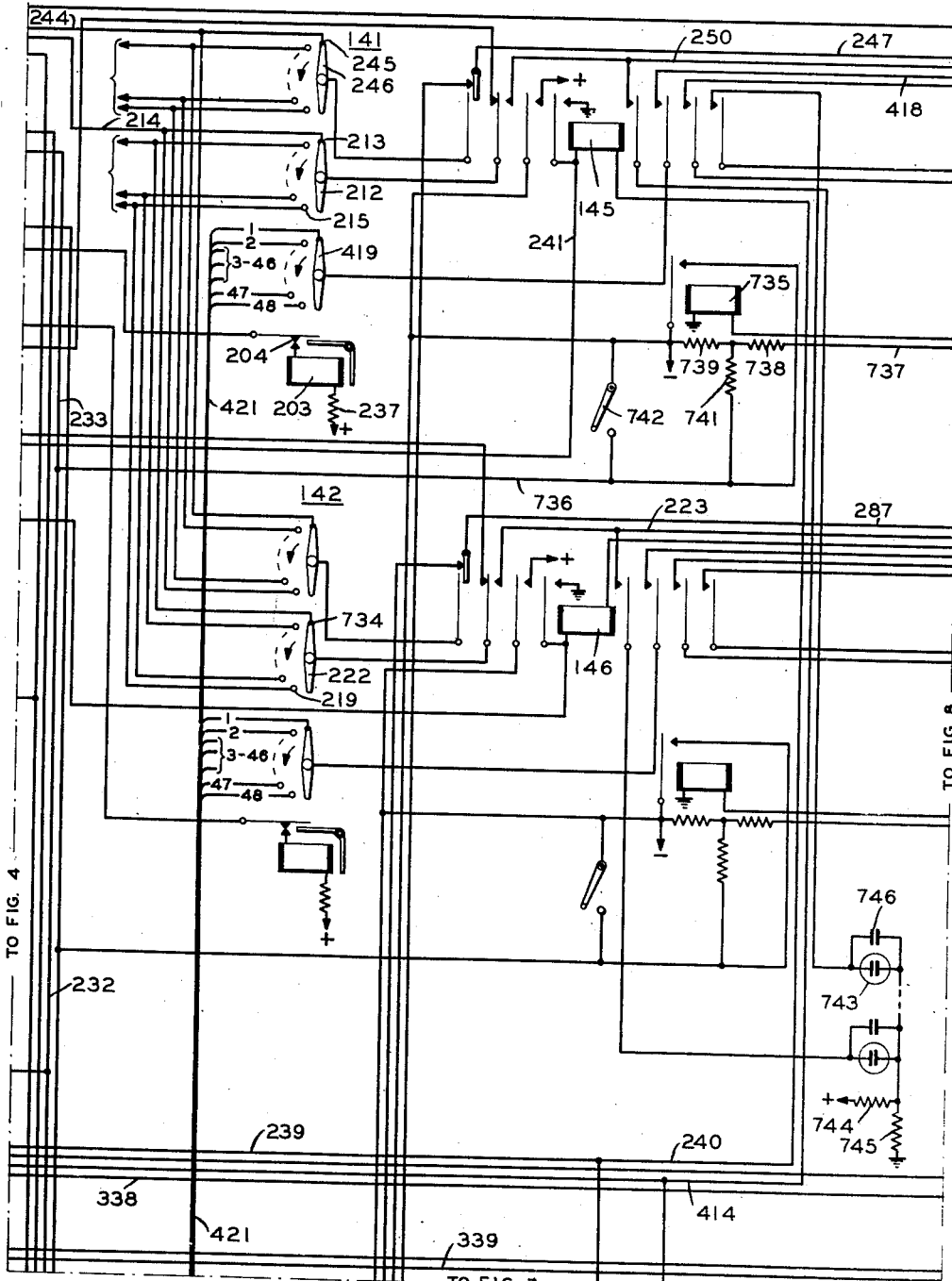
Figure 7:
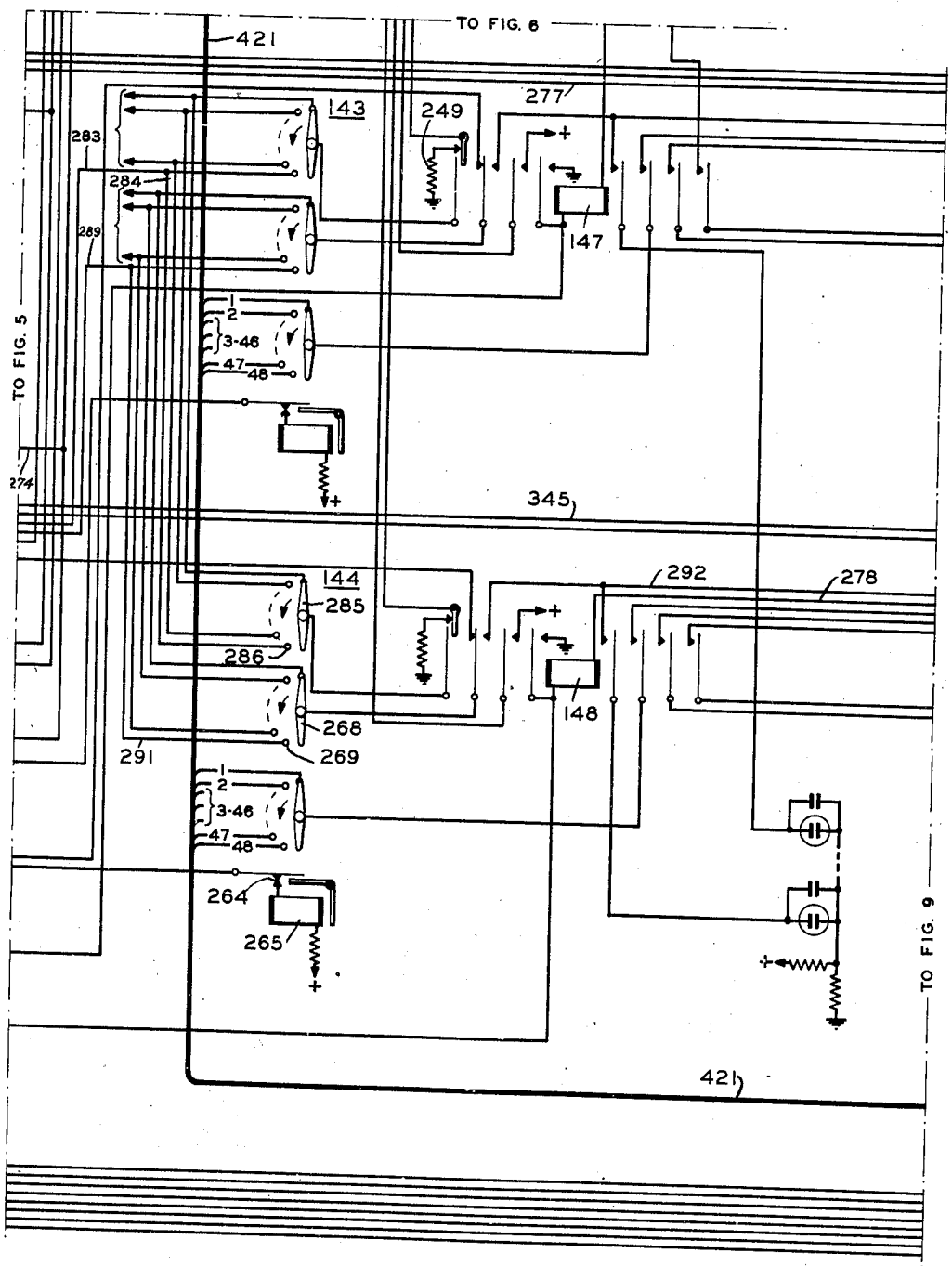
Figure 8:
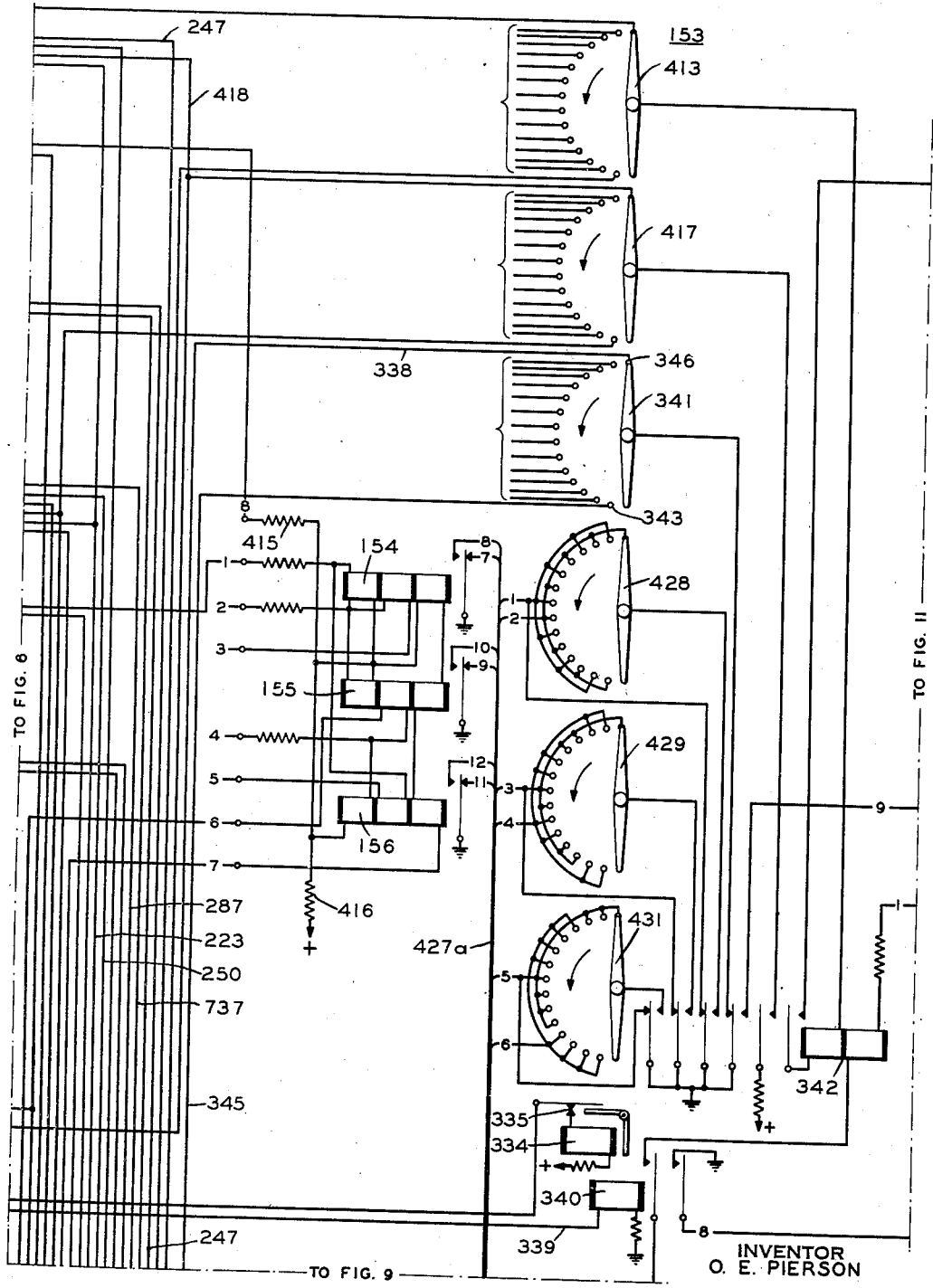
Figure 9:
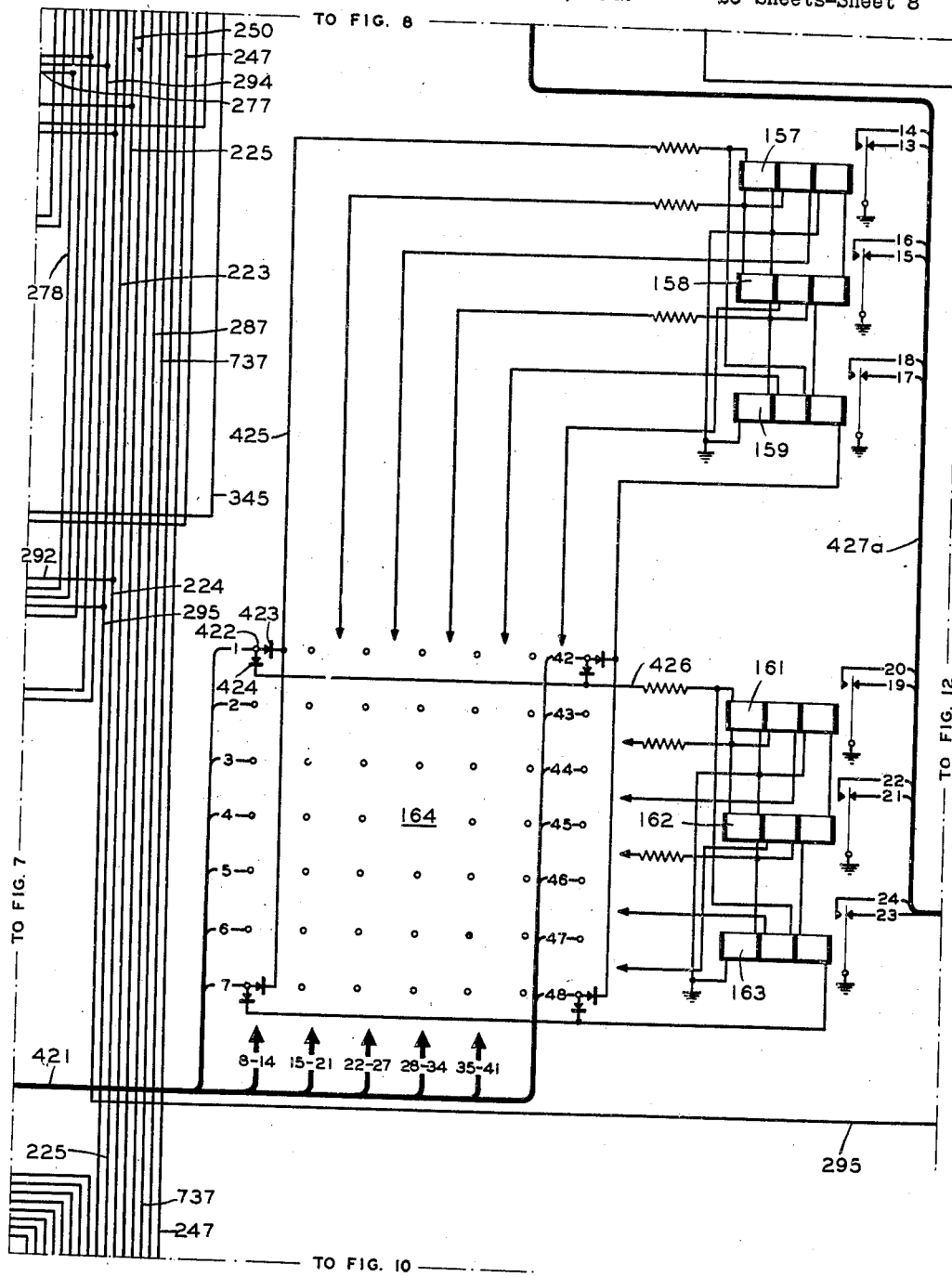
Figure 10:
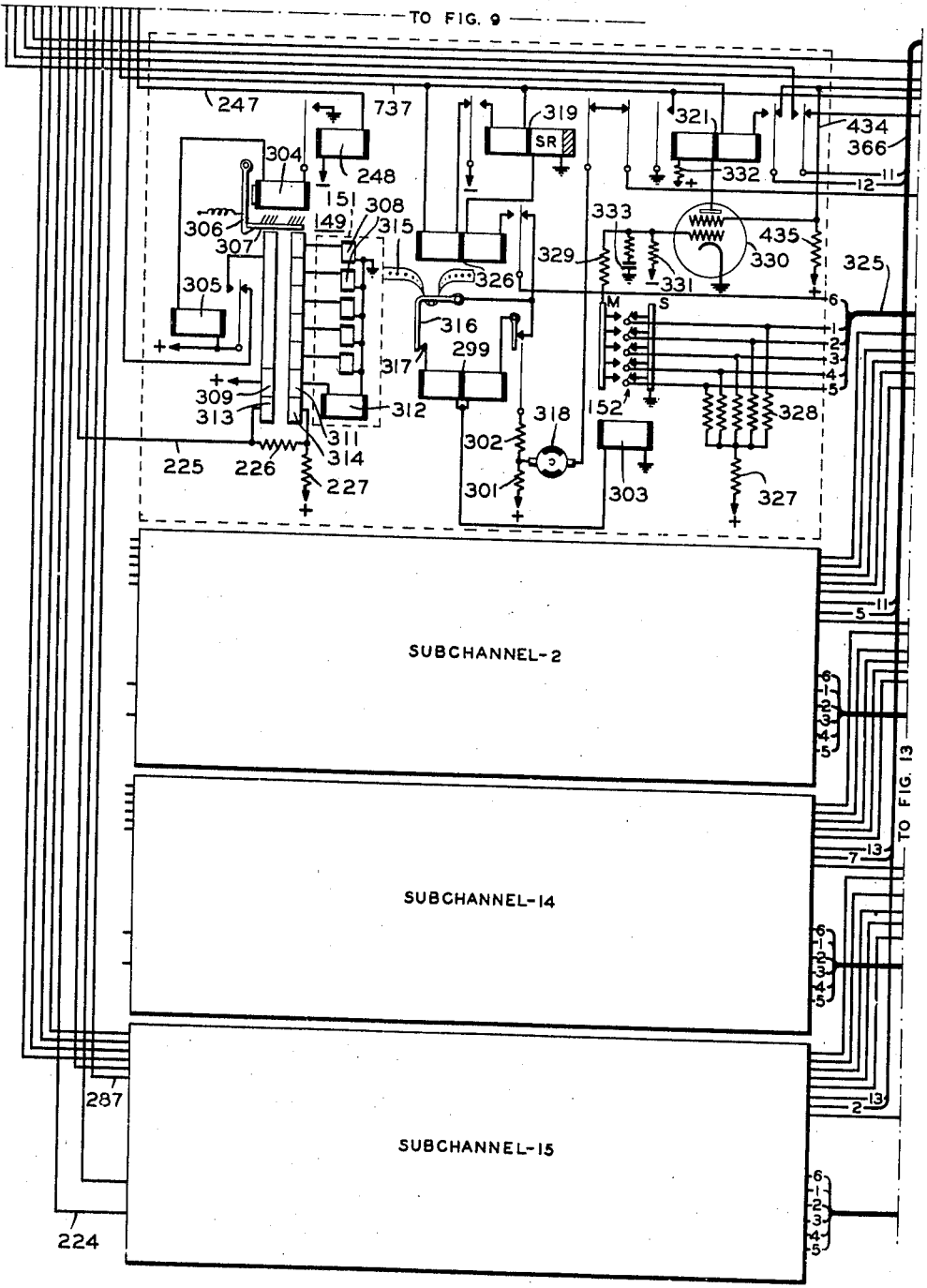
Figure 11:
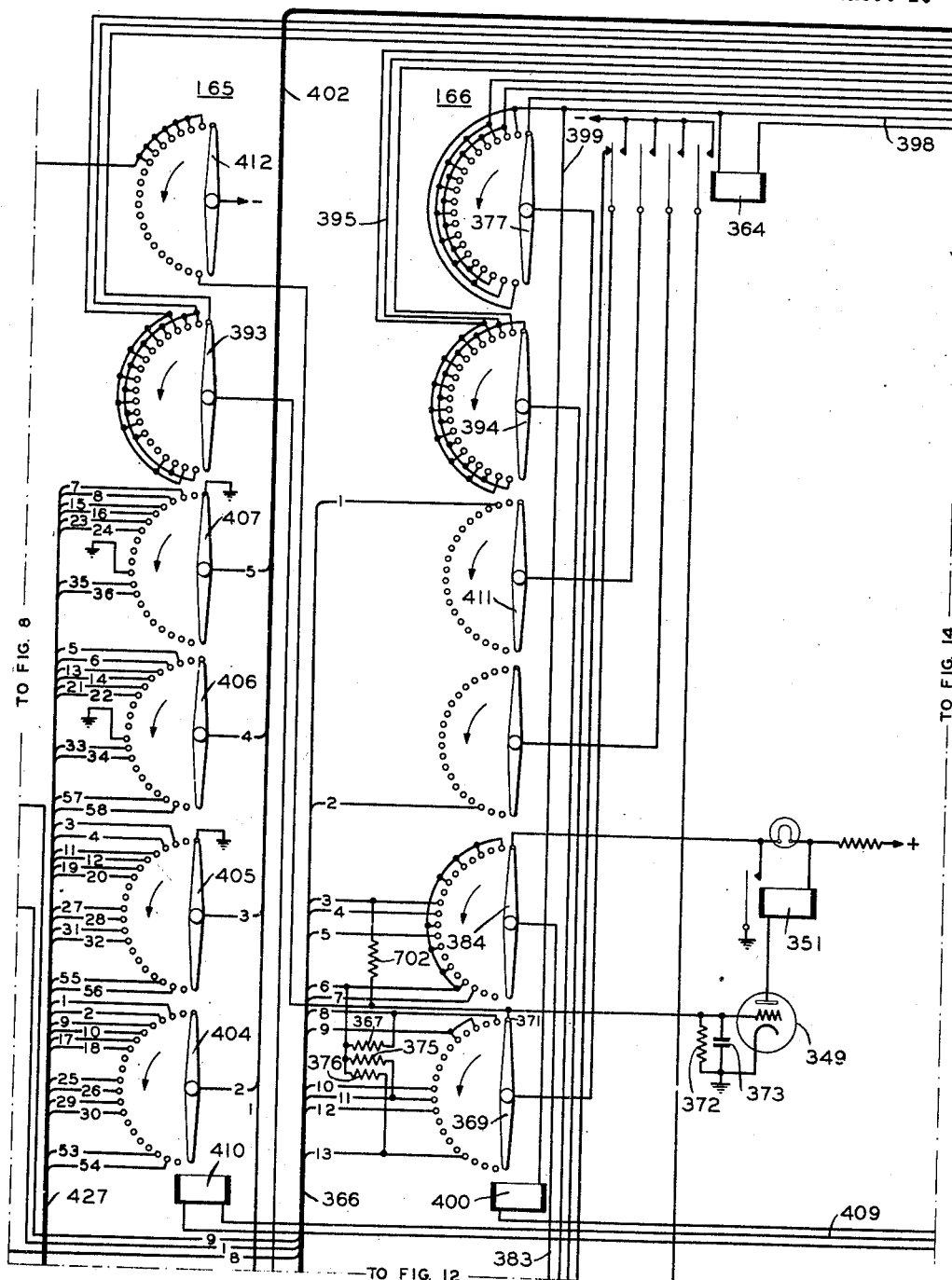
Figure 12:
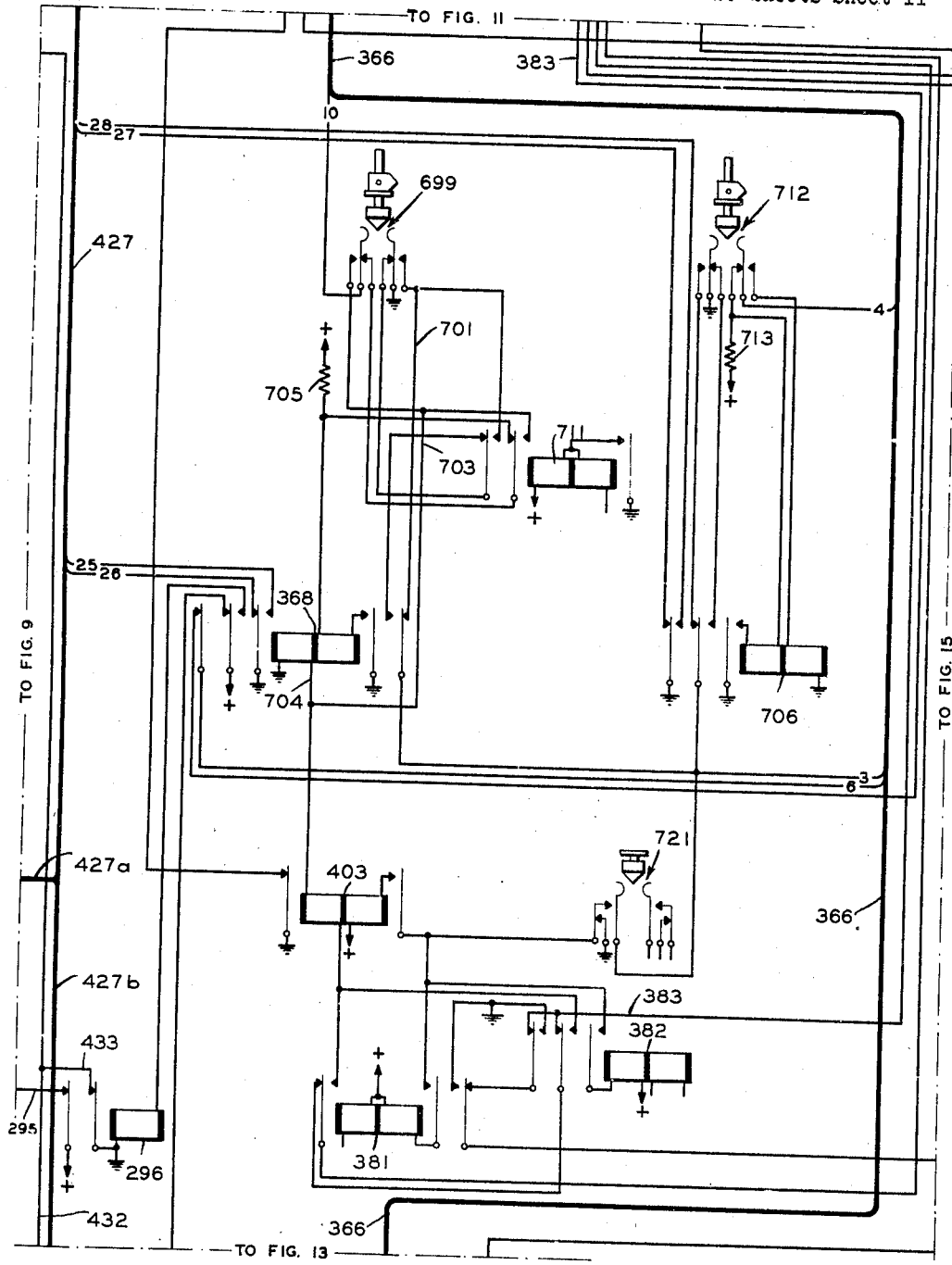
Figure 13:
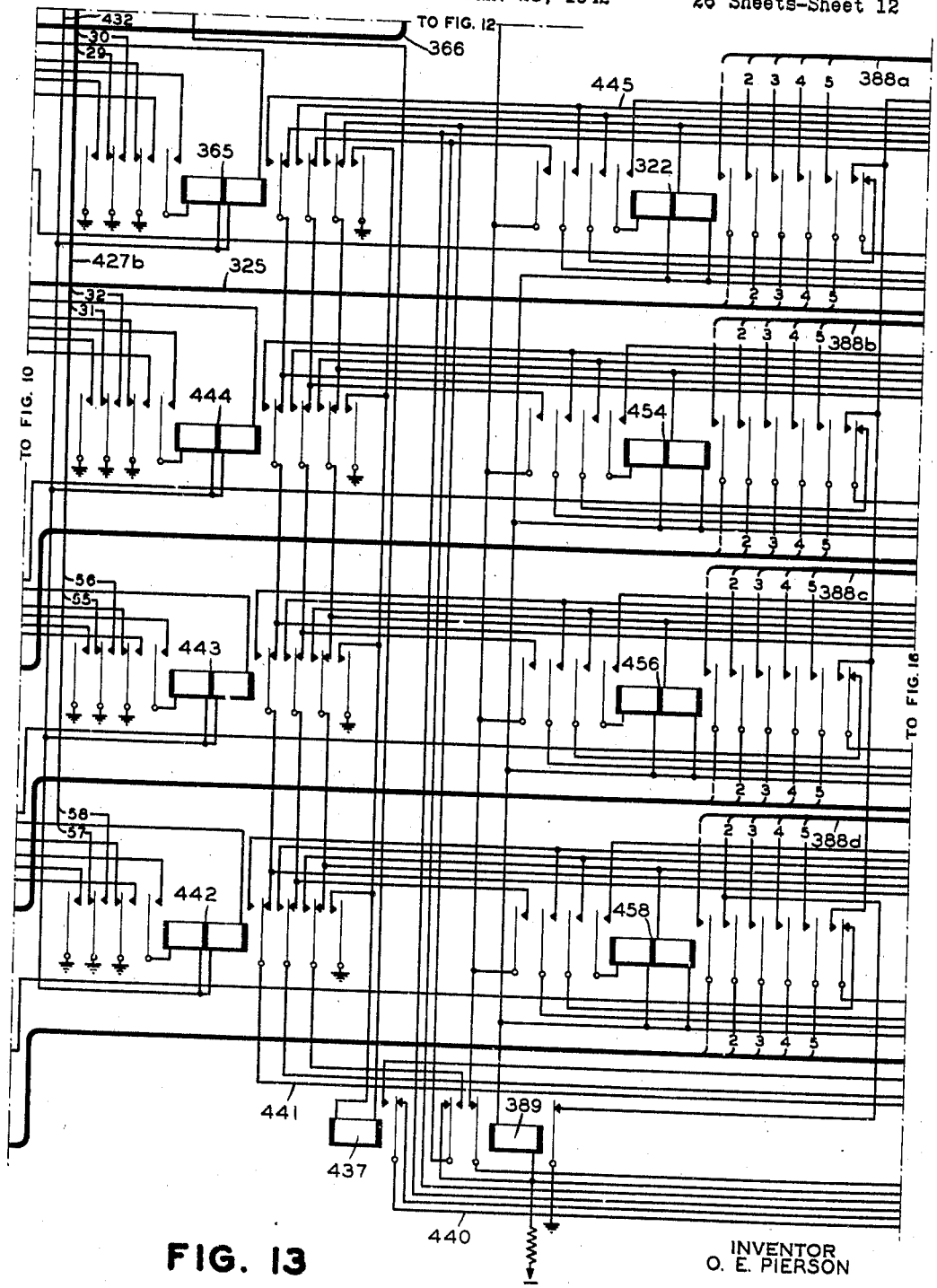
Figure 14:
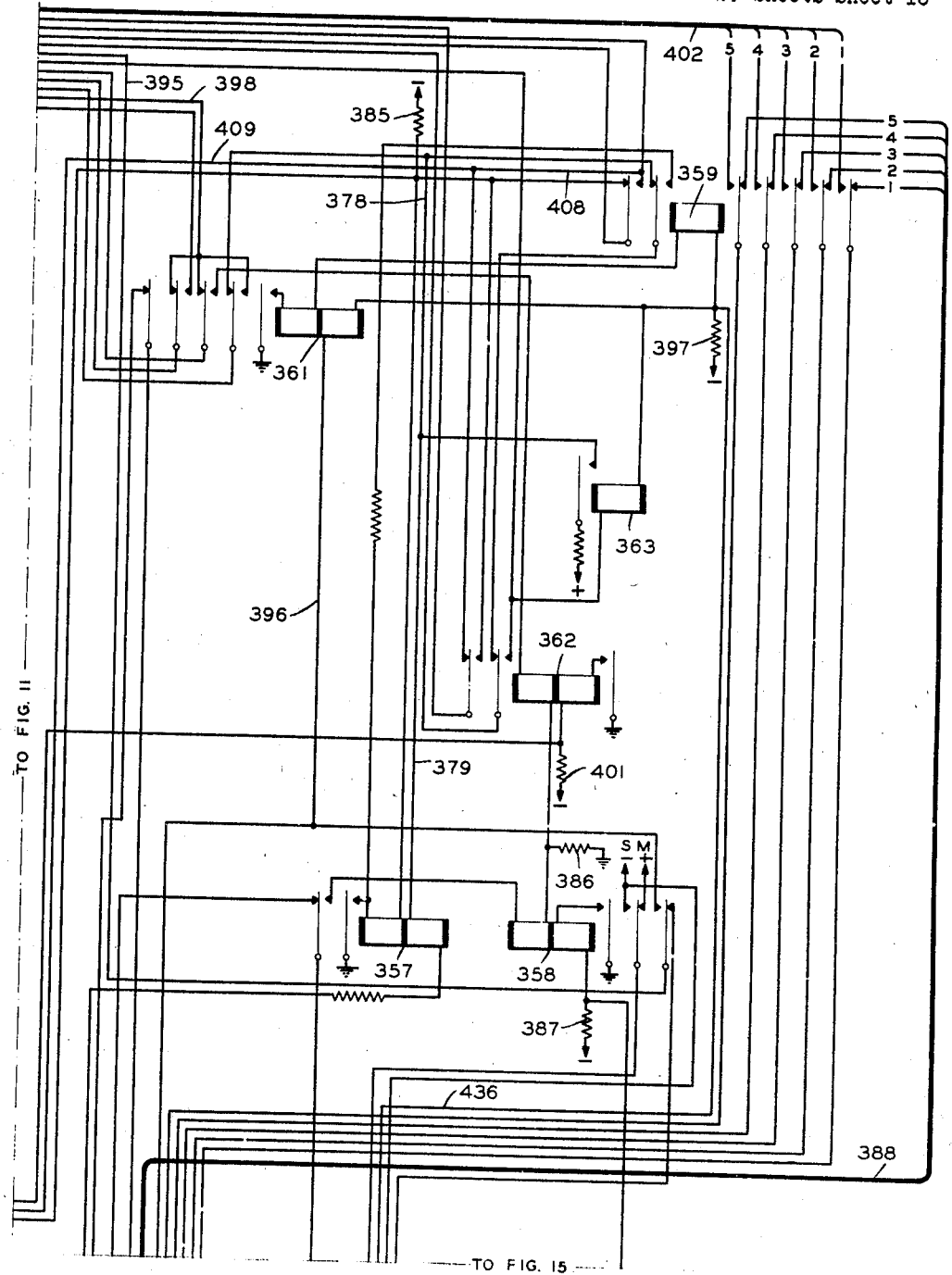
Figure 15:
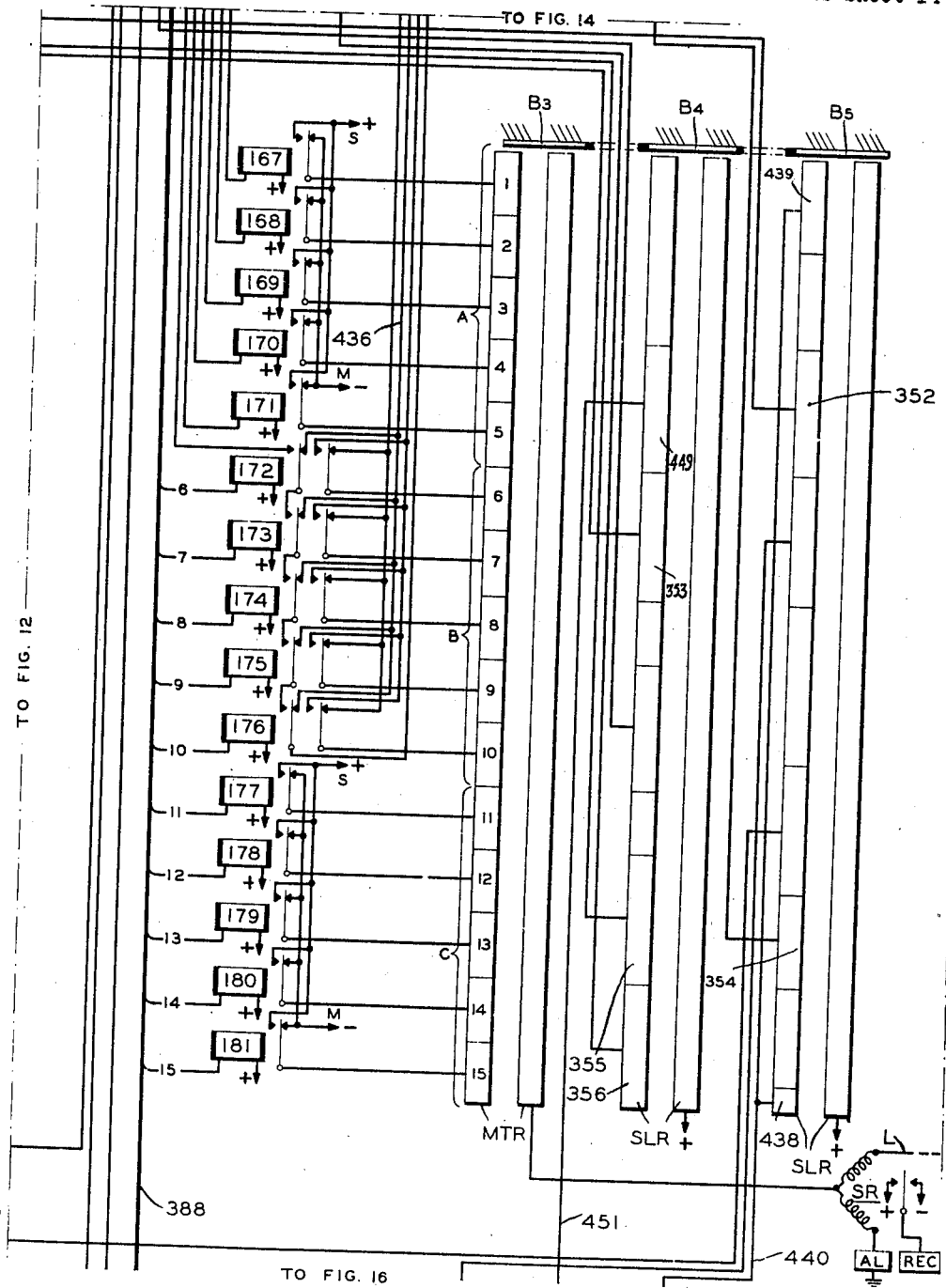
Figure 16:
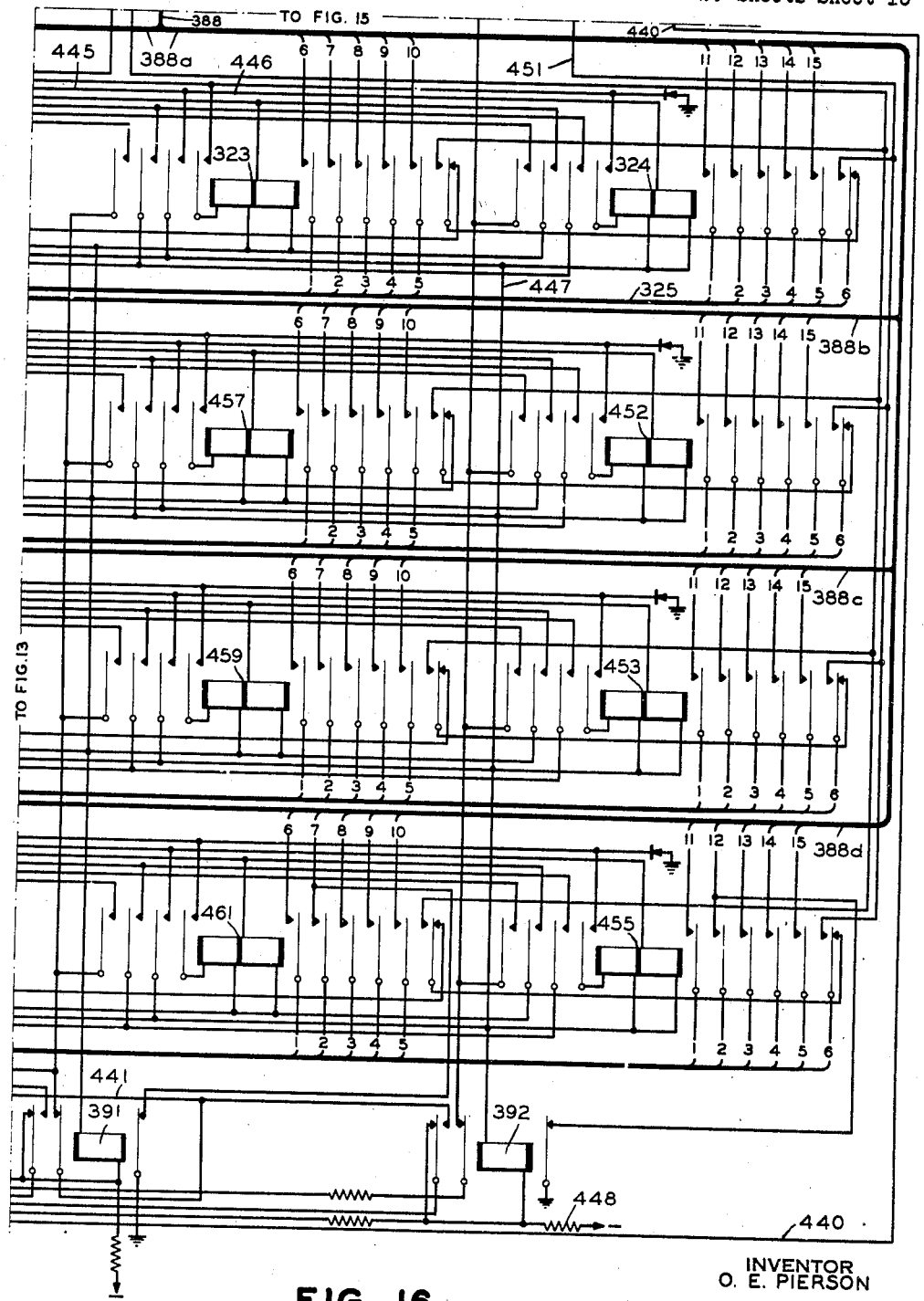
Figure 17:
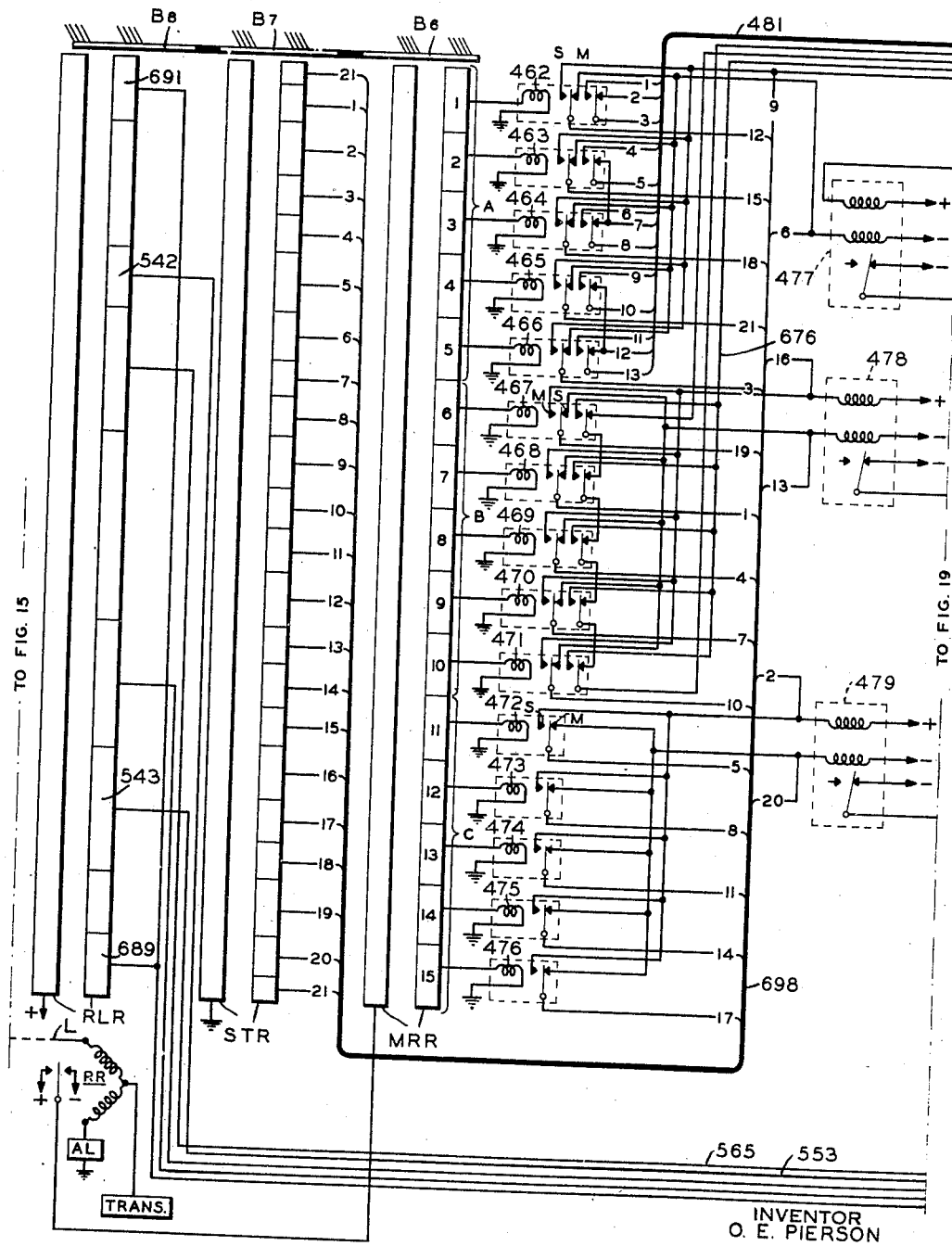
Figure 18:
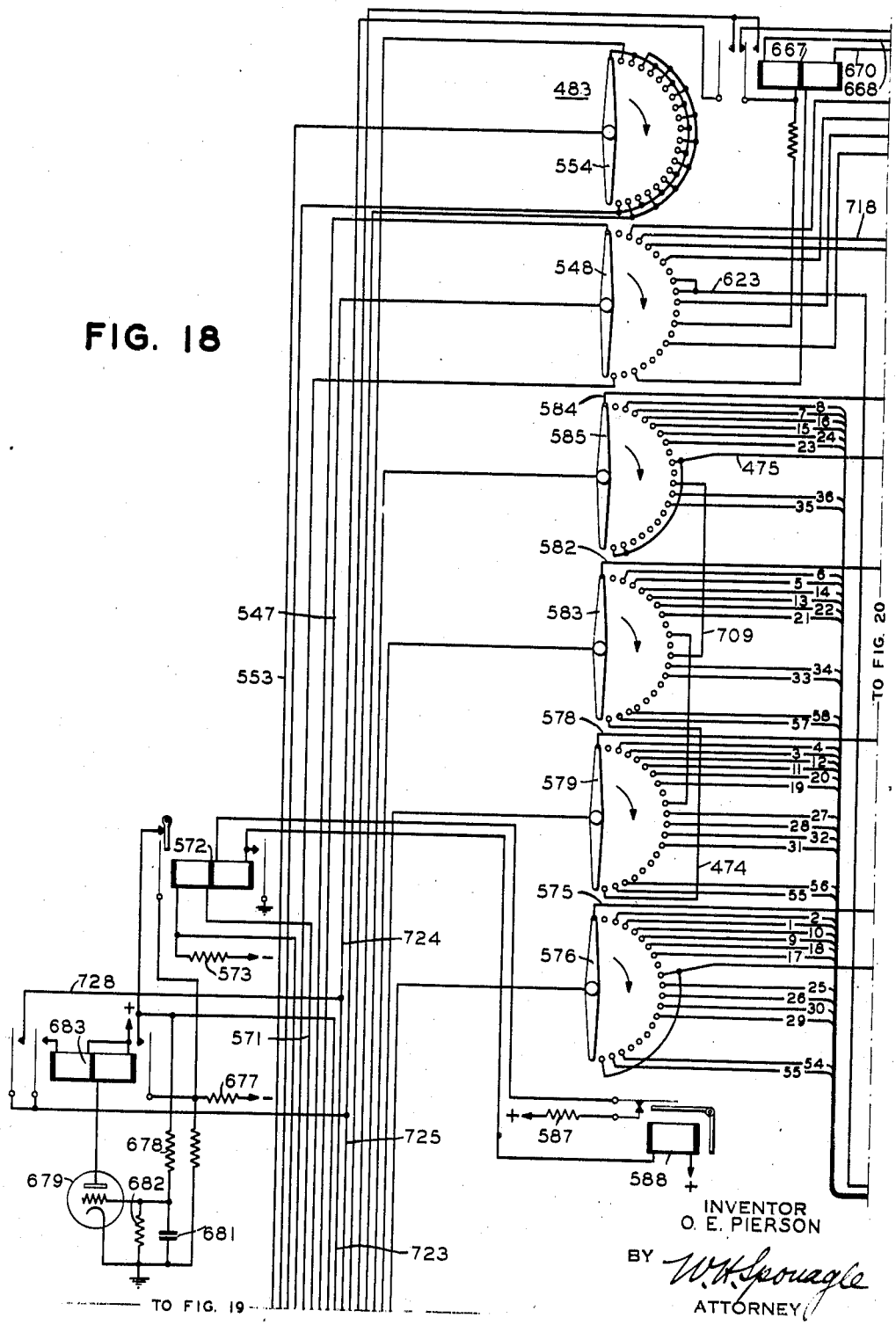

The subscriber call answering equipment and the switching mechanism necessary to select an available subchannel are shown in Figs. 4 and 5. The subscriber line finding equipment and the subchannel connecting apparatus are shown in Figs. 6 and 7. Apparatus for subchannel 1 together with diagrammatic indications of similar apparatus for subchannels 2, 14 and 15 are shown in Fig. 10. The relay chain mixer is shown in Figs. 13 and 16. The coding apparatus for the generation of the switching signals is shown in Figs. 8 and 9. The switching signaling transmitting apparatus and the control equipment therefor are shown in Fig. 11. The apparatus necessary for the supervisory control of the system is shown in Fig. 12. The synchronous multiplex line equipment is shown in Fig. 15 and some of the control apparatus necessary for the switching signaling is shown in Fig. 14.

Much of the apparatus shown in connection with the subchannel finding and connecting mechanism and for the subscriber line finding equipment is duplicated. In order to better understand the operation of the system and particularly to enable one to practice the invention, the number of such pieces of apparatus necessary to provide a system of the magnitude indicated will be given as the description proceeds.

All subscribers, such as subscriber 1 of group I and subscriber 48 of group IV, are provided with start-stop printing telegraph instruments 101 and 102 respectively. These devices comprise keyboard-controlled groups of transmitting contacts 103 and 104 respectively, and selector magnets 105 and 106 respectively to control the printing apparatus whereby records of the transmissions are provided. Relays 107 and 108 are also furnished at each subscriber's station to selectively control the operation of the respective contacts 103 and 104 depending upon whether or not the subscriber's equipment is connected to subchannel apparatus. Keys 109 and 111 are used to initiate calling signals and indicator lamps 112, 113, and 114, 115 are used to indicate to each of the respective subscribers his status in the system.

At the central station relays 116 and 117 are provided to control, among other things, the application of standby potentials to the associated subscribers' line wires. There is one relay of this type provided for each subscriber. Relays 118 and 119, of which there is one for each subscriber, respond to calling signals. For each group of 48 subscribers there are provided respectively relays such as 121 and 122, each of which controls the starting of the subchannel finder equipment. Relays 123, 124 and 125, 126, of which there is one pair for each group of 48 subscribers, are used in the control of the switching mechanism for locating an available subchannel.

Relays 127 and 128, of which there is one switch per subchannel for one group of forty-eight subscribers and a similar switch per subchannel for the second group of forty-eight subscribers, etc., or one per subchannel per group of 48 subscribers, are used in connection with the subchannel finder equipment. Each of these relays is released when its associated subchannel is idle and is operated when its associated subchannel is busy. Relays 129 and 131 of which there is one per subchannel are used in connection with the subchannel finder apparatus and each is released when its associated subchannel is not connected to a subscriber's line and is operated when there is such a connection. A relay such as 132 or 133 is provided for each subchannel and is employed to control the operation of the stepping switch used for locating an available subchannel. Vacuum tubes 134 and 135 are used respectively with relays 127 and 128 to control their operation or non-operation in accordance with the busy or idle condition of the associated subchannel. Vacuum tubes 136 and 137 are used to control the stepping operations of the respective associated subscriber line finder switches. One pair of these tubes is provided for each group of 48 subscribers. For each group of 48 subscribers there is also provided a five-bank stepping switch such as switches 138 and 139, each of which is used in connection with locating available subchannels. A three-bank stepping switch such as switches 141, 142, 143 or 144, of which there is one per group of 48 subscribers per subchannel, is used for the purpose of finding the calling subscriber's line. One of the relays 145, 146, 147 or 148, of which one is provided per subchannel per group, connects the calling subscriber's line with the selected subchannel.

The apparatus for each of the 15 subchannels includes a start-stop distributor 149, a tape perforator 151 and a tape transmitter 152. This apparatus also includes facilities for preparing blank tape between perforated messages, instrumentalities for detecting the presence in the tape of blank or normal message characters and means for stepping blank tape through the transmitter without effecting the transmission over the multiplex circuit of the blank characters.

A six-bank stepping switch 153, one of which is provided for the entire system, is employed for the purpose of, among other things, generating part of the coded signals identifying a selected subchannel. A relay 154 is employed to generate the remainder of the subchannel code signals. Relays 155 and 156 function as generators of the code signals identifying the group in which the calling subscriber is located. Relays 157, 158, 159, 161, 162 and 163 are employed to generate the code signals identifying the calling subscriber in his particular group. A network of rectifier units 164 is used in connection with the subscriber's line finder switches 141, 142, 143 and 144 to selectively control the relays 157 to 163, inclusive, in accordance with the identity of the calling subscriber.

A six-bank pattern switch 165 and a six-bank control switch 166 are connected for operation under the control of the multiplex apparatus to transmit the switching information necessary to control the receiving end of the system.

A bank of storage relays 167 to 181, inclusive, is operated under control of the various sources of signals including the subchannel tape transmitters and the switching signaling apparatus to set up signaling conditions upon the segments of the multiplex transmitting distributor rings MTR. These segments are traversed by a brush B3 whereby the segments are sequentially connected through a winding of a line relay SR to the line L. The line relay is differentially connected in the well known duplex arrangement whereby it is unaffected by the outgoing signals. The multiplex apparatus also includes two pairs of local rings SLR which are traversed respectively by brushes B4 and B5.

It will be understood that such a system is ordinarily operated on a duplex basis as facilities for signaling in both directions over the same lane of traffic are provided. In this case, the transmitting equipment will be duplicated at the receiving end of the system and the receiving apparatus will likewise be duplicated at the transmitting end of the system. At the transmitting station, for example, the receiving equipment will be connected as indicated to the contacts of the line relay SR.

SENDING SUBSCRIBER TO SUBCHANNEL CONNECTION

In the initial portions of the following detailed consideration of the operation of the system three different conditions will be assumed. It is believed that with these typical arrangements a complete understanding of the operation of the subscriber-to-subchannel apparatus part of the system may be obtained. These condtions are when: (1) both of the illustrated subchannels are disconnected from subscribers' lines; (2) one of the two illustrated subchannels is connected to a subscriber's line and is busy and the other subchannel is not connected to a subscriber's line and is, of course, idle; and (3) one of the two illustrated subchannels is connected to a subscriber's line and is busy and the other subchannel is also connected to a subscriber's line but is idle. By the term "connected," as used in this description, it is meant that the storage apparatus of the subchannel is physically connected to one of the subscriber's lines. Of course, when such a connection does not exist, the subchannel is described as "unconnected." The term "busy" is used to describe a condition where the subchannel is operating to retransmit signals from a subscriber to the multiplex apparatus. Conversely, the term "idle" is used to describe a condition wherein the subchannel apparatus is inoperative for the retransmission of signals.

(1) *Both subchannels disconnected.*—It is assumed that subscriber 1 of group I desires to obtain a connection to the communication circuit and to transmit signals thereover. At this time relay 116 is released and relay 118 is operated. In this specification each relay contact, where it is not otherwise obvious, will be referred to, for example, as the third left (or right) hand make contact of a designated relay. Such a contact may be found by counting out in the specified direction from the relay winding to the third armature. Also, direct current power sources are indicated in the drawings by means of an arrow pointing to either a plus or a minus sign. In every case it is intended to indicate that the non-designated terminal of each source of power is connected to ground. There is a circuit from positive battery through resistance 182 to the left hand armature of relay 116. There is another circuit from positive battery through resistance 183, the left hand winding and left hand make contact of relay 118 to the left hand armature of relay 116. These two circuits are both continued through the left hand break contact of relay 116 over the line wire 57 to the subscriber's station. Current is permitted to flow through the indicator lamp 112, which may be red for the guidance of the subscriber, through the closed key 109, the rectifier 184, the winding and make contact of relay 107 and through the winding of the selector magnet 105 to ground. Connected from the junction of resistance 183 and the left hand winding of relay 118 to ground is a resistance 185. This resistance is approximately five times the value of resistance 183 and approximately five-sixths the value of resistance 182. With a suitably proportioned terminal resistance of the subscriber's apparatus, there is sufficient current flow through the left hand winding of relay 118 to maintain this relay operated.

Under the assumed conditions relays 121, 122, 123, 124, 125, 126, 127, 128, 129, 131, 132 and 133 are released.

The subscriber initiates a calling signal by depressing the key 109, thereby removing a short circuit from around the resistance 186. The introduction of this resistance in the described circuit reduces the value of the current through the left hand winding of relay 118 to the point where the outer relay is released. Through the outer right hand break contact ground is applied to the conductor 187. This conductor is multipled to similar contacts on the other relays corresponding to relay 118 for each of the other 47 subscribers in group I. The application of ground to this conductor operates relay 121. The operation of this relay closes a test circuit whereby an available subchannel is selected for operation. This circuit may be traced from ground through the left hand break contact of relay 132, the left hand break contact of relay 133, the left hand break contact of relay 124, the left hand break contact of relay 126, conductor 190, the left hand make contact of relay 121, conductor 191, the third left hand break contact of relay 127, the second right hand break contact of relay 129, the winding of relay 132 and resistance 192 to positive battery. This latter relay operates and locks through its left hand make contact. This operation also opens the previously described test circuit which is linked through apparatus associated with the other subscriber groups and subchannels so that the apparatus cannot respond to a subsequent call until the first one has been completed. The closure of the right hand make contact of relay 132 completes a circuit extending from ground, over conductor 193, through the first left hand break contact of relay 123, the first left hand break contact of relay 125, the right hand make contact of relay 121, and the winding of relay 123 to positive battery. This latter relay is thus operated and locked through its first left hand make contact to ground at the right hand make contact of relay 132.

The operation of relay 123 prepares an operating circuit for the stepping magnet 196 of the switch 138. The circuit may be traced from the battery connected to the stepping magnet winding through the interrupter contacts 197, the first right hand make contact of relay 123, the first right hand break contact of relay 124 to wiper 198 of the first bank of the stepping switch. Each bank of the stepping switch is provided with contact studs in numbers equal to the number of subchannels. In the disclosed system there will be 15 such contacts, although only the first and fifteenth are shown herein in detail. Each of the contact studs of the first bank of the stepping switch 138 is connected to the right hand break contact of relays corresponding to relays 132 and 133. These contacts of these relays are also connected in multiple to corresponding contacts of the first bank of the stepping switch 139 which is associated with the apparatus of group IV.

In responding to a subscriber's call, all of the relays such as relays 132 and 133, with the exception of the one associated with the selected subchannel apparatus, are released. Accordingly, in this case relay 132 is operated, thereby removing a ground at its right hand break contact from contact 199 of the switch 138. Since all of the other similar relays, including relay 133, are released, ground is connected to all other contacts including contact 201 of this bank of the switch 138. If it is assumed that the wiper 198 is resting upon one of this latter group of contacts, for example, contact 201, the operating circuit of the stepping magnet 196 is completed to ground. The wipers of the switch thus are stepped successively over such grounded contacts until the wiper 198 effects engagement with contact 199. Since relay 132 is operated at this time, the operating circuit of the stepping magnet is open at this point and the stepping of the switch is interrupted.

There is, however, an alternate circuit extending from battery through the winding 196 of the stepping magnet, the interrupter contacts 197, the first right hand make contact of relay 123, the winding of relay 124, resistance 202, and the second right hand make contact of relay 123 to ground. This circuit has been closed during the entire stepping operations of the switch 138, but the winding of relay 124 and the resistance 202 have been effectively short-circuited by the grounds at the contacts passed over by the wiper 198 of the switch 138. Since there is no ground connected to contact 199 of the switch, the short circuit is removed and sufficient current is conducted through the winding of relay 124 to effect its operation but this current energizes the stepping magnet 196 insufficiently to cause further stepping of the switch 138.

The operation of relay 124 prepares a circuit for the stepping magnet 203 of the subscriber line finder switch 141 associated with the selected subchannel. This circuit may be traced from battery through the winding of the stepping magnet 203, the interrupter contacts 204, contact 205 and wiper 206 of the third bank of the stepping switch 138, the third right hand make contact of relay 124, through the parallel space discharge paths of the vacuum tubes 136 to negative battery. The completion of this circuit through the tubes is controlled by the grids of the tubes 136. These grids are connected in parallel through a resistance 207 to negative battery which, by way of example, may have a value equal approximately to twice that connected to the cathodes of the tubes. The grids of these tubes are also connected through another resistance 208, the fourth right hand make contact of relay 124, wiper 209 and contact 211 of the fourth bank of the stepping switch 138, the third left hand break contact of relay 145, wiper 212 and contact 213 of the second bank of stepping switch 141, conductor 214 to the first right hand armature of relay 118. The described circuit exists only when the wipers of the stepping switch 141 are in the positions shown. Assume that the wiper 212 is in engagement with contact 215, Then the circuit is extended by a conductor (not shown) corresponding to conductor 214 to the first right hand armature of a relay which corresponds to relay 118. If the subscriber with which this relay is associated is not connected to one of the subchannels and is not calling, this relay will be operated. The described circuit is thus extended to ground through the first right hand make contact of the relay corresponding to relay 118, a rectifier corresponding to rectifier 216, a counter and a resistance in parallel therewith corresponding respectively to the counter 217 and resistance 218.

The two resistances 207 and 208 form a potential divider from which voltage is supplied to the grids of tubes 136. This voltage is obtained at the junction between the two resistances and is dependent upon the voltages at their opposite ends. In the case under consideration the resistance 208 is connected to ground, or zero potential through the described rectifier and counter circuit. While the rectifier is not poled to pass current readily in the direction from ground to negative, its resistance is nevertheless negligible compared to that of the resistances 207 and 208. The voltage at the junction of resistances 207 and 208 will therefore be of negative polarity of such a value that the grids are rendered positive with respect to their associated cathodes which are connected to negative battery of a greater value. Accordingly, whenever the wiper 212 of switch 141 engages contacts associated with unconnected subscribers other than the contact associated with the calling subscriber's line, the circuit of the stepping magnet 203 is closed, resulting in a stepping of the switch wipers over such contacts.

In the case where the wiper 212 of stepping switch 141 engages a contact such as 215 multipled to a corresponding contact such as contact 219 of stepping switch 142 and associated with a subscriber's line already connected to a subchannel, it should be noted that the relay corresponding to relay 118 will be operated and the relay corresponding to relay 116 will also be operated. In this event the circuit from the grids of the tubes 136 through the rectifier corresponding to rectifier 216 will be in the condition described. Such a circuit has been shown to be ineffective in interrupting the operation of the tubes. However, there is established another circuit from the grids through the right hand make contact of the relay corresponding to relay 116, the right hand winding of this relay and the resistance corresponding to resistance 221 to negative battery. The value of this battery may be, for example, substantially equal to that connected to the cathodes of tubes 136. A circuit connected in parallel with this latter circuit extends from the contact 219 through the wiper 222 of stepping switch 142, the third left hand make contact of relay 146, which is operated under these conditions, over conductors 223 and 224 to the apparatus of subchannel 15. This conductor corresponds to conductor 225 associated with subchannel 1 and is connected through apparatus corresponding to resistances 226 and 227 to positive battery. The value of this battery may be, for example, substantially equal to that connected to the cathodes of tubes 136. The combined value of the resistances 226 and 227 connected in series is substantially equal to the combined resistance of the right hand winding of the relay corresponding to relay 116 and the resistance corresponding to 221. Since the polarity of the battery connected to one of these parallel circuits is negative and the polarity of the battery connected to the other parallel circuit is positive and both batteries are of substantially equal value, the potential of the contact 219 of the stepping switch 142 which is located at the junction of these two circuits is substantially zero. Consequently, when this potential is applied to the control grids of the tubes 136, the tubes remain conducting and continue to energize the stepping magnet 203 of the switch 141.

If, while the wiper 212 of stepping switch 141 is in contact with stud 215, the subscriber who at that time is connected with subchannel 15 is transmitting signals to the subchannel apparatus, the resistance which corresponds to resistance 226 is periodically short-circuited, thereby decreasing the total resistance of the positive parallel circuit previously referred to. The effect of this operation is to momentarily render the potential of contact 219 of stepping switch 142 and contact 215 of stepping switch 141 which are connected in multiple slightly positive. The connection of this positive potential to the control grids of the tubes 136 is not effective to decrease their conductivity, and therefore it does not affect the operation of the stepping magnet 203.

The negative branch of the two described parallel circuits may be subjected to potential changes caused by the operation of one of a plurality of push-button keys such as 228. Normally, when this key is operated to close its left hand contact for a purpose to be described in the section entitled "Miscellaneous features," a circuit is completed from the junction of resistance 221 and the right hand winding of the relay corresponding to 116 through the right hand contacts of other keys including a key 229, through the second left hand break contact of relay 123, through resistance 231 to negative battery. Such an operation would depress the potential applied to the grids of the tubes 136 to a point where the conductivity of these tubes might be sufficiently reduced to cause an interruption in the operation of the stepping magnet 203. However, during a switching operation relay 123 is operated, thereby disabling the keys such as 228 and 229 at the second left hand break contact of this relay.

When the wiper 212 of stepping switch 141 engages the contact 213, the grids of the tubes 136 are connected by a circuit extending through the fourth right hand make contact of relay 124, wiper 209 and contact 211 of stepping switch 138, third left hand break contact of relay 145, wiper 212 and contact 213, conductor 214, the first right hand break contact of relay 118, right hand winding of relay 116 and the resistance 221 to negative battery. The negative potential derived from this source, in combination with the negative potential derived through resistance 207, is sufficient to depress the grid-to-cathode potential of these tubes sufficiently to interrupt the space current. Consequently, no further operation of the stepping magnet 203 of the switch 141 is possible, and the switch wipers are brought to rest in the positions shown.

During the above described stepping operations of the switch 141 the vacuum tube 134 is maintained non-conducting for the reason that the control grid thereof is connected by conductors 232 and 233, contact 234 and wiper 235 of stepping switch 138, the second right hand make contact of relay 124, resistance 236 to the anodes of the tubes 136. While these tubes are conducting during the operation of the switch 141, the anodes are maintained at a negative potential which is only slightly less than the value of the negative potential connected to their cathodes. The cathode of the tube 134 being connected to ground, this tube, therefore, is maintained non-conducting. As soon as the tubes 136 are rendered non-conducting due to the detection of the calling subscriber's line, the negative potential is disconnected from the grid of the tube 134. Also, during the stepping operation of the switch 141 the positive potential connected to the stepping magnet 203 is connected to the grid of the tube 134 by means of a circuit extending through the interrupter contacts 204, contact 205 and wiper 206 of stepping switch 138, the third right hand make contact of relay 124, resistance 236, the second right hand make contact of relay 124, wiper 235 and contact 234 of stepping switch 138. This positive potential is ineffective to operate the tube 134 because the impedance of the winding of the stepping magnet 203 and the resistor 237 is appreciably greater than the impedance of the space discharge paths of the vacuum tubes 136. As soon as this path through the tubes 136 is interrupted, however, the positive potential becomes effective to control the tube 134. Conduction is not started immediately in this tube, however, because of the condenser 238 connected between the grid and the cathode thereof. This condenser is charged from the positive battery connected to resistance 237 through a timing resistance 236, and the time required for this charge is sufficient to prevent a false operation of the tube 134 under conditions which will be considered in the section entitled "Miscellaneous features." When the condenser 238 has become charged, to a potential sufficiently high to cause the tube 134 to become conductive, a circuit is closed through the left hand winding of relay 127 from the positive battery connected thereto to the ground connected to the cathode of the tube.

Prior to the operation of relay 127 a circuit was complete from positive battery at this relay over conductors 239 and 240, through the winding of relay 145, conductor 241, contact 242 and wiper 243 of stepping switch 138, and the fifth right hand make contact of relay 124 to ground. At this time, however, the battery for this circuit is short-circuited through the first left hand break contact of relay 127 and the first right hand break contact of relay 129 to ground, thereby rendering the circuit ineffective to cause the operation of relay 145. The operation of relay 127 removes the short circuit from the battery to permit the operation of relay 145, which locks through its first left hand make contact to ground, thereby insuring the continued operation of this relay independently of the circuit through the stepping switch 138.

The operation of relay 145 connects the subscriber's line 57 over conductor 244, through contact 245 and wiper 246 of the line finder switch 141, the fourth left hand make contact of relay 145, conductor 247 and the winding of relay 248 of the sub-channel 1 apparatus to negative battery. It should be noted that prior to the operation of relay 145 the circuit from the relay 248 is complete through the fourth left hand break contact of relay 145, the fourth left hand break contact of relay 147 and resistance 249 to ground, thereby maintaining the contacts controlled by relay 248 closed to prevent the idle operation of the subchannel distributor apparatus.

It should also be noted that now there is connected to the subscriber's line 57 battery of negative polarity, whereas prior to the operation of relay 145 battery of positive polarity was connected thereto. Simultaneously with the connection of negative battery to the subscriber's line by the operation of relay 145, the positive battery is disconnected therefrom by the operation of relay 116. The operating circuit for this latter relay may be traced from negative battery through resistance 221, the right hand winding of this relay, the first right hand break contact of relay 118, conductor 214, contact 213 and wiper 212 of the line finder switch 141, the third left hand make contact of relay 145, conductors 250 and 225 and resistances 226 and 227 to positive battery. Once operated, this relay locks through its right hand make contact. The positive battery through resistance 182 is disconnected from the subscriber's line 57 at the left hand break contact of relay 116. The effect upon the subscriber's equipment produced by this reversal of battery polarity will be considered presently. The operation of relay 116 also connects battery through resistance 182, the left hand make contact of this relay, the right hand winding of relay 118, the left hand winding of relay 116, resistance 251 and lamp 252 to ground. The operation of the lamp gives an indication that subscriber 1 of group I is connected to a subchannel. Relay 118 is operated and, upon closure of its left hand make contact, current is conducted through its left hand winding in such a direction that the two windings are mutually aiding. This is a consequence of the junction of resistances 183 and 185 being at a higher positive potential than that of the left hand make contact.

The currents in the two windings of relay 116 are arranged to flow in opposite directions to produce opposing magnetic fields, that of the left hand winding, however, being of considerably lesser magnitude than that of the right hand winding. This arrangement has the effect of producing a quick release of this relay when the subscriber's line subsequently is disconnected from the subchannel in a manner to be described subsequently in this section under "(3) One subchannel connected and busy—Other subchannel connected and idle." Therefore, in order to insure this type of operation, the magnetic field produced by the left hand winding is opposed to that produced by the right hand winding and is less in magnitude than that of the right hand winding by the amount necessary to insure continued operation of the relay until such time as it is desired to release it.

The operation of relay 118 interrupts at the second right hand break contact thereof the operating circuit of relay 121, thereby effecting the release of this relay.

When relay 127 is operated, the winding of relay 132 is short-circuited at the third right hand make contact of relay 127. Relay 132 is thus deenergized but does not release immediately because it is provided with a slow-to-release characteristic. Such a characteristic is necessary in order to insure the completion of some of the relay operations previously described. When this relay does release, however, the ground at the right hand make contact to which relay 123 has been locked is removed, thereby releasing the latter relay. The release of relay 123 also interrupts the operating circuit of relay 124 to cause its release.

At the completion of this sequence of operations, it is seen that the subscriber group calling test circuit apparatus is all restored to normal. Relay 127, which is associated with subscriber 1 of group I, is operated and is maintained in this condition in a manner to be described in the section entitled "Miscellaneous features." In the section entitled "Sending switching signaling" there will be described the operation of relay 129 and the operation of the apparatus involved in generating and transmitting the coded switching signals necessary to convey the switching information to the receiving station.

At the subscriber's station, as long as positive battery is connected to the line 57, relay 107 is operated so that the keyboard controlled transmitting contacts 103 are short-circuited by the make contact of this relay. Such an arrangement is desirable to prevent the possible loss of intelligence signals which might be sent prematurely before the subscriber's apparatus is connected to subchannel storage apparatus. Inasmuch as the subscriber's keyboard mechanism is connected directly to the printer selecting mechanism so that he may obtain a home office copy of the transmitted subject matter, any operation of the transmitter keyboard while the relay 107 is operated is ineffective to produce a response by the selector magnet 105. Consequently, the subscriber in attempting to send before his apparatus is connected to subchannel storage equipment, is immediately apprised of the condition by the failure of his printing apparatus to function. When the positive battery is disconnected from the subscriber's line 57 and negative battery connected in place thereof, the previously described circuit through the rectifier unit 184 and the winding of relay 107 is interrupted and a circuit is complete through the selector magnet 105 and the normally closed one of the transmitter contacts 103, rectifier 253 and the lamp 113, which may for convenience be colored green, over the line 57 and the previously described circuit to the negative potential connected to relay 248 of the subchannel 1 apparatus at the central station. It may be seen that relay 107 is thus deenergized to remove the short circuit from the transmitter contacts and a suitable signal is operated to indicate this condition so that the subscriber may proceed with the transmission of the message.

Before proceeding with the description of the operation of the system following the above described series of operations, the remaining two typical arrangements referred to previously will be considered.

(2) *One subchannel connected and busy—Other subchannel disconnected.*—It is assumed that subscriber 1 of group I is connected to subchannel 1 and is engaged in transmitting message signals. It is also assumed that subchannels 2 to 14 are connected to other subscribers who likewise are busy and that subscriber 48 of group IV desires connection to the system. Under these conditions the following relays are operated: 116, 118, 127, 129, 145, 108 and 119. Line finder switch 141 is positioned as shown and the positions of the other switches of Figs. 4, 5, 6 and 7 are immaterial. Also the following relays are not operated: 107, 123, 124, 132, 121, 117, 133, 128, 121, 125, 126, 122, 146, 147 and 148.

Subscriber 48 of group IV initiates a call by operating the key 111 to release relay 119. By means of the second right hand break contact of this relay, relay 122 is operated to close the subscriber calling test circuit. This time the circuit may be traced from ground through the left hand break contact of relay 132, the left hand break contact of relay 133, the left hand break contact of relay 124, the left hand break contact of relay 126, the left hand make contact of relay 122, conductor 191, the third left hand make contact of relay 127, conductor 254, the third left hand break contact of relay 128, the second right hand break contact of relay 131, the winding of relay 133 and resistance 255 to battery. Relay 133 is thus operated and locked through its left hand make contact to ground through the left hand break contact of relay 132. Also a circuit is completed from ground through the right hand make contact of relay 133, conductor 193, the first left hand break contact of relay 123, the first left hand break contact of relay 125, the right hand break contact of relay 121, the right hand make contact of relay 122 and the winding of relay 125 to battery. The latter relay is thus operated.

The operation of relay 125 prepares a circuit from battery through the winding of stepping magnet 256 of the subchannel finder switch 139, the interrupter contacts 257 of this switch, the first right hand make contact of relay 125, the first right hand break contact of relay 126, wiper 258 of the subchannel finder switch and the bank contacts associated therewith to ground at the right hand break contact of the relay 132 or others corresponding thereto which are associated with any but the selected subchannel; in this case, any but subchannel 15. The wipers of switch 139 are thus stepped over the bank contacts until wiper 258 engages contact 259 which is connected to the right hand break contact of relay 133. Since this relay is operated, the described operating circuit for the stepping magnet 256 is opened and the switch comes to rest as previously described thereby causing the operation of relay 126 through resistance 261 and the second right hand make contact of relay 125 to ground.

The operation of relay 126 prepares a circuit from the anodes of the tubes 137 through the third right hand make contact of relay 126, wiper 262 and contact 263 of stepping switch 139, the interrupter contacts 264 and winding 265 of the stepping magnet of line finder switch 144. Also a connection from the grids of the tubes 137 is established through the fourth right hand make contact of relay 126 through the wiper 266 and contact 267 of switch 139, the third left hand break contact of relay 148, to the wiper 268 of switch 144. As long as this wiper is engaged with contacts associated with non-calling subscribers, the tubes 137 are conductively conditioned in the manner described. The stepping of the wipers of switch 144 continues until wiper 268 engages contact 269 which is associated with the apparatus of subscriber 48 of group IV. The potential of this contact is of such a character that the tubes are rendered non-conducting and the wipers of the switch 144 are stopped in the manner described.

When the tubes 137 are rendered non-conducting, a circuit is made effective from positive battery through the winding 265 and interrupter contacts 264 of the line finder switch 144, wiper 262 and contact 263 of subchannel finder switch 139, the third right hand make contact of relay 126, resistance 271, the second right hand make contact of relay 126, wiper 272 and contact 273 of switch 139, and conductor 274 to the control grid of tube 135. Between the grid and the cathode of this tube is connected a condenser 275 which begins to accumulate a charge through the resistance 271 and ultimately reaches a value sufficient to cause the conduction of space current through the tube and the left hand winding of relay 128, thereby causing the operation of this relay. Ground from the first right hand break contact of relay 131 is removed from the upper end of the resistance 276 by the operation of the second left hand break contact of relay 128, thereby effecting the operation of relay 148. The operating circuit for this relay may be traced from battery through resistance 276, conductors 277 and 278, the winding of relay 148, wiper 279 and contact 281 of switch 139 and the fifth right hand make contact of relay 126 to ground. As soon as relay 148 operates, it is locked through its first left hand make contact.

The operation of relay 148 connects the line 282 of subscriber 48 of group IV over conductors 283 and 284, wiper 285 and contact 286 of switch 144, the fourth left hand make contact of relay 148, the fourth left hand break contact of relay 146 and conductor 287 to the apparatus of subchannel 15. The conductor 287 corresponds to the conductor 247 of subchannel 1 and is connected to a relay which corresponds to relay 248 of subchannel 1, terminating in negative battery. Thus, negative potential is connected to the subscriber's line 282 and concurrently therewith relay 117 is operated to remove at its left hand break contact the previously connected positive potential. The operating circuit for relay 117 may be traced from negative battery through resistance 288, the right hand winding of relay 117, the first right hand break contact of relay 119, conductors 289 and 291, wiper 268 and contact 269 of switch 144, the third left hand make contact of relay 148, conductors 292 and 224 to the apparatus of subchannel 15. Conductor 224 corresponds to conductor 225 of subchannel 1 and is connected through resistances corresponding to resistances 226 and 227 of subchannel 1 to positive battery. The operation of relay 117 also effects the operation of relay 119 in a manner similar to that described. The operation of relay 119 releases relay 122.

The operation of relay 128 also deenergizes relay 133 by short-circuiting the winding thereof at the third right hand make contact of relay 128. When the slow-to-release relay 133 releases, relay 125 is deenergized and releases and, in turn, deenergizes and releases relay 126.

Thus it is seen that the subscriber calling test circuit apparatus is restored to normal and the calling subscriber's line 282 is connected to the apparatus of subchannel 15 so that transmission may be started by the subscriber.

(3) *One subchannel connected and busy—Other subchannel connected and idle.*—It is assumed that subscriber 1 of group I is connected to subchannel 1 and is engaged in transmitting message signals. It is also assumed that subchannels 2 to 14 are connected to other subscribers who likewise are busy and that subchannel 15 is connected to a subscriber's line but is idle. At this time subscriber 48 of group IV desires a connection with the system. Under these conditions the following relays are operated: 116, 118, 127, 129, 145, 108, 119, 131 and 148. Line finder switch 141 is positioned as shown, the wipers of switch 144 are at the contacts of the connected but idle subscriber's line, and the positions of the other switches of Figs. 4, 5, 6 and 7 are immaterial. Also, the following relays are not operated: 107, 123, 124, 132, 121, 117, 133, 128, 125, 126, 122, 146 and 147.

Subscriber 48 of group IV initiates a call by operating the key 111 to release relay 119 which in turn operates relay 122. Prior to the operation of relay 122, relay 148 is locked from ground through its first left hand make contact, the winding of the relay, conductors 278 and 277 and resistance 276 to battery. The subscriber calling test circuit is closed by the operation of relay 122 and may be traced from ground through the left hand break contact of relay 132, the left hand break contact of relay 133, the left hand break contact of relay 124, the left hand break contact of relay 126, the left hand make contact of relay 122, conductor 191, the third left hand make contact of relay 127, conductor 254, the third left hand break contact of relay 128, the second right hand make contact of relay 131, conductor 293, the second left hand make contact of relay 127, the first left hand break contact of relay 128, conductors 277 and 278 to the right hand terminal of the winding of relay 148. Since ground is also connected through the first left hand make contact of this relay to the left hand terminal of the winding, the relay is deenergized and releases.

The release of relay 148 opens at its third left hand make contact the locking circuit of the relay corresponding to relay 117 associated with the previously connected subscriber, thereby effecting its release. Since the previous subscriber-to-subchannel connection is broken at the fourth left hand make contact of relay 148, the release of the relay corresponding to relay 117 restores the previously connected subscriber's apparatus to its idle unconnected condition. Before the relay corresponding to relay 117 releases following the release of relay 148, the negative potential derived through resistance 288 is impressed upon bank contact 269 of switch 144, and since such a condition might prevent the switch from operating, the relay corresponding to relay 117 is made to release as rapidly as possible in the manner described previously in this section under "(1) Both subchannels disconnected."

Prior to the release of relay 148, relay 131 is locked from ground through its first right hand make contact, the right hand winding of the relay, conductor 294, the third right hand make contact of relay 148, conductor 295, and the second left hand break contact of relay 296 to battery. Upon the release of relay 148 this circuit is opened releasing relay 131. The ground from the left hand break contact of relay 132 is transferred from the second right hand make contact of relay 131 to the second right hand break contact and through the winding of relay 133 and resistance 255 to battery, thereby operating relay 133.

The operation of this relay operates relay 125 which in turn starts the subchannel finder switch 139. When the wipers of this switch have reached the contacts associated with subchannel 15, the switch is stopped and relay 126 is operated. Following this the line finder switch 144 is started and continues to step until the subscriber's line 282 is found, whereupon relay 148 is operated to connect the subscriber's line 282 by means of conductors 283 and 284, the contact 286 and wiper 285 of switch 144, the fourth left hand make contact of relay 148, the fourth left hand break contact of relay 146 and conductor 287 to subchannel 15.

In case all of the subchannels are connected to subscribers' lines and are busy at the time that another subscriber, for example subscriber 48 of group IV, desires a connection, the relay corresponding to 122 associated with the calling subscriber is operated and closes the subscriber calling test circuit. At this time the circuit may be traced from ground through the left hand break contact of relay 132, the left hand break contact of relay 133, the left hand break contact of relay 124, the left hand break contact of relay 126, the left hand make contact of relay 122, conductor 191, the third left hand make contact of relay 127, conductor 254, the third left hand make contact of relay 128, conductor 293, the second left hand make contact of relay 127, the first left hand make contact of relay 128, lamp 297 and resistance 298 to battery. Thus it is seen that, aside from the operation of the relay corresponding to relay 122, no other relays are operated, and the lamp 297 is illuminated to indicate to an attendant that there are one or more subscribers awaiting connection to the system which is at the moment utilized to full capacity. Also, by reason of the failure of the red light 114 to be extinguished and the green light 115 to be lighted, the calling subscriber knows that there is no available subchannel apparatus at that time and he must wait until such apparatus becomes available.

As soon as one of the operating subscribers becomes idle the relay corresponding to relays 132 and 133 which is associated with the subchannel to which the operating subscriber has been connected will be operated, and the switching mechanism will function to connect the calling subscriber to the available subchannel in the manner described.

SENDING SUBCHANNEL APPARATUS

It is assumed that the entire system is idle and that no subscribers are connected to any of the subchannels and at this time subscriber 1 of group I initiates a call. After the previously described switching operations, relay 127 is operated to cause the operation of relay 145. At this time relay 127 also is effective to start the operation of the code switch 153 in a manner which will be described in the section entitled "Sending code switch." The operation of relay 145 connects the subscriber's line 57 to relay 248 of subchannel 1. Since negative battery is connected to this relay and ground to the other end of the circuit at the subscriber's station, the relay remains energized.

At this time relay 299 of the subchannel apparatus is operated and locked by a circuit which extends from positive battery through resistances 301 and 302, the right hand make contact and right hand winding of the relay and the winding of the transmitter stepping magnet 303. Relay 248 is operated as described, the latch magnet 304 of the start-stop distributor 149 is energized and the line relay 305 is operated.

In response to the illumination of the green light 113 at the subscriber's station, the subscriber begins the operation of his transmitting keyboard to send start-stop signals over the line 57 to relay 248 at the subchannel. In response to the first start signal, which is spacing or an open line condition, relay 248 is released to deenergize the latch magnet 304 and the line relay 305. The deenergization of the latch magnet permits the withdrawal of the latch 306 allowing the distributor brush 307 to begin a traverse over the rings associated therewith. Connected to individual segments of one of the distributor rings are selector magnets 308 of the tape perforator 151. These magnets are selectively energized as the brush passes over the segmented ring under the control of the make contact of the line relay 305 which responds to the signals transmitted from the subscriber's apparatus. When the brush 307 bridges segments 309 and 311, positive battery is connected to the punch-magnet 312 of the perforator to form perforations in the tape in accordance with the received character signals.

Following the operation of the punch-magnet, the brush 307 bridges segments 313 and 314, thereby short-circuiting resistance 226. Prior to the engagement of the brush with these two latter segments, there is a circuit extending from positive battery, through resistances 227 and 226, conductors 225 and 250, the third left hand make contact of relay 145, wiper 212 and contact 213 of switch 141, conductor 214, the right hand make contact and right hand winding of relay 116 and resistance 221 to negative battery, which has a value substantially equal to that connected to resistance 227. Also connected as a branch of the described circuit from the conductor 214 is a circuit which includes the first right hand make contact of relay 118, rectifier 216 and the winding of the counter 217 and which terminates in ground. The combined value of resistances 221 and the resistance of the right hand winding of relay 116 is substantially the same as the combined value of resistances 226 and 227. Consequently, the conductor 214 is substantially at ground potential. When resistance 226 is short-circuited by the distributor brush 307, the potential of conductor 214 is raised to some positive value. Hence, there is a current flow in the branch circuit through the rectifier 216 and the counter 217 which advances the counter one step. Since this operation occurs once for every character transmitted by the subscriber, the counter 217 compiles a cumulative record of the number of transmitted characters.

Until such time as the perforator 151 can prepare sufficient tape, that portion of the tape between the perforator and the transmitter is drawn taut so that the shortened loop of tape 315 keeps the tape lever 316 elevated sufficiently to maintain the contact 317 open. As soon as the tape loop 315 lengthens sufficiently to close contact 317, a circuit is prepared for energizing the left hand winding of relay 299. This circuit may be traced from positive battery through resistance 301, interrupter 318, the right hand break contact of relay 319, the second left hand break contact of relay 321, the sixth right hand break contact of relay 322, the sixth right hand break contact of relay 323, the sixth right hand break contact of relay 324, conductor 6 of cable 325, right hand break contact of relay 326, contact 317, the left hand winding of relay 299 and the winding of the stepping magnet 303 of the tape transmitter 152 to ground. The two windings of relay 299 are differentially arranged so that when both are energized the relay is not operated. Consequently, when the interrupter 318 closes the described circuit, the left hand winding of relay 299 is energized to counteract the effect of the right hand winding and thereby release the relay. Subsequent closures of the described circuit by the interrupter 318 result in the simultaneous energization of both windings of relay 299, the right hand winding now being energized through the right hand make contact in parallel with contact 317. For each closure of this circuit the stepping magnet 303 of the tape transmitter 152 is energized to step the tape character-by-character through the transmitter. Preferably this stepping action is more rapid than that occurring under the control of the local multiplex apparatus when the subchannel is entered.

Since the first few of these characters perforated in the tape which is stepped through the transmitter are blanks, that is, all signal impulses spacing, the tongues of the tape transmitter are maintained in connection with the spacing bus bar S. These connections are maintained when the pins are withdrawn for stepping purposes under the control of the stepping magnet 303. In this specification, when referring to the B multiplex channel, a distinction is made between "blank" and "normal" characters. A "blank" character may be defined as one comprising an all-spacing signal combination; a "normal" character may be defined as one having one or more marking impulses in the combination. The blank characters which are perforated in the tape 315 are stepped through the transmitter by means of the described local circuit and are not transmitted over the multiplex line circuit.

As soon as the first normal character is stepped into the transmitter and the pins are released to engage the tape, one or more of the transmitter tongues will be moved into contact with the marking bus bar M. A circuit is thus completed from positive battery, through resistances 327 and 328, for example, and the upper transmitter tongue and marking bus bar M, through resistance 329 to the grid of a vacuum tube 330. Normally there is connected to the grid of this tube only negative potential through a resistance 331 which is effective to render the tube non-conducting. However, the positive potential which is applied through resistance 329 is of a sufficient value to initiate conduction of space current in the tube which is drawn from positive battery through resistance 332 and the left hand winding of relay 321, thereby operating the relay. A condenser 333 is provided to furnish sufficient delay in the disabling of the tube 330 to permit the momentary disconnections of the transmitter tongues from the marking bus bar during tape stepping operations.

The operation of relay 321 opens the local tape stepping circuit controlled by the interrupter 318 at its second left hand break contact. Also, the closure of the first left hand make contact of this relay completes a circuit from ground through the left hand winding of relay 326 and the left hand break contact of relay 319 to negative battery. The local tape stepping circuit is thus opened at a second point at the break contact of relay 326. Further stepping of the tape to the transmitter is prevented until such time as the subchannel apparatus is connected to the multiplex circuit in a manner which is to be described in the section entitled "Sending switching signaling."

It should be kept in mind that the operations of the subchannel apparatus covered in this section of the specification occur at the time of some preliminary operations of the coding mechanism and the code transmitting apparatus. These features are covered in the following section of the specification.

SENDING CODE SWITCH

While the operations of the subchannel apparatus described in the preceding section of the specification are occurring, the code switch 153 is stepped to a position which is effective to set up a part of the code used in the switching signaling to be described in the section of the specification entitled "Sending switching signaling." This stepping operation is initiated by the operation of relay 127. It may be well to examine the conditions existing just prior to the operation of this relay in response to a calling signal sent by a subscriber.

One terminal of the stepping magnet 334 of switch 153 is connected to battery. The other terminal is connected through interrupter contacts 335 to a junction point 336. This point is connected in multiple to the first right hand make contacts of all relays corresponding to relays 127 and 128. At times when any one of these relays is operated by reason of the busy condition of the subchannel with which it is associated or by reason of the operation of one of these relays in response to a call initiated by a subscriber desiring a connection to a subchannel, the circuit is further extended to the third right hand break contact of the associated relay corresponding to relays 129 and 131. If the relay corresponding to 127 is operated by reason of a busy condition of the associated subchannel, the associated relay corresponding to relay 129 is also operated and the described circuit is open. If one of the relays corresponding to 127 is operated by reason of a response to a subscriber's call, the associated relay corresponding to relay 129 is not operated at this time and the circuit is further extended to a junction point 337. This point is connected in multiple to the third right hand armatures of all of the relays corresponding to relays 129 and 131. If the subchannel with which one of these relays is associated is connected to a subscriber, the relay corresponding to relay 129 will be operated and the point 337 will be connected through the third right hand make contact of the relay to a conductor corresponding to conductor 338. If the relay corresponding to 129 is not operated and the subchannel with which it is associated is not the one selected for connection to the calling subscriber, the relay corresponding to relay 127 will not be operated and the circuit from the point 337 will be extended through the third right hand break contact of the relay corresponding to relay 129, to the first right hand break contact of the associated relay corresponding to relay 127 and over the conductor corresponding to conductor 338 to a contact of the third contact bank of the code switch 153. Each of the contacts of this bank of the switch is connected to relays corresponding to relays 127 and 129 for the other subchannels. Also, the junction point 337 is connected by conductor 339 to one terminal of the winding of a relay 340. The other terminal of the winding of this relay is connected to ground. When the point 337 is connected to one of the contacts of the third bank of the code switch 153, it is connected to ground by means of the wiper 341 of this switch and the third left hand break contact of relay 342. Consequently, as long as ground is connected to the point 337, relay 340 is prevented from operating.

If the same conditions are assumed as in the preceding section of the specification, relays 127, 129, 128 and 131 are not operated. It is also assumed that the wipers of the code switch 153 are engaged with contacts other than their first bank contacts. For example, assume that the wipers of this switch are standing in such positions that wiper 341 is engaged with bank contact 343. At this time relay 127 operates in response to a call from subscriber 1 of group I. Relay 145 is operated in the manner described to connect the calling subscriber with subchannel 1.

In addition, the operation of relay 127 completes a circuit from battery through the winding 334 of the stepping magnet of the code switch 153, the interrupter contacts 335, to point 336 and thence over conductor 344, the first right hand make contact of relay 127, the third right hand break contact of relay 129 to point 337 and thence through the third right hand break contact of relay 131, the first right hand break contact of relay 128, conductor 345, contact 343 and wiper 341 of switch 153 and the third left hand break contact of relay 342 to ground. The stepping magnet 334 is thus energized and advances the wipers of the code switch 153 one step. The engagement of the wiper 341 with contact 346 connects ground from the contact of relay 342 to conductor 338. Since relay 127 is operated and relay 129 is not operated, this ground is prevented from reaching the junction point 337, thereby preventing the operation of the stepping magnet 334. This also removes the short circuit from the winding of relay 340. This relay is operated by means of a circuit which extends from battery through the winding of the stepping magnet 334, interrupter contacts 335, conductor 344, the first right hand make contact of relay 127, the third right hand break contact of relay 129, conductor 339, and the winding of relay 340 to ground. The current which is permitted to flow in this circuit is insufficient to completely energize the stepping magnet 334 but is sufficient to operate relay 340. The operation of this relay is effective to initiate a series of operations of the stepping switches 165 and 166, together with auxiliary relay apparatus for the transmission of the switching signals to the receiving station in order to effect at that station switching operations similar to those already described at the transmitting station for the connection of the subscriber's receiving apparatus to the system. These functions of the apparatus are described in the following section of the specification.

SENDING SWITCHING SIGNALING

Each character sent over the multiplex portion of the system consists of five impulses. When the A multiplex channel is used for switching signaling purposes, the first impulse of each character is utilized for a system control purpose which will be described in the section of the specification entitled "Automatic system control." The remaining four impulses of each character are used to convey the information necessary to perform the switching functions. In order to identify the selected subchannel, the group in which the subscriber connected to that subchannel is located and the particular subscriber within the group, three characters are transmitted over the A multiplex channel. In accordance with the following table the four impulses of the first character are used to identify the selected subchannel. The first two impulses of the second character are used to identify the subscriber group. The last two impulses of the second character and the four impulses of the third character are used to identify the subscriber.

TABLE 1

| Impulses — | Char. 1 | Char. 2 | Char. 3 |
|---|---|---|---|
| | 2 3 4 5 | 2 3 4 5 | 2 3 4 5 |
| | Subchannel | Group | Subscriber |

Each subchannel may be identified according to a code comprising four impulses of either marking or spacing conditions. In the instant disclosure the coding of the subchannels is in accordance with the following table. Marking conditions are designated by the letter M and spacing conditions by the letter S.

TABLE 2

*Character 1*

| Impulses | 2 | 3 | 4 | 5 |
|---|---|---|---|---|
| Subchannel: | | | | |
| 1 | M | S | S | S |
| 2 | S | M | S | S |
| 3 | M | M | S | S |
| 4 | S | S | M | S |
| 5 | M | S | M | S |
| 6 | S | M | M | S |
| 7 | M | M | M | S |
| 8 | S | S | S | M |
| 9 | M | S | S | M |
| 10 | S | M | S | M |
| 11 | M | M | S | M |
| 12 | S | S | M | M |
| 13 | M | S | M | M |
| 14 | S | M | M | M |
| 15 | M | M | M | M |

The identity of the subscriber group is determined by the coding of the first two impulses of the second character in accordance with the following table:

TABLE 3

*Character 2*

| Impulses | 2 | 3 |
|---|---|---|
| Group: | | |
| I | S | S |
| II | M | S |
| III | S | M |
| IV | M | M |

The subscriber identity is determined herein in accordance with the coding of the fourth and fifth impulses of the second character, and the second, third, fourth and fifth impulses of the third character. The code used in this disclosure for this purpose is in accordance with the following table:

TABLE 4

| | Character 2 | | Character 3 | | | |
|---|---|---|---|---|---|---|
| Impulses | 4 | 5 | 2 | 3 | 4 | 5 |
| Subscriber: | | | | | | |
| 1 | M | S | S | M | S | S |
| 2 | M | S | S | S | M | S |
| 3 | M | S | S | M | M | S |
| 4 | M | S | S | S | S | M |
| 5 | M | S | S | M | S | M |
| 6 | M | S | S | S | M | M |
| 7 | M | S | S | M | M | M |
| 8 | S | M | S | M | S | S |
| 9 | S | M | S | S | M | S |
| 10 | S | M | S | M | M | S |
| 11 | S | M | S | S | S | M |
| 12 | S | M | S | M | S | M |
| 13 | S | M | S | S | M | M |
| 14 | S | M | S | M | M | M |
| 15 | M | M | S | M | S | S |
| 16 | M | M | S | S | M | S |
| 17 | M | M | S | M | M | S |
| 18 | M | M | S | S | S | M |
| 19 | M | M | S | M | S | M |

Table 4—Continued

| Impulses | Character 2 | | Character 3 | | | |
|---|---|---|---|---|---|---|
| | 4 | 5 | 2 | 3 | 4 | 5 |
| Subscriber—Continued | | | | | | |
| 20 | M | M | S | S | M | M |
| 21 | M | M | S | M | M | M |
| 22 | S | S | M | M | S | S |
| 23 | S | S | M | S | M | S |
| 24 | S | S | M | M | M | S |
| 25 | S | S | M | S | S | M |
| 26 | S | S | M | M | S | M |
| 27 | S | S | M | M | M | M |
| 28 | M | S | M | M | S | S |
| 29 | M | S | M | S | M | S |
| 30 | M | S | M | S | S | M |
| 31 | M | S | M | M | M | M |
| 32 | M | S | M | S | M | M |
| 33 | M | S | M | M | M | M |
| 34 | M | S | M | M | M | M |
| 35 | S | M | M | M | S | S |
| 36 | S | M | M | S | M | S |
| 37 | S | M | M | M | M | S |
| 38 | S | M | M | S | S | M |
| 39 | S | M | M | M | S | M |
| 40 | S | M | M | S | M | M |
| 41 | S | M | M | M | M | M |
| 42 | M | M | M | M | S | S |
| 43 | M | M | M | S | M | S |
| 44 | M | M | M | M | M | S |
| 45 | M | M | M | S | S | M |
| 46 | M | M | M | M | S | M |
| 47 | M | M | M | S | M | M |
| 48 | M | M | M | M | M | M |

Contact banks 4, 5 and 6 of the code switch 153 and relay 154 are controlled in accordance with the selected subchannel to set up coded electrical conditions on the bank contacts of the switch 165. Relays 155 and 156 are controlled in accordance with the identity of the group in which the calling subscriber is located to set up coded electrical conditions upon the bank contacts of the switch 165. Relays 157, 158, 159, 161, 162 and 163 are controlled in accordance with the identity of the calling subscriber and also set up coded electrical conditions on the bank contacts of switch 165.

At suitable times the wipers of switch 165 are stepped over their associated bank contacts under the control of the local rings SLR of the multiplex distributor. The electrical conditions on the bank contacts of switch 165 are applied at suitable times to the A multiplex channel storage relays 167 to 171, inclusive. These relays are thus operated in various combinations in accordance with the coded conditions applied thereto at times when the transmission of normal message characters over the A multiplex channel is interrupted. The contacts of the storage relays apply marking and spacing signaling conditions to segments 1 to 5 of the multiplex transmitting distributor MTR. These conditions comprise what is termed a "pattern" signal and are later sent over the line L when the brush B3 crosses these segments. Upon the connection of the A multiplex channel to the line L following the transmission of a pattern signal, a signal which is termed herein a "confirmation" signal is transmitted. The confirmation signal is related to its corresponding pattern signal in such a manner that for every marking condition present in the pattern signal a spacing signal is present in the corresponding portion of the confirmation signal. Also, impulses of the pattern signal which are spacing become marking impulses in the confirmation signal.

Following the transmission of the pattern and confirmation signals identifying the selected subchannel, the subscriber group and the particular subscriber in the group, the transmission of normal message characters over the A multiplex channel is resumed while the switch 165 is stepped over its bank contacts until it reaches the first of a group of contacts associated with the subchannel apparatus. In the present embodiment of the invention the 15 subchannels are divided into 3 groups of 4 and 1 group of 3 subchannels for the purpose of the switching signaling operations. Each subchannel in a group of 4 is associated with one of the 4 character impulses. An active subchannel is represented by a marking condition, and an inactive subchannel is represented by a spacing condition of its character impulse. Consequently, by the marking and spacing conditions of one character, the status of 4 subchannels may be designated. The subchannel apparatus sets up electrical conditions on other bank contacts of the switch 165 which, when reached by the associated wipers, control the storage relays 167 to 171, inclusive.

The operation of the pattern switch 165 and its associated apparatus is controlled by instrumentalities employed to detect any desired change in the system. The corresponding switching apparatus located at the receiving station is started and stopped under the control of signals sent from the transmitting station. These signals are sent over the B multiplex channel over which normal message traffic is momentarily interrupted. When a switching operation is to be performed, a blank or all-spacing signal character is sent over the B multiplex channel. This signal is generated by means responsive to the detecting instrumentalities when a connection or disconnection is to be made. In either case, the transmission of a blank character over the B multiplex channel starts the switching apparatus at the receiving station concurrently with that at the transmitting station. After the switches have been started, when a pattern signal is to be transmitted over the A multiplex channel, a blank character is transmitted over the B multiplex channel on the immediately preceding revolution of the multiplex distributor. On the revolution of the multiplex distributor following that in which the pattern signal is transmitted, another blank character is transmitted over the B multiplex channel. This, of course, will occur on the same revolution as that during which the confirmation signal is transmitted. The purpose of the second blank transmitted over the B multiplex channel is to guard against a condition whereby the first blank is not received. The manner in which this sequence of operations serves to stop the entire system is fully described in the copending case of Pierson et al. referred to.

For switching signaling purposes the apparatus is divided into groups. Switching signaling apparatus groups 1, 2 and 3 comprise the apparatus of Figs. 8 and 9 in accordance with Table 1 corresponding respectively to characters 1, 2 and 3 of this table. Switching signaling apparatus group 4 includes the apparatus of Fig. 12 which is used for a system control purpose to be considered in the section of the specification entitled "Supervisory system control." Switching signaling apparatus groups 5, 6, 7 and 8 comprise the 4 groups of subchannel apparatus.

A change in the status of the system may be indicated in any of the switching signaling apparatus groups. An indication that a change is to be made is detected by a vacuum tube 349 which is thereby conductively conditioned to operate a relay 351. The operation of this relay in conjunction with one of the segments of the local rings SLR of the multiplex distributor starts the stepping action of switches 165 and 166. Segments 352, 353, 354, 355 and 356 of the multiplex local rings control the operations of the switching signaling apparatus in a manner to be described. Relay 357 responds to the switching signaling apparatus common test which operates relay 351 and also to individual switching signaling apparatus group tests which are made as the switches 165 and 166 step over their bank contacts. Relay 357 interrupts the stepping of one of the subchannel transmitters and prepares for the transmission of a blank character on the B multiplex channel. This signal is set up on the B multiplex channel bank of storage relays including relays 172 to 176 by relay 358. Relay 359 switches the A multiplex channel from the subchannel transmitters to the switching signaling apparatus for the transmission of pattern and confirmation signals. Relay 361 switches the stepping circuits of switch 166 and also controls the stepping of one of the subchannel transmitters associated with the A multiplex channel. Relay 362, when operated, causes the temporary interruption of the stepping operations of switches 165 and 166. Relay 363 operates at times to generate an impulse for the possible operation of relay 357 if a switching signaling apparatus group test is completed. Relay 364 operates to condition the switching signaling apparatus for the generation of switching signals. Relay 365, when operated, connects the apparatus of sub-channel 1 to the mixer.

A typical series of operations of the switching signaling apparatus is set out in Table 5 which follows. The operations shown in this table are for one of a number of possible complete series of steps of the switches 165 and 166 over their bank contacts. Such a series of steps is taken every time a change is to be made in the system. In the table are listed the operations, if any, which occur as the brushes B4 and B5 engage their associated segments on successive revolutions of the multiplex distributor apparatus. Some of these operations include the stepping of the switches 165 and 166, the positions of which at all times are indicated in the table. Also, the type of signals which are transmitted over the A and B multiplex channels on successive revolutions of the distributor apparatus is indiciated. When considering the B multiplex channel, a distinction is made between blank and normal characters in accordance with the foregoing definitions. On the A multiplex channel, however, distinction is made between pattern and confirmation signals on the one hand and any regular signals on the other hand. Thus, in the table, in the B multiplex channel column "N" represents a normal character, and "B" represent a blank character. In the A multiplex channel column of this table pattern and confirmation signals are so identified, and "R" represents any regular signal. This may be either a normal character or a blank character in the sense that these terms are used in connection with the B multiplex channel.

A detailed description of the circuits involved in the operation of the switching signaling apparatus will be given for the first few revolutions of the multiplex distributor apparatus. Inasmuch as this apparatus, after starting on a cycle of operations, is designed to function according to a definite prearranged plan, it is believed to be unnecessary to fully describe the operating circuits for each revolution of the multiplex distributor apparatus, because the principal differences in the circuits are the particular bank contacts of the switches 165 and 166 used. Table 5 may be used as a guide in following the operations of the switching signaling apparatus to be described.

TABLE 5

| Rev. | Seg. | Operations | Mux. chan. A | Mux. chan. B | Position 165 | Position 166 |
|---|---|---|---|---|---|---|
| 1 | 352 | None | R | | 1 | |
|   | 353 | ---do--- | | N | 1 | |
|   | 354 | ---do--- | | | | |
|   | 355 | Operate 357 (common test) | | | | |
|   | 356 | Operate 358 | | | | 1 |
| 2 | 352 | Release 357 | R | | 1 | |
|   | 353 | Operate 361, 359 | | B | 1 | |
|   | 354 | Release 358 | | | | |
|   | 355 | Step 166 | | | | |
|   | 356 | Step transmitter | | | | 2 |
| 3 | 352 | Step 165 | Pat. (guard) | | 1 | |
|   | 353 | Release 361, 359—pulse 363 to operate 357 (group test) | | N | 2 | |
|   | 354 | None | | | | |
|   | 355 | Step 166 | | | | 2 |
|   | 356 | Operate 358 | | | | 3 |
| 4 | 352 | Release 357—step 165 | R | | 2 | |
|   | 353 | Operate 361, 359 | | B | 3 | |
|   | 354 | Release 358 | | | | |
|   | 355 | Pulse 364 to operate 342 to operate 157, 161, 129 to release 340—step 166 | | | | 3 |
|   | 356 | Step transmitter | | | | 4 |
| 5 | 352 | Step 165 | Pat. (char. 1) | | 3 | |
|   | 353 | Operate 357 | | N | 4 | |
|   | 354 | None | | | | |
|   | 355 | Operate 362 | | | | 4 |
|   | 356 | Operate 358 | | | | 4 |
| 6 | 352 | Release 357 | Conf. (char. 1) | | 4 | |
|   | 353 | Release 361, 359—pulse 363 to operate 357 (group test) | | B | 4 | |
|   | 354 | Release 358 | | | | |
|   | 355 | Release 362—step 166 | | | | 4 |
|   | 356 | Operate 358 | | | | 5 |
| 7 | 352 | Release 357—step 165 | R | | 4 | |
|   | 353 | Operate 361, 359 | | B | 5 | |
|   | 354 | Release 358 | | | | |
|   | 355 | Pulse 364—step 166 | | | | 5 |
|   | 356 | Step transmitter | | | | 6 |

TABLE 5—Continued

| Rev. | Seg. | Operations | Mux. chan. | | Position | |
|---|---|---|---|---|---|---|
| | | | A | B | 165 | 166 |
| 8 | 352 | Step 165 | Pat. (char. 2) | | 5 | |
| | 353 | Operate 357 | | N | 6 | |
| | 354 | None | | | | |
| | 355 | Operate 362 | | | | 6 |
| | 356 | Operate 358 | | | | 6 |
| 9 | 352 | Release 357 | Conf. char. 2) | | 6 | |
| | 353 | Release 361, 359—pulse 363 to operate 357 (group test) | | B | 6 | |
| | 354 | Release 358 | | | | |
| | 355 | Release 362—step 166 | | | | 6 |
| | 356 | Operate 358 | | | | 7 |
| 10 | 352 | Release 357—step 165 | R | | 6 | |
| | 353 | Operate 361, 359 | | B | 7 | |
| | 354 | Release 358 | | | | |
| | 355 | Pulse 364—step 166 | | | | 7 |
| | 356 | Step transmitter | | | | 8 |
| 11 | 352 | Step 165 | Pat. (char. 3) | | 7 | |
| | 353 | Operate 357 | | N | 8 | |
| | 354 | None | | | | |
| | 355 | Operate 362 | | | | 8 |
| | 356 | Operate 358 | | | | 8 |
| 12 | 352 | Release 357 | Conf. (char. 3) | | 8 | |
| | 353 | Release 361, 359—pulse 363 (group test) | | B | 8 | |
| | 354 | Release 358 | | | | |
| | 355 | Release 362—step 166 | | | | 8 |
| | 356 | Step transmitter | | | | 9 |
| 13 | 352 | Step 165 | R | | 8 | |
| | 353 | None | | N | 9 | |
| | 354 | ____do____ | | | | |
| | 355 | Step 166 | | | | 9 |
| | 356 | Step transmitter | | | | 10 |
| 14 | 352 | Step 165 | R | | 9 | |
| | 353 | None (group test) | | N | 10 | |
| | 354 | None | | | | |
| | 355 | Step 166 | | | | 10 |
| | 356 | Step transmitter | | | | 11 |
| 15 | 352 | Step 165 | R | | 10 | |
| | 353 | None | | N | 11 | |
| | 354 | ____do____ | | | | |
| | 355 | Step 166 | | | | 11 |
| | 356 | Step transmitter | | | | 12 |
| 16 | 352 | Step 165 | R | | 11 | |
| | 353 | Operate 357 (group test) | | N | 12 | |
| | 354 | None | | | | |
| | 355 | Step 166 | | | | 12 |
| | 356 | Operate 358 | | | | 13 |
| 17 | 352 | Release 357—step 165 | R | | 12 | |
| | 353 | Operate 361, 359 | | B | 13 | |
| | 354 | Release 358 | | | | |
| | 355 | Pulse 364 to operate 365—step 166 | | | | 13 |
| | 356 | Step transmitter | | | | 14 |
| 18 | 352 | Step 165 | Pat. (cut in) | | 13 | |
| | 353 | Operate 357 | | N | 14 | |
| | 354 | None | | | | |
| | 355 | Operate 362 | | | | 14 |
| | 356 | Operate 358 | | | | 14 |
| 19 | 352 | Release 357 | Conf. (cut in) | | 14 | |
| | 353 | Release 361, 359—pulse 363 (group test) | | B | 14 | |
| | 354 | Release 358 | | | | |
| | 355 | Release 362—step 166 | | | | 14 |
| | 356 | Step transmitter | | | | 15 |
| 20 | 352 | Step 165 | R | | 14 | |
| | 353 | None | | N | 15 | |
| | 354 | ____do____ | | | | |
| | 355 | Step 166 | | | | 15 |
| | 356 | Step transmitter | | | | 16 |
| 21 | 352 | Step 165 | R | | 15 | |
| | 353 | None (group test) | | N | 16 | |
| | 354 | None | | | | |
| | 355 | Step 166 | | | | 16 |
| | 356 | Step transmitter | | | | 17 |
| 22 | 352 | Step 165 | R | | 16 | |
| | 353 | None | | N | 17 | |
| | 354 | ____do____ | | | | |
| | 355 | Step 166 | | | | 17 |
| | 356 | Step transmitter | | | | 18 |
| 23 | 352 | Step 165 | R | | 17 | |
| | 353 | None (group test) | | N | 18 | |
| | 354 | None | | | | |
| | 355 | Step 166 | | | | 18 |
| | 356 | Step transmitter | | | | 19 |
| 24 | 352 | Step 165 | R | | 18 | |
| | 353 | None | | N | 19 | |
| | 354 | ____do____ | | | | |
| | 355 | Step 166 | | | | 19 |
| | 356 | Step transmitter | | | | 20 |

TABLE 5—Continued

| Rev. | Seg. | Operations | Mux. chan. | | Position | |
|------|------|------------|---|---|---|---|
| | | | A | B | 165 | 166 |
| 25 | 352 | Step 165 | R | | 19 | |
| | 353 | None (group test) | | | 20 | |
| | 354 | None | | N | | |
| | 355 | Step 166 | | | | 20 |
| | 356 | Step transmitter | | | | 21 |
| 26 | 352 | Step 165 | R | | 20 | |
| | 353 | Release 349, 351 | | | 21 | |
| | 354 | None | | N | | |
| | 355 | Step 166 | | | | 21 |
| | 356 | Step transmitter | | | | 1 |
| 27 | 352 | Step 165 | R | | 21 | |
| | 353 | None | | | 1 | |
| | 354 | do | | N | | |
| | 355 | None (common test) | | | | 1 |
| | 356 | Step transmitter | | | | 1 |

The foregoing table is made up and the following description is given on the assumption that subscriber 1 of group I is to be connected to subchannel 1, and this subchannel is to be connected by the relay chain mixer for operation over the multiplex circuit. It is also assumed that prior to the initiation of a call from the subscriber the entire system is idle, there being none of the subchannels connected to subscribers' lines or to the multiplex apparatus. It will be seen, however, that this latter assumption is immaterial as far as the operation of the switching signaling apparatus is concerned. It is further assumed that the calling subscriber's line 57 is connected to the apparatus of subchannel 1 by the operations of the subscriber's line finder switch 141 and the relay 145. At this time relay 127 is also operated; the wipers of the code switch 153 have been stepped to the positions shown, and relay 340 is operated. Also, in response to the message signals sent by the subscriber, tape has been prepared and stepped through the transmitter 152 until the first normal character causes the operations of the tube 330 and relays 321 and 326 in the manner described. Further stepping of the tape is prevented for the time being, although additional tape may be in the process of preparation in response to the subscriber's character signals.

The operation of relay 340 connects a ground at the second right hand make contact thereof to conductor 8 of cable 366. This ground is further extended through resistance 367, conductor 6 of cable 366, the third left hand break contact of relay 368, the fourth left hand break contact of relay 364, wiper 369 and contact 371 to the grid of tube 349. Connected between the grid and cathode of this tube is a parallel arrangement of a resistance 372 and a condenser 373. The cathode is connected to ground. It is assumed that a negative charge is stored in condenser 373 sufficient to render the tube non-conductive. This negative charge is placed on the condenser during the preceding operation of switches 165 and 166 in a manner to be described under "Revolution 26" of this section of the specification. The connection of ground to the grid of the tube discharges the condenser and renders the tube conducting to energize relay 351, the winding of which is connected to the anode of tube 349. The operating circuit described for the tube 349 is the so-called switching signaling apparatus common test circuit.

With the wipers of switch 166 in the positions shown, this circuit may also be closed from any one of the groups of switching signaling apparatus. For example, ground may be connected through either resistances 375 or 376 to this circuit from either conductors 11 or 13, respectively, of cable 366. Conductor 11 is connected to the apparatus of each of the subchannels 1, 2, 3 and 4, comprising the first subchannel group, while conductor 13 is connected to the apparatus of subchannels 13, 14 and 15, which comprise the fourth subchannel group. Similar connections are made between the apparatus of the other groups of subchannels and the common test circuit. Whenever a change in the status of the subchannel apparatus is to be made, a ground is connected to one of the common test conductors to condition the switching signaling apparatus for operation.

*Revolution 1.*—On the first revolution of the multiplex distributor apparatus following the operation of relay 351, when brush B4 engages segment 355, a circuit is closed from the positive potential connected to the solid ring through wiper 377 and first bank contact of switch 166, the second break contact of relay 361, conductors 378 and 379, the right hand winding of relay 357, the second right hand break contact of relay 381, the third break contact of relay 382, conductor 383, wiper 384 and first bank contact of switch 166 and the make contact of relay 351 to ground. Relay 357 is operated and locks through its first make contact and left hand winding through resistance 385 to negative battery.

The engagement of brush B4 with segment 356 completes a circuit from positive battery through the second make contact of relay 357, the left hand winding of relay 358 and resistance 386 to ground, thereby causing the operation of the latter relay, which is locked through its first make contact and right hand winding and resistance 387 to negative battery. The contacts of relay 358 control the battery applied to the contacts of relays 172 to 176, inclusive, of the B multiplex channel. Normally, marking impulses are represented by positive polarity and spacing impulses by negative polarity on the B multiplex channel. Negative spacing battery is applied continuously to the second make contacts of relays 172 to 176 directly from the second make contact of relay 358 and is not affected in any way by the position of the second armature of this relay. Positive marking battery is applied to the second breaking contacts of relays 172 to 176 through the second armature and break contact of relay 358. The operation of this relay connects negative spacing battery to both the second make and break contacts of relays 172 to 176. The result of this arrangement is that, irrespective of the operated or non-operated conditions of the bank of storage relays, negative spacing battery is connected to segments 6 to 10 of the B multiplex channel preparatory to transmitting a blank or all-spacing character over this channel on the following revolution of the distributor.

*Revolution 2.*—As the brush B3 crosses segments 1 to 5 of the transmitting ring MTR, a regular character is transmitted over the A multiplex channel. It should be noted that with the idle conditions assumed the character which is transmitted over each of the multiplex channels is the letter "X." It may be seen that conductors 2, 7 and 12 of cables 388 and 388d are connected respectively through the right hand break contacts of relays 389, 391 and 392 to ground. Thus, relays 168, 173 and 178 are operated, and the other relays of the storage banks are not operated. Consequently, on multiplex channels A and C positive spacing battery is connected respectively to segments 2 and 12 of the distributor ring MTR and on the B multiplex channel negative spacing battery is connected to segment 7. It should also be noted that on the A and C multiplex channels positive battery is used for spacing signals and negative for marking signals, while on the B multiplex channel negative battery is used for spacing signals and positive for marking. The character represented by a signal having the first, third, fourth and fifth impulses marking and the second impulse spacing is the letter "X."

While brush B3 is transmitting the regular character "X" over the A multiplex channel, brush B5 engages segment 352 to connect positive battery through wiper 393 and first bank contact of switch 165, and the second left hand break contact of relay 359 to the junction of the left hand winding of relay 357 and the resistance 385. The negative potential which is applied to the relay winding through the resistance thus is neutralized, thereby allowing the relay to release.

While brush B3 of the distributor is crossing segments 6 to 10 to send a blank character over the B multiplex channel, brush B4 engages segment 353 and connects positive battery to wiper 394 and first band contact of switch 166, conductor 395, the third make contact of relay 358, conductor 396, the right hand winding of relay 361, and resistance 397 to negative battery. Relay 361 is operated and connects ground through its first make contact and left hand winding to one terminal of the winding of relay 359, the other terminal of which is connected to resistance 397 and negative battery. However, as long as brush B4 is in contact with segment 353, positive potential is also maintained on this terminal of the winding of relay 359. As soon as the brush leaves the segment, this relay is operated in series with the left hand winding of relay 361. The operation of relay 359 transfers the operating circuits of the A multiplex channel bank relays 168 to 171, inclusive, from the relay chain mixer to the wipers of the pattern switch 165. It also transfers the operating circuit of relay 167 from the mixer to the left hand break contact of relay 403.

The engagement of brush B5 with segment 354 connects positive battery to one terminal of the right hand winding of relay 358. This connection neutralizes the negative battery also connected to this winding through resistance 387 and allows the relay to release.

At the same time, brush B4 engages segment 355 to connect positive battery through wiper 377 and first bank contact of switch 166, the second make contact of relay 361, conductors 398 and 399, the winding of the stepping magnet 400 of switch 166 and resistance 401 to negative battery. The stepping magnet 400 is thus energized to prepare for the stepping of the wipers of switch 166 to their second bank contacts as soon as the winding of the stepping magnet is deenergized upon the disengagement of brush B4 of segment 355.

The engagement of brush B4 with segment 356 connects positive battery through the second break contact of relay 357 to the relay chain mixer, but this battery is ineffective to cause the stepping of any of the subchannel transmitters, since none of the chain relays is operated at this time.

*Revolution 3.*—As the brush B3 crosses segments 1 to 5 of the A multiplex channel, a character signal which is termed herein the pattern signal of the "guard" character is transmitted. The bank relays 167 to 171 are set in the proper combination to transmit this guard character by reason of their connections through the right hand make contacts of relay 359 to conductors 1 to 5 of cable 402. Conductor 1 is connected to ground through the left hand break contact system control function to be described in the section of the specification entitled "Automatic system control." Thus relay 167 is operated. Conductors 2, 3, 4 and 5 of cable 402 are connected respectively to wipers 404, 405, 406 and 407 of the pattern switch 165. Wipers 405 and 407 are in engagement with their first bank contacts, thereby connecting ground to conductors 3 and 5 of cable 402 to operate bank relays 169 and 171. Relays 168 and 170 are unoperated.

The pattern signal of the guard character thus transmitted identifies this particular system and is invariably transmitted at the beginning of the transmission of switching signals. The system which is operated over the line L in the reverse direction is identified by its particular guard character, which preferably differs from the one described. Thus, the character here considered is the letter "R" in which the second and fourth impulses are marking and the first, third and fifth impulses are spacing. Subsequent references to the first impulses of the pattern and confirmation signals will be omitted since they are usually spacing except in the special instance referred to in the preceding paragraph.

While this guard character is being transmitted, brush B5 engages segment 352 to connect positive battery through wiper 393 and first bank contact of switch 165, the second left hand make contact of relay 359, conductors 408 and 409, the winding of the stepping magnet 410 of switch 165, and resistance 385 to negative battery. As soon as the brush becomes disengaged from this segment, the wipers of switch 165 are advanced to their second bank contacts.

While brush B3 is crossing segments 6 to 10 to transmit a normal character, which in this case is the lteter "X," over the B multiplex channel, brush B4 engages segment 353 to connect positive battery through wiper 394 and second bank contact of switch 166 and the winding of relay 363 to the junction of resistance 397 and the winding of relay 359, thereby neutralizing the effect of the negative battery connected to resistance 397 to release relays 359 and 361. At the same time, relay 363 is operated momentarily as long as the brush remains connected to segment 353 and connects, through its make contact, positive battery over conductor 379, the right hand winding of relay 357, the second right hand break contact of relay 381, the third break contact of relay 382, conductor 383, wiper 384 and second bank contact of switch 166, conductor 6 of cable 366, the third left hand break contact of relay 368, the fourth break contact of relay 364, wiper 369 and second bank contact of switch 166, conductor 8 of cable 366 and the second make contact of relay 340 to ground. Thus, the first switching signaling apparatus group test is made and completed to operate relay 357, which locks through its first make contact and left hand winding in the manner described under "Revolution 1."

The engagement of brush B5 with segment 354 produces no result at this time.

The engagement of brush B4 with segment 355 connects positive battery through wiper 377 and second bank contact of switch 166, conductor 399, winding 400 of the stepping magnet of this switch and resistance 401 to negative battery. Thus, as soon as brush B4 becomes disengaged from this segment, the wipers of switch 166 are advanced to their third bank contacts.

The engagement of brush B4 with segment 356 operates relay 358 in the manner described under "Revolution 1" and thereby prepares for the transmission of a blank character on the B multiplex channel on the next revolution of the distributor brushes in response to the completion of the first switching signaling apparatus group test described.

*Revolution 4.*—While brush B3 is sending a regular character, which in this case is the letter "X," over the A multiplex channel, brush B5 engages segment 352 to connect positive battery through wiper 393 and second bank contact of switch 165, conductors 408 and 409, the winding of the stepping magnet 410 of switch 165 to the junction of the left hand winding of relay 357 and resistance 385. The effect of the negative battery connected to this resistance is thereby neutralized and relay 357 is released. After the disengagement of brush B5 from the segment 352, the wipers of switch 165 are stepped to their third bank contacts.

While a blank character is being transmitted over the B multiplex channel by the engagement of brush B3 with segments 6 to 10 of the transmitting rings MTR, brush B4 engages segment 353 to connect positive battery through wiper 394 and third bank contact of switch 166 to operate relays 361 and 359 in the manner described under "Revolution 2."

The engagement of brush B5 with segment 354 releases relay 358 in the manner described under "Revolution 2."

The engagement of brush B4 with segment 355 connects positive battery through wiper 377 and third bank contact of switch 166, the fourth make contact of relay 361, the winding of relay 364, conductor 399, the winding of stepping magnet 400 of switch 166 and resistance 401 to negative battery. Relay 364 is thus energized for the duration of the engagement of brush B4 with segment 355.

A circuit is closed from negative battery through the third make contact of relay 364, wiper 411 and third bank contact of switch 166, conductor 1 of cable 366, the right hand winding of relay 342, the first make contact of relay 340 and the first break contact of relay 296 to ground. Relay 342 is operated and locked by a circuit extending from negative battery through wiper 412 and third bank contact of switch 165, the first make contact and left hand winding of relay 342, wiper 413 and first bank contact of the code switch 153, the second make contact and right hand winding of relay 127, the left hand winding of relay 129, conductor 414, the fourth right hand make contact of relay 145 and resistances 415 and 416 to positive battery. Thus, relay 129 is operated and relay 127 is prevented from releasing. The operation of relay 129 opens at its third right hand break contact the operating circuit for relay 340 which releases. The operation of relay 342 also completes a circuit at its second make contact from positive battery through wiper 417 and first bank contact of switch 153, conductor 418, the second right hand make contact of relay 145, wiper 419 and first bank contact of switch 141, conductor 1 of cable 421 to a junction point 422. This is the junction point of two rectifiers 423 and 424. One branch of the described circuit continues through rectifier 423, over conductor 425 and through the left hand winding of relay 157 to ground. The other branch of the circuit continues through the rectifier 424, over conductor 426 and through the left hand winding of relay 161 to ground.

The operations of relays 342, 157 an 161 set up a series of codes on the bank contacts of the pattern switch 165 preparatory to the transmission of the first three switching signals identifying the selected subchannel, the group in which the calling subscriber is located and the number of the subscriber in the group. It should be noted that none of the relays 154, 155 or 156 is operated at this time. It is contemplated, however, that these relays are to be operated in various combinations in accordance with Tables 2 and 3 when other subchannels are selected and/or when the calling subscriber is located in groups other than the one chosen for the purpose of illustrating the operation of the system. Similarly, relays 157, 158 and 159 and relays 161, 162 and 163 are operated in various combinations in accordance with Table 4 when different numbered subscribers initiate a call. The conductors of cable 421 are multipled to the bank contacts of all switches such as 141, 142, 143 and 144 in the manner shown for these switches. The associated wipers will be standing on a bank contact which corresponds to the identity of the calling subscriber at the time when relay 342 is operated. Consequently, positive battery will be connected over one of the conductors of cable 421 through a predetermined junction point of a pair of rectifiers such as 423 and 424, from which point one branch of the circuit extends to the group of relays 157 to 159 and the other branch to the group of relays 161 to 163.

Upon the disengagement of brush B4 from segment 355 the wipers of switch 166 are stepped to their fourth bank contacts. Following this operation brush B4 engages segment 356 which completes a circuit to step one of the subchannel transmitters connected to the relay bank of the B multiplex channel if such a connection exists. In the present case, however, the system being idle, nothing happens at this time.

*Revolution 5.*—Prior to the time the brush B3 starts to traverse segments 1 to 5 of the transmitting rings MTR, relays 167 to 171 are set in a combination determined by the first character of the switching signals in accordance with Table 2. Subchannel 1 is identified in this table by a character having the second impulse marking and the third, fourth and fifth impulses spacing. It is seen that relay 168 is connected through the fourth right hand make contact of relay 359 to conductor 2 of cable 402, wiper 404 and third bank contact of switch 165, conductor 1 of cables 427 and 427a to the second bank contact associated with wiper 428 of the code switch 153. Since wiper 428 is engaged with its first bank contact, the circuit is not completed and relay 168 remains deenergized to set up a marking condition on segment 2 of the transmitting ring. Relays 169 and 170 are connected respectively through the third and second right hand make contacts of relay 359, conductors 3 and 4 of cable 402, wipers 405 and 406 and third bank contacts of switch 165, conductors 3 and 5 of cable 427, the first bank contacts and wipers 429 and 431 and the fifth and sixth make contacts of relay 342 to ground. Thus relays 169 and 170 are operated to set up spacing conditions on segments 3 and 4 of the transmitting rings. Relay 171 is connected through the first right hand make contact of relay 359, conductor 5 of cable 402, wiper 407 and third bank contact of switch 165, conductor 7 of cables 427 and 427a and the break contact of relay 154 to ground. Thus relay 171 is also operated to set up a spacing condition on segment 5 of the transmitting rings. It is seen therefore that a signal in accordance with the code of Table 2 is set up on the A channel of the multiplex system.

While brush B3 is crossing segments 1 to 5 of the transmitting rings, brush B5 engages segment 352 to energize the stepping magnet 410 of switch 165 in the manner described under "Revolution 3," the only difference being that wiper 393 of switch 165 is engaged with its third bank contact and the circuit this time does not include the second left hand make contact of relay 359. Thus, after the disengagement of brush B5 from segment 352, the wipers of switch 165 are stepped to their fourth bank contacts.

The engagement of brush B4 with segment 353 connects positive battery through wiper 394 and fourth bank contact of switch 166, the first left hand break contact of relay 362, the first left hand make contact of relay 359, the left hand winding of relay 357 and resistance 385 to negative battery, thereby operating relay 357.

The engagement of brush B5 with segment 354 produces no result at this time.

The engagement of brush B4 with segment 355 connects positive battery through wiper 377 and fourth bank contact of switch 166, the third left hand make contact of relay 361, the left hand winding of relay 362 and resistance 386 to ground. It will be noted that the stepping magnet 400 of switch 166 is not energized at this time, thereby preventing the wipers of the switch from stepping, but instead relay 362 is operated. This relay locks through its right hand make contact and right hand winding to negative battery through resistance 401.

The engagement of wiper B4 with segment 356 operates relay 358 through the second left hand make contact of relay 357 in the manner described under "Revolution 1."

*Revolution 6.*—At the time the distributor brushes are about to make the sixth traverse of the rings, switches 165 and 166 have been advanced so that their wipers are engaged with their fourth bank contacts. Storage bank relays 168 to 171 for the A multiplex channel are connected by means of wipers 404, 405, 406 and 407 of switch 165 to the coding apparatus. Where one of these wipers on the preceding revolution of the multiplex distributor was connected to ground, it is now disconnected therefrom; and the wipers of the switches which, on the preceding revolution, were not connected to ground are at this time connected thereto at the coding apparatus. For example, wiper 404, through its connection with its fourth bank contact and conductor 2 of cables 427 and 427a, is connected through the first bank contact and wiper 428 of switch 153 and the fourth make contact of relay 342 to ground. Also, wipers 405, 406 and 407 are connected respectively to conductors 4, 6 and 8 of cables 427 and 427a which are open between the bank contacts of switch 165 and wipers 429 and 431 of switch 153 and the make contacts of relay 154 respectively. Consequently, relay 168 is operated to set up a spacing impulse on segment 2 and relays 169, 170 and 171 are not operated to set up marking impulses on segments 3, 4 and 5 of the transmitting rings. Thus, it is seen that this combination is the reverse of the signal combination sent over this channel on the preceding revolution. Such a signal is the confirmation signal previously referred to and is sent over the A multiplex channel by the passage of brush B3 over the segments 1 to 5 of the transmitting rings TR.

While the confirmation signal for the first of the switching signaling apparatus groups is being sent, brush B5 engages segment 352 to close a circuit from positive battery, through wiper 393 and fourth bank contact of switch 165, second left hand make contact of relay 362 to the junction of the left hand winding of relay 357 and resistance 385, thereby neutralizing the negative battery connected thereto and releasing relay 357. It will be noted that the stepping magnet 410 of switch 165 is not energized at this time, thereby preventing the wipers of this switch from stepping.

While brush B3 is traversing segments 6 to 10 of the transmitting rings to send a blank character over the B multiplex channel, brush B4 engages segment 353 to close a circuit for the release of relays 359 and 361 and to momentarily operate relay 363. In this case, the circuit includes wiper 394 and the fourth bank contact of switch 166 and the first left hand make contact of relay 362. The closure of the make contact of relay 363 prepares relay 357 for a switching signaling apparatus group test which, in this instance, is completed resulting in the operation of relay 357. The test circuit may be traced from battery through the make contact of relay 363, conductor 379, the right hand winding of relay 357, the second right hand break contact of relay 361, the third left hand break contact of relay 362, conductor 383, wiper 394 and fourth bank contact of switch 166, conductor 6 of cable 366, the third left hand break contact of relay 368, the fourth left hand break contact of relay 364, wiper 369 and fourth bank contact of switch 166, conductor 9 of cable 366 and the third make contact of relay 342 to ground.

The engagement of brush B5 and segment 354 releases relay 358 in the manner described under "Revolution 2."

The engagement of brush B4 with segment 355 connects positive potential to wiper 377 and fourth bank contact of switch 166, the third left hand break contact of relay 361, conductors 393 and 399, the winding of the stepping magnet 400 of switch 166 to the junction point of the right hand winding of relay 362 and resistance 401 which is connected to negative battery. The effect of the negative battery on the winding of relay 362 is thus neutralized and the relay is permitted to release. Following the disengagement of brush B4 from this segment the wipers of switch 166 are advanced to their fifth bank contacts.

The engagement of brush B4 with segment 356 operates relay 358 through the contacts of relay 357 in the manner described under "Revolution 1."

*Revolution 7.*—The operations performed in this revolution of the multiplex distributor are the same as those described under "Revolution 4." The manner in which these operations are performed is the same except that in this case the wipers, particularly wipers 393, 394 and 377 of switches 165 and 166 are engaged respectively with their fourth and fifth bank contacts, the latter of which are multipled to the third bank contacts. With wiper 393 of switch 165 engaged with its fourth bank contact, the engagement of brush B5 with segment 352 releases relay 357 and energizes the stepping magnet 418, the circuit differing from that of "Revolution 4" by including the second left hand break contact of relay 362. The operation of relay 364 does nothing on this revolution since the apparatus for the transmission of the coded switching signals is already operated.

*Revolution 8.*—The operations performed in this revolution of the distributor are the same as those described under "Revolution 5," the only difference being that the wipers, particularly wipers 393, 394 and 377 of switches 165 and 166 are engaged respectively with their fifth and sixth bank contacts which are multipled respectively to the third and fourth bank contacts. During this revolution the pattern signal which is transmitted over the A multiplex channel is Character 2 in accordance with Table 1. The first two impulses of the character convey the subscriber group identifying information in accordance with Table 3. The subscriber group in this casing being group I, both of these impulses are sent spacing. This may be seen by tracing the operating circuits for relays 168 and 169. These relays are connected by means of conductors 2 and 3 of cable 402 through wipers 404 and 405 and the fifth bank contacts of switch 165, conductors 9 and 11 of cables 427 and 427a through break contacts of relays 155 and 156 to ground. Thus, relays 168 and 169 are energized to set up spacing conditions on segments 2 and 3 of the transmitting rings. The other two impulses of this character convey part of the subscriber identifying information in accordance with Table 4. From this table it is seen that for subscriber 1 the fourth impulse is marking and the fifth impulse is spacing. The circuit for relays 170 and 171 are extended through conductors 4 and 5 of cable 402, wipers 406 and 407 and the respective fifth bank contacts of switch 165, conductors 13 and 15 of cables 427 and 427a to the break contacts of relays 157 and 158. Since relay 157 is operated, the circuit over conductor 13 of cables 427 and 427a is not complete thereby maintaining relay 170 in its unoperated condition to set up a marking condition on segment 4 of the transmitting rings. Since relay 158 is not operated, ground is connected to conductor 15 of cables 427 and 427a to operate relay 171 and thereby establish a spacing condition on segment 5 of the transmitting rings.

*Revolution 9.*—The operations taking place on this revolution are the same as those described under "Revolution 6" with the exception that the wipers, particularly wipers 393, 394 and 377 of switches 165 and 166 are engaged with their sixth bank contacts which are multipled to the respective fourth bank contacts. On this revolution a confirmation signal of Character 2 is transmitted and a switching signaling apparatus group test is made and completed at the contacts of relay 342 to operate relay 357 in the manner described under "Revolution 6."

*Revolution 10.*—The operations performed in this revolution of the distributor are the same as those described under "Revolution 7." The operations are performed in the same manner except that the wipers, particularly wipers 393, 394 and 377 of switches 165 and 166 are engaged with their sixth and seventh bank contacts which are multipled respectively to the fourth and fifth bank contacts. The operation of relay 364 during this revolution does not produce any result since the coding apparatus for the switching signal remains operated.

*Revolution 11.*—The operations occurring during this revolution are the same as those described under "Revolution 5" and are effected in the same way except that the wipers, particularly wipers 393, 394 and 377 of switches 165 and 166 are engaged with their seventh and eighth bank contacts which are multipled respectively to the third and fourth bank contacts. During this revolution there is transmitted over the A multiplex channel the pattern signal for Character 3 of the coded switching signals. According to Table 4, for subscriber 1 the second, fourth and fifth impulses are spacing and the third impulse is marking. Relays 168, 170 and 171 are connected by conductors 2, 4 and 5 of cable 402 through wipers 404, 406 and 407 and seventh bank contacts of switch 165, conductors 17, 21 and 23 of cables 427 and 427a, through break contacts of relays 159, 162 and 163 to ground. Thus, relays 168, 170 and 171 are operated to set up spacing conditions on segments 2, 4 and 5 of the multiplex transmitting rings. Similarly, relay 169 is connected by conductor 3 of cable 402, wiper 405 and seventh bank contact of switch 165, conductor 19 of cables 427 and 427a to the break contact of relay 161 which is operated, thereby preventing the completion of the operating circuit for relay 169. This relay remaining unoperated, sets up a marking condition on segment 3 of the multiplex transmitting rings.

*Revolution 12.*—The operations performed in this revolution of the distributor are the same as those described under "Revolution 6" and are effected in the same manner except that the wipers, particularly wipers 393, 394 and 377 of switches 165 and 166 are engaged with their eighth bank contacts which are multipled respectively to the fourth bank contacts. During this revolution the confirmation signal of Character 3 of the code switching signals is transmitted over the A multiplex channel. Relay 357 is not operated in response to a group test made during this revolution for the reason that the operating circuit therefor is not completed at the group apparatus tested. This apparatus comprises the system control instrumentalities of Fig. 12 which will be considered in the section of the specificatoin entitled "Supervisory system control." Likewise there is no operation of relay 358 so that there will be no blank character transmitted over the B multiplex channel on the following revolution.

*Revolutions 13, 14 and 15.*—The wipers of switches 165 and 166 are stepped successively over their associated bank contacts until, at the completion of the fifteenth revolution, the wipers of switch 165 are engaged with their eleventh bank contacts and the wipers of switch 166 with their twelfth bank contacts. This stepping of the switches is effected without interruption for the reason that no group tests are completed during these revolutions which would have resulted in the operation of relay 357.

During "Revolution 13" when the wipers of switch 165 are stepped from their eighth to their ninth bank contacts, the locking circuit through the left hand winding of relay 342 is opened by the disengagement of wiper 412 from its eighth bank contact. This relay is thus released and, by means of its contacts, relays 157 and 161 are also released thereby restoring to normal the coding apparatus for the switching signals.

From this point on the functions and operations of the stepping switches 165 and 166 and the associated relay apparatus are the same as those described for similar apparatus in the copending case of Pierson et al. previously referred to. Consequently, the remaining portion of this section of the specification will not deal with detailed circuits, reference being made for this purpose to the aforementioned copending application.

*Revolution 16.*—With the wipers of switch 166 engaged with their twelfth bank contacts, a group test of the first group of subchannel apparatus is made when the brush B4 engages segment 353. Relay 357 is operated since the test circuit is completed from positive battery through segment 353, wiper 394 and twelfth bank contact of switch 166, the first left hand break contact of relay 362, the first left hand break contact of relay 359, conductors 378 and 379, the right hand winding of relay 357, the second right hand break contact of relay 381, the third break contact of relay 382, conductor 383, wiper 384 and twelfth bank contact of switch 166, conductor 6 of cable 366, the third left hand break contact of relay 366, the fourth break contact of relay 364, wiper 369 and twelfth bank contact of switch 166, conductor 11 of cable 366, the second right hand make contact of relay 321, the second left hand make contact of relay 129 and the second left hand break contact of relay 365 to ground. Subsequently relay 358 is operated to prepare for the transmission of a blank character over the B multiplex channel on the following revolution of the multiplex distributor.

*Revolution 17.*—The operations occurring during this revolution of the distributor are the same as those described under "Revolution 7" except that the wipers, particularly wipers 393, 394 and 377 of switches 165 and 166 are engaged with their twelfth and thirteenth bank contacts which are multipled respectively to the fourth and fifth bank contacts. The operation of relay 364 completes a circuit for the operation of relay 365 which may be traced from negative battery through the fourth make contact of relay 364, wiper 369 and thirteenth bank contact of switch 166, conductor 12 of cable 366, the first right hand make contact and right hand winding of relay 321, the first left hand make contact of relay 129, the right hand winding of relay 365, conductors 432 and 433, and first break contact of relay 296 to ground. Relay 365 is locked from the ground of relay 296 through its left hand winding and first left hand make contact, conductor 434, and resistance 435 to positive battery.

*Revolution 18.*—The operations performed during this revolution of the distributor are similar to those described under "Revolution 5" with the exception that the wipers, particularly wipers 393, 394 and 377 of switches 165 and 166 are engaged with their thirteenth and fourteenth bank contacts which are multipled respectively to the third and fourth bank contacts. The pattern signal, which is transmitted while the wipers 404, 405, 406, and 407 of switch 165 are engaged with their thirteenth bank contacts prior to the stepping of these wipers during this revolution of the distributor, is determined by the operated or unoperated conditions of relay 365 and others corresponding thereto in the first subchannel group. Under the assumed conditions only relay 365 of this group is operated. Hence, relay 168 is unoperated, its circuit through wiper 404, thirteenth bank contact and conductor 29 of cables 427 and 427b is open at the third left hand break contact of relay 365. The three other relays of this subchannel group are unoperated so that the operating circuits of relays 169 to 171 are closed to effect operation of the bank relays. The pattern signal transmitted thus has the first, third, fourth and fifth impulses spacing and the second impulse marking.

*Revolution 19.*—During this revolution which is similar to "Revolution 6" except that the wipers of switches 165 and 166 are engaged with their fourteenth bank contacts, the confirmation signal for the first subchannel group is transmitted over the A multiplex channel while a blank character is being transmitted over the B multiplex channel. Since it is assumed that the remaining fourteen subchannels are idle, the switching signaling apparatus group test of the second subchannel group which is made during this revolution is not completed. Consequently, there is no operation of relays 357 and 358.

*Revolutions 20 to 25.*—The operations occurring during these revolutions of the multiplex distributor are substantially the same as those described under "Revolutions 13, 14 and 15." Since there are no switching signaling apparatus group tests completed, the wipers of switches 165 and 166 are stepped uninterruptedly over their respective bank contacts until, at the end of "Revolution 25," the wipers of switch 165 are engaged with their twentieth bank contacts and the wipers of switch 166 are engaged with their twenty-first bank contacts.

*Revolution 26.*—As brush B5 engages segment 352, the wipers of switch 165 are advanced to their twenty-first bank contacts. The engagement of wiper 412 of switch 165 with its twenty-first bank contact connects negative battery to the control grid of vacuum tube 349. The grid is thus placed at a negative potential with respect to its cathode, thereby rendering the tube non-conducting and effecting the release of relay 351.

As brush B4 crosses segment 355, the wipers of switch 166 are stepped to their first bank contacts.

*Revolution 27.*—As brush B5 crosses segment 352, the wipers of switch 165 are stepped to their first bank contacts. The negative potential connected to wiper 412 of this switch is thus disconnected from the grid of tube 349. However, the negative potential is maintained on the grid of this tube for a period of time controlled by the constants of the condenser 373 and resistance 372. The purpose of this arrangement is to provide for the re-operation of tube 349 and relay 351 automatically after the lapse of a predetermined time to start the switches 165 and 166 on another cycle of operation. This arrangement insures the intermittent operation of these switches and the associated relay apparatus even though there is no switching signaling apparatus common test completed requiring a change in the status of the system.

With both switches 165 and 166 in their home positions, further operations of the switching signaling apparatus do not occur until either a switching signaling apparatus common test circuit is completed or the tube 349 is again rendered conducting automatically in the manner described.

The foregoing detailed description of one typical cycle of operation of the switching signaling apparatus is deemed sufficient for a thorough understanding of the operation of this apparatus under any of the other possible conditions of operation. In general, it may be said that when the wipers of switch 165 are engaged with odd numbered bank contacts, pattern signals are transmitted over the A multiplex channel and when the wipers of this switch are engaged with even numbered bank contacts, confirmation signals are transmitted over the A multiplex channel. Of course, these signals generally are transmitted only when there is a change to be made from the previous arrangement.

When the wipers of switch 166 are engaged with even numbered bank contacts, a switching signaling apparatus group test is made and if completed, prepares for the transmission of a blank character on the B multiplex channel on the following revolution of the multiplex distributor. When these wipers are engaged with odd numbered bank contacts, the apparatus group cut-in relays are operated or released as conditions require if a change is to be made in a particular group of apparatus.

It will also be noted that at times when pattern and confirmation signals are being sent over the A multiplex channel, the wipers of both switches 165 and 166 miss one step, remaining for two successive revolutions of the multiplex distributor on even numbered bank contacts. The purpose of this arrangement is to insure synchronous operation of the switching signaling apparatus at the transmitting and receiving stations in the manner described in the copending case of Pierson et al. referred to.

At the time when the switch wipers are engaged with odd numbered bank contacts a test is made of the condition of the storage relays 172 to 176 to determine whether or not the contacts are set to transmit a blank character over the B multiplex channel. During the series of switching operations immediately preceding the transmission of pattern and confirmation signals over the A multiplex channel, a blank character is transmitted on the B multiplex channel for the purpose of preparing the receiving switching apparatus for the reception of the pattern and confirmation signals to follow. It is possible for the storage relays 172 to 176 to be set for the transmission of a blank character over the B multiplex channel by the subchannel apparatus. If this condition occurs while the wipers of switch 166 are engaged with odd numbered bank contacts, the reception of this blank character by the receiving apparatus prepares it to receive pattern and confirmation signals over the A channel on the two succeeding revolutions of the multiplex distributor. Consequently, such a blank must be detected at the transmitting station to prepare the switching signaling apparatus thereat for the transmission of pattern and confirmation signals even though no change is to be made in the subchannel connections.

Therefore, whenever the wipers of switch 166 are engaged with odd numbered bank contacts, the engagement of brush B4 with segment 353 prepares a circuit from positive battery to wiper 394 and any odd numbered bank contact of switch 166, conductor 395, the third right hand break contact of relay 358 and the first make contacts of relays 172 to 176 to conductor 396 and the winding of relay 361 to negative battery through resistance 397. In the case where a blank character is set up in the B multiplex channel storage bank, a circuit is completed through the first make contacts of relays 172 to 176 to cause the operation of relays 361 and 359 in the manner previously described. Thus, even though there is no switching signaling apparatus group test completed by the switching signaling apparatus at the transmitting station, the detection of a blank character in the bank of storage relays of the B multiplex channel conditions the apparatus for the transmission of pattern and confirmation signals on the two succeeding revolutions of the multiplex distributor.

This same condition may arise at a time when the switches 165 and 166 are at rest in engagement with their first bank contacts. It is seen in this case, however, that the described circuit is effective under these conditions to cause the operation of relays 361 and 359 and thereby start the switches on the cycle of operations described.

Also, during "Revolution 26," while the wipers of switches 165 and 166 are engaged with their twenty-first bank contacts, a blank character may be generated by the subchannel apparatus to operate the storage relays 172 to 176, inclusive, to transmit a blank character signal over the B multiplex channel during this revolution. At this stage of the operation of switches 165 and 166, it is no longer possible to generate pattern and confirmation signals, but the twenty-first bank contact of switch 165 is arranged so that a second or final guard character may be transmitted over the A multiplex channel to the receiving station where it may be received in much the same manner as the initial guard character is received. The final guard character may be the same as the initial guard character, or it may be different, but in either case it is always the same for each transmission. Consequently, it is not necessary to transmit a confirmation signal, since the checking circuits at the receiving station may be permanently arranged for the reception of the final guard character.

While the blank character is being transmitted over the B multiplex channel during this revolution, the engagement of brush B4 with segment 353 closes the described circuit through the first make contacts of relays 172 to 176, inclusive, for the operation of relays 361 and 359. The wipers of switch 166 are stepped to their first bank contacts by the engagement of brush B4 with segment 355 as in the previous case. The operation of relay 359 transfers the respective operating circuits for relays 167 to 171, inclusive, to the contact of relay 403 and to wipers 404 to 407, inclusive, of switch 165. In this case the character chosen for the final guard character is the letter "V," in which the first impulse is spacing and the remaining four impulses are marking. Accordingly, the operating circuit for relay 167 is complete as in previous cases to ground at the left hand break contact of relay 403, thereby providing for the operation of this storage relay. The operating circuits of the other four relays of the A storage bank are incomplete at the twenty-first bank contacts associated with wipers 404 to 407, inclusive, of switch 165, thereby preventing the operation of these relays. It is seen, therefore, that when brush B3 traverses the segments of the A multiplex channel on "Revolution 27," the final guard character is transmitted. Also, during this revolution, the engagement of brush B5 with segment 352 advances the wipers of switch 165 to their first bank contacts.

If, on this revolution, another blank character is set up in the B multiplex storage bank, the switches 165 and 166 will be started on another cycle of operation such as that described. For the purposes of this description, however, assume that a normal character is set up in this storage bank in such a manner that one or more of the relays such as 176, for example, is positioned on its marking or break contacts. Now, when brush B4 engages segment 353, positive battery is connected through the first break contact of relay 176 and over conductor 436 to the junction of the winding of relay 359 and resistance 397, thereby neutralizing the negative battery also connected to this point and releasing relays 361 and 359. Thus, it is seen that the switching apparatus is restored to its normal idle condition as before.

SENDING RELAY CHAIN MIXER

The switching signals for the connection or disconnection of the subchannel and subscriber apparatus having been transmitted, the subchannels in operation at that time are connected successively to the channels of the multiplex system by means of a mixer comprising a chain of relays illustrated in Figs. 13 and 16. This type of mixer is described in detail in the copending Pierson et al. case and also in the Pierson et al. Patent No. 2,233,347 referred to. Consequently, for the purposes of this description reference will be made to the prior disclosures for the details of operation. This description will deal with these operations only in a general manner.

Under the assumed conditions of a completely idle system at the time subchannel 1 is prepared for operation by the operation of relay 365, this subchannel will be connected to the C multiplex channel on the following revolution of the multiplex distributor. Since relay 365 is operated, relay 437 is operated by means of a circuit which may be traced from ground through the fourth right hand make contact of relay 365, the winding of relay 437 and the second left hand break contact of relay 368 to positive battery. When brush B5, at the end of "Revolution 17" and the beginning of "Revolution 18," engages segments 438 and 439 of the local multiplex rings, a circuit is closed from positive battery over conductor 440, the make contact of relay 437, the first left hand break contact of relay 391, conductor 441, the first right hand break contacts of relays 442, 443 and 444, the first right hand make contact of relay 365, conductors 445 and 446, the right hand winding of relay 324, conductor 447 and winding of relay 392 to negative battery through resistance 448. Thus, relays 324 and 392 are operated.

The contact tongues of the subchannel 1 tape transmitter 152 are then connected by conductors 1 to 5 of cable 325, the first five right hand make contacts of relay 324, and conductors 11 to 15 of cables 388a and 388 to the windings of relays 177 to 181. It will be remembered that, at this time, the contacts of the tape transmitter 152 are set in some combination other than an all-spacing one. Consequently, the storage relays 177 to 181 are set in accordance with this character combination to apply marking and spacing potentials to the segments 11 to 15 of the transmitting rings MTR in preparation for the traversal of these segments by the brush B3, at which time the character will be transmitted over the line on the C multiplex channel.

Before brush B3 reaches the C multiplex channel segments to transmit the first character, brush B4 engages segment 449 to complete a circuit from positive battery over conductor 451, the sixth right hand make contact of relay 324, conductor 6 of cable 325, the make contact and right hand winding of relay 326 and the right hand winding of relay 319 to ground. This latter relay is operated and locked from battery through its left hand make contact and left hand winding and the first left hand make contact of relay 321 to ground. The operation of relay 319 opens at its left hand break contact the circuit through the left hand winding of relay 326. This relay does not release immediately, however, since its right hand winding is energized at this time. Also, the operation of relay 319 opens at its right hand break contact the stepping circuit controlled by the interrupter 318. This circuit remains open as long as relay 321 remains operated under the control of normal characters perforated in the tape being stepped through the transmitter 152. When brush B4 leaves segment 449, the operating circuit for relay 319 is opened and also the circuit through the right hand winding of relay 326 is interrupted to cause the release of this relay. Conductor 6 of cable 325 which is energized whenever brush B4 crosses segment 449, is connected by the break contact of relay 326 to the operating circuit of the stepping magnet 303 of the tape transmitter 152. Thus, once in every succeeding revolution of the multiplex distributor the stepping circuit is energized to step the tape through the transmitter.

Subchannel 1 remains connected to the C multiplex channel through the agency of relay 324 until a second subchannel desires a connection to the system. In accordance with the referred to prior disclosures of this relay chain mixer, subchannel 1 then is disconnected from the C channel upon the release of relay 324 and subchannel 2, for example, is connected to the C multiplex channel by the operation of relay 452. Relay 322 is subsequently operated to connect subchannel 1 to the A multiplex channel.

When a third subchannel desires connection to the system, relay 452 is released to disconnect subchannel 2 from the C multiplex channel and relay 453 is operated to connect subchannel 14, for example, to the C multiplex channel. Relay 322 is released to disconnect subchannel 1 from the A multiplex channel and relay 454 is operated to connect subchannel 2 to the A multiplex channel. Then relay 323 is operated to connect subchannel 1 to the B multiplex channel. These connections remain undisturbed as long as three subchannels are operated. Thus, each subchannel is connected on a semi-permanent basis to one of the multiplex channels.

If subchannel 15 now desires a connection to the system, relay 453 is released to disconnect subchannel 14 from the C multiplex channel and relay 455 is operated to connect subchannel 15 to the C multiplex channel. Relay 454 is released to disconnect subchannel 2 from the A multiplex channel and relay 456 is operated to connect subchannel 14 to the A multiplex channel. Relay 323 is released to disconnect subchannel 1 from the B multiplex channel and relay 457 is operated to connect subchannel 2 to the B multiplex channel.

Since there are now more subchannels in operation than there are multiplex channels available, the relay chain mixer cycles in the manner set forth in detail in the prior disclosures referred to. Briefly, typical operations are as follows. Relay 455 is released to disconnect subchannel 15 from the C multiplex channel and relay 324 is operated to connect subchannel 1 to the C multiplex channel. Relay 456 is released to disconnect subchannel 14 from the A multiplex channel and relay 458 is operated to connect subchannel 15 to the A multiplex channel. Relay 457 is released to disconnect subchannel 2 from the B multiplex channel and relay 459 is operated to connect subchannel 14 to the B multiplex channel. Relay 324 is released to disconnect subchannel 1 from the C multiplex channel and relay 452 is operated to connect subchannel 2 to the C multiplex channel. Relay 458 is released to disconnect subchannel 15 from the A multiplex channel and relay 322 is operated to connect subchannel 1 to the A multiplex channel. Relay 459 is released to disconnect subchannel 14 from the B multiplex channel and relay 461 is operated to connect subchannel 15 to the B multiplex channel.

The cyclic operation of the relay chain mixer at the transmitting station continues in the manner outlined in synchronism with a similar relay chain mixer at the receiving station and thereby connects both ends of each subchannel together for communication successively over one of the multiplex channels.

OTHER SENDING SWITCHING SIGNALING

If it is assumed that only subscriber 1 of group I is operating over subchannel 1, after the subscriber has finished sending, a predetermined number of blank characters are perforated in the tape 315 so as to insure the transmission of the last message character. The detection by the pins of the transmitter 152 of a blank character in the tape renders the tube 330 non-conducting and thereby releases relay 321. The release of this relay initiates another cycle of operation of the switches 165 and 166.

With the release of relay 321 a circuit is completed from ground through the second left hand make contact of relay 365, the second right hand break contact of relay 321, conductor 11 of cable 366, resistance 375, conductor 6 of cable 366, the third left hand break contact of relay 368, the fourth break contact of relay 364, wiper 369 and first bank contact of switch 166 to the grid of tube 349. This tube is conductively conditioned to cause the operation of relay 351 and thereby initiate a cycle of operation of the switches 165 and 166, as described. Since relays 340 and 342 are unoperated, there are no group tests completed during the engagements of wiper 369 of switch 166 with its second, fourth and sixth bank contacts. Similarly, the engagement of wiper 384 of this switch with its tenth bank contact does not complete a group test, since it is assumed that the supervisory system control apparatus of Fig. 12 is not operated. Upon the engagement of wiper 369 with its twelfth bank contact and the engagement of brush B4 with segment 353, a group test is completed over conductor 11 of cable 366 to the ground at the second right hand make contact of relay 365. The completion of this test circuit causes the operation of relay 357 as in all other previously described similar cases to prepare for the transmission of a blank character over the B multiplex channel. This blank character is generated by the operation of relay 358 upon the engagement of brush B4 with segment 356.

During the following revolution of the multiplex distributor, when the wipers of switches 165 and 166 are engaged with their thirteenth bank contacts, the operation of relay 364 caused by the engagement of brush B4 with segment 355 completes a circuit from negative battery through the fourth make contact of the relay, wiper 369 and thirteenth bank contact of switch 166, conductor 12 of cable 366, the first right hand break contact of relay 321 to the junction of the first left hand make contact and left hand winding of relay 365 and resistance 435, through which positive battery is also connected to the junction point. Thus, the two batteries neutralize one another, effecting the release of relay 365.

The release of relay 365 opens at its fourth right hand make contact the operating circuit of relay 437, thereby releasing this relay. When next brush B5 engages segments 438 and 439 positive battery is connected to a circuit including conductor 440 and the right hand break contact of relay 437 to the junction of the winding of relay 392 and resistance 448 to which also is connected negative battery. Thus relays 392 and 324 are released and at the right hand contacts of the latter the subchannel transmitter 152 is disconnected from the multiplex apparatus.

During the revolution of the multiplex distributor following the release of relay 365, the pattern signal for the first subchannel group is transmitted while the wipers of switch 165 are engaged with their thirteenth bank contacts. Since relay 365 is released, conductor 29 of cable 427b is connected to ground at the third left hand break contact of the relay so that the operating circuit for relay 168 through wiper 464 and thirteenth bank contact of switch 165 is complete causing the operation of relay 168. Since it is assumed that all other relays corresponding to relay 365 of the first subchannel group are not operated, the operating circuits for relays 169 to 171, inclusive, similarly are complete to cause operation of these relays so that the pattern signal transmitted over the A multiplex channel is one in which all five impulses are spacing.

On the following revolution of the multiplex distributor with the wipers of switch 165 engaged with their fourteenth bank contacts, the confirmation signal of the first subchannel group is transmitted. These pattern and confirmation signals are utilized at the receiving station for the disconnection of the apparatus of subchannel 1 from the multiplex apparatus in a manner to be described in the section of the specification entitled "Other receiving switching signaling."

The release of relay 324 in the manner described following the release of relay 321 completes the previously described local circuit for stepping the blank tape through the transmitter 152 under the control of the interrupter 318. This stepping continues until the tape loop shortens sufficiently to open contact 317 so that, upon the succeeding closure of the circuit by the interrupter, the right hand winding of relay 299 alone is energized to operate the relay which locks through its right hand make contact. At the same time the local stepping circuit is opened at the right hand break contact of relay 299.

It will be seen that the system, as far as the subchannel-to-multiplex apparatus connection is concerned, is restored to its completely idle condition. The connection between the subscriber and the subchannel apparatus, however, is not disturbed at this time, and at the subscriber's station the green lamp 113 is maintained operated.

If, before the system is utilized to the extent necessary to disconnect subscriber 1 of group I from the apparatus of subchannel 1 in the manner described in the preceding section of the specification entitled "Sending subscriber to subchannel connection," subtitle (3), this subscriber again desires to transmit, it is only necessary to immediately start operation of his transmitting keyboard. Additional normal characters are thus perforated in the tape 315 which are subsequently stepped under the pins of the transmitter 152 in the manner described in the section entitled "Sending subchannel apparatus." The detection of the first normal character in the tape causes the operation of tube 330 and relay 321 as described. The operation of this relay causes the interruption of the locally controlled tape stepping and closes a circuit from ground through the second left hand break contact of relay 365, the second left hand make contact of relay 129, the second right hand make contact of relay 321, conductor 11 of cable 366 and through resistance 375 and the previously described circuit to the grid of tube 349. This tube is conductively conditioned to cause the operation of relay 351, which in turn initiates a cycle of operation of the switches 165 and 166. Again there is no transmission of switching signals from the code apparatus, since there are no group tests completed during the engagement of wiper 369 with its second, fourth and sixth bank contacts for the reason that relays 340 and 342 are not operated. When the wipers of switch 165 are engaged with the thirteenth and fourteenth bank contacts, pattern and confirmation signals are transmitted to effect the reconnection of the receiving apparatus of subchannel 1 to the multiplex apparatus.

RECEIVING APPARATUS—FUNCTIONS

The receiving station apparatus is shown in Figs. 17 to 27, inclusive, arranged as indicated in Fig. 3. All signals including intelligence and switching signals are transmitted over the line L and, at the receiving station, operate the receiving line relay RR. The contacts of this relay, in cooperation with the multiplex distributor brush B6 and the receiving rings MRR, transfer the signals to three banks of storage relays 462 to 476, inclusive. The intelligence signals stored in any of these banks of relays are retransmitted together with rest and start impulses by relays 477, 478 or 479 under the control of the start-stop local transmitting rings STR and brush B7 to a connected subscriber's receiving apparatus. The switching signals which are received over the A multiplex channel are transferred at suitable times from the contacts of storage relays 462 to 466, inclusive, to actuate the decoding apparatus. These contacts are connected by means of some of the conductors of cables 481 and 481a, the contacts of relay 482 and some of the wipers and bank contacts of a receiving pattern switch 483 to the decoding apparatus.

The decoding apparatus includes relays 484, 485, 486 and 487 which are responsive to Character 1 of the switching signals and prepare for the connection of the selected subchannel to the apparatus of the proper subscriber. The decoding apparatus also includes relays 488 and 489, which respond to the first two impulses of Character 2 of the switching signals to select the proper subscriber group. Relay 490 is used for timing the selecting operations of relays 488 and 489. Relays 491 and 492 respond to the last two impulses of Character 2 of the switching signals and together with relays 493, 494, 495 and 496, which respond to Character 3 of the switching signals, select the proper subscriber in the designated group which is to be connected to the selected subchannel.

Relays 497, 498, 499 and 501 respond to the switching signals of the first group of subchannel apparatus to prepare for the operation of the relay chain mixer. Also, relays 502, 503 and 504 respond to the switching signals of the fourth group of subchannel apparatus to prepare the corresponding portions of the relay chain mixer for operation in accordance with the disclosure of the copending Pierson et al. case referred to.

Also involved in the reception, decoding and testing for the detection of signaling or apparatus failures are relays 505, 506 and 507. For the operation of the complete system of the magnitude indicated, the apparatus referred to up to this point is shown complete.

For each group of 48 subscribers there is required a stepping switch corresponding to either switch 508, associated with subscriber group I, or switch 509, associated with subscriber group IV. Each switch functions in conjunction with relays 484 to 487, inclusive, to prepare further for the connection of the selected subchannel to the proper subscriber. Associated with the switch 508 is a pair of vacuum tubes 511 and a single auxiliary control vacuum tube 512 by means of which the wipers of the switch are stepped over the bank contacts. Switch 509 is provided with similar apparatus, such as the pair of vacuum tubes 513 and the auxiliary control tube 514. Also associated with the switch 508 is a relay 515 which controls the starting of the stepping action of the switch in response to the settings of the subscriber group designating relays 488 and 489. Switch 509 is provided with a similar starting relay 516. Also associated with switch 508 is a relay 517 which responds to the location by the wipers of the switch of the bank contacts associated with the selected subchannel. The corresponding relay for switch 509 is the relay 518. There is also associated with switch 508 a relay 519 which is operated under the control of the receiving pattern switch 483, after the wipers of switch 508 are stopped in engagement with contacts associated with the selected subchannel, to initiate the stepping of one of the switches 521 or 522. There are provided as many of the latter switches associated with switch 508 as there are subchannels in the system. In this case, in order to provide for 15 subchannels, there would be required 15 such switches. Also associated with switch 508 is a pair of vacuum tubes 523 by means of which one of the switches corresponding to 521 and 522 is operated. Switch 509 is similarly provided with a relay 524 which corresponds to relay 519 to control the starting of one of 15 stepping switches such as switches 525 and 526. The stepping circuits of any of these switches are controlled by a pair of vacuum tubes 527. A vacuum tube 528 and a relay 529, controlled thereby in response to the engagement of the wipers of one of the switches corresponding to switches 521 and 522 with the bank contacts associated with the desired subscriber, are also associated with the switch 508. The proper bank contacts are determined by an arrangement of 48 vacuum tubes 530, of which one at a time, for example, tube 531, is conditioned under the control of decoding relays 491 to 496, inclusive. Corresponding apparatus associated with the switch 509 comprises the vacuum tube 532 and relay 533. This apparatus also operates in conjunction with the vacuum tube network 530, one of which is provided for the entire system.

There are associated with each of the stepping switches corresponding to switches 521, 522, 525 and 526 relays 534, 535, 536 and 537, respectively. There is provided one such relay per subchannel per group of 48 subscribers.

In the system of the magnitude indicated having 15 subchannels and 4 groups of 48 subscribers each, there will be required 4 switches such as 508 and 509 and 4 groups of the apparatus shown with each switch. There will also be required 60 switches corresponding to switches 521, 522, 525 and 526 and 60 relays corresponding to relays 534 to 537, inclusive.

By means of one of the relays corresponding to relay 534 and its associated switch 521, the start-stop transmitting circuit from one of the relays 477, 478 or 479 is connected, for example, to subscriber's line 538, which is associated with subscriber 1 of group I, and thence to the subscriber's receiving apparatus 539. In the case of subscriber 48 of group IV, the start-stop transmitting circuit is connected by means of one of the relays corresponding to relay 536 and its associated switch 525 to the subscriber's line 540, and thence to the subscriber's receiving apparatus 541.

RECEIVING SWITCHING SIGNALING

For the description of the operation of the receiving equipment the same conditions will be assumed as those assumed for the description of the transmission of the switching signals by the sending apparatus. It will be remembered that the system is assumed to be idle and that subscriber 1 of group I was connected to subchannel 1 at the sending station. To accomplish this connection at the receiving station five pattern signals were transmitted, although not necessarily consecutively. The identity and character of these signals are listed hereinafter, it being remembered that the first impulse of every signal normally is sent spacing and that each pattern signal is followed immediately by its corresponding confirmation signal, with the exception that no confirmation signal for the guard character is sent. In other words, counting all pattern and confirmation signals, nine switching signals are sent.

1. Pat. (guard) _____ S  M  S  M  S
2. Pat. (char. 1) _____ S  M  S  S  S
3. Conf. (char. 1) _____ S  S  M  M  M
4. Pat. (char. 2) _____ S  S  S  M  S
5. Conf. (char. 2) _____ S  M  M  S  M
6. Pat. (char. 3) _____ S  S  M  S  S
7. Conf. (char. 3) _____ S  M  S  M  M
8. Pat. (cut-in) _____ S  M  S  S  S
9. Conf. (cut-in) _____ S  S  M  M  M These switching signals are sent over the A multiplex channel and are stored in the bank of relays 462 to 466, inclusive. The blank characters which are sent before and after each pair of pattern and confirmation signals are stored in the bank of relays 467 to 471, inclusive. Brush B8, in traversing the local rings RLR, engages segments 542 and 543 and, in cooperation with the contacts of the storage relays, controls the pattern switch 483 and the auxiliary relays 482, 505, 506, 508, 544, 545 and 572.

The operation of the receiving switching apparatus, together with the approximate time of operation with respect to the engagement of segments 542 and 543 of the local rings, the position of the wipers of stepping switch 483 and the type of characters received over the A and B multiplex channels, is set forth in Table 6, which follows. Reference may be made to this table for a complete outline of a typical series of switching operations, some of which will be described in detail in the following portion of the specification.

TABLE 6

| Rev. | Seg. | Operations | Mux. chan. A | Mux. chan. B | Position 483 |
|---|---|---|---|---|---|
| 1 | 542 | None | R | | |
|   | 543 |  |  | N | 1 1 |
| 2 | 542 | None<br>Release 467, 468, 469, 470, 471 | R | | |
|   | 543 | None |  | B | 1 1 |
| 3 |     | Operate 462, 464, 466<br>Operate 505 to operate 482 | Pat. (guard) | | |
|   | 542 |  |  |  |  |
|   | 543 | Confirm guard character—step 483<br>Release 544 |  | N | 1 2 |
| 4 | 542 | Release 505 to release 482, 506<br>Release 467, 468, 469, 470, 471 | R | | |
|   | 543 | Step 483 |  | B | 2 3 |
| 5 |     | Operate 462, 464, 465, 466<br>Operate 505 to operate 507 | Pat. (char. 1) | | |
|   | 542 |  |  |  |  |
|   | 543 | Pulse 482 to operate 484—step 483 |  | N | 3 4 |

TABLE 6—Continued

| Rev. | Seg. | Operations | Mux. chan. A | Mux. chan. B | Position 483 |
|---|---|---|---|---|---|
| 6 | | Operate 462, 463 | Conf. (char. 1) | | |
| | 542 | Operate 506 to release 507 to operate 482 | | B | |
| | | Release 467, 468, 469, 470, 471 | | | |
| | 543 | Confirm char. 1 | | | 4 / 4 |
| 7 | 542 | Release 505 to release 482, 506 | R | B | |
| | | Release 467, 468, 469, 470, 471 | | | |
| | 543 | Step 483 | | | 4 / 5 |
| | | Operate 490 | | | |
| 8 | | Operate 462, 463, 464, 466 | Pat. (char. 2) | | |
| | 542 | Operate 505 to operate 507 | | N | |
| | 543 | Pulse 482 to operate 491—step 483 | | | 5 / 6 |
| | | Operate 515 to start 508 | | | |
| 9 | | Operate 462, 465 | Conf. (char. 2) | | |
| | 542 | Operate 506 to release 507 to operate 482 | | B | |
| | | Release 467, 468, 469, 470, 471 | | | |
| | 543 | Confirm char. 2 | | | 6 / 6 |
| 10 | 542 | Release 505 to release 482, 506 | R | B | |
| | | Release 467, 468, 469, 470, 471 | | | |
| | 543 | Step 483 | | | 6 / 7 |
| 11 | | Operate 462, 463, 465, 466 | Pat. (char. 3) | | |
| | 542 | Operate 505 to operate 507 | | N | |
| | 543 | Pulse 482 to operate 494 to operate 531—step 483 | | | 7 / 8 |
| 12 | | Operate 462, 464 | Conf. (char. 3) | | |
| | 542 | Operate 506 to release 507 to operate 482 | | B | |
| | | Release 467, 468, 469, 470, 471 | | | |
| | 543 | Confirm char. 3 | | | 8 / 8 |
| 13 | 542 | Release 505 to release 482, 506 | R | N | |
| | 543 | Step 483 | | | 8 / 9 |
| | | (517 operated by now) operates 519 to start 521 and release 484 to release 490, 515. | | | |
| 14 | 542 | None | R | N | |
| | 543 | Step 483 | | | 9 / 10 |
| 15 | 542 | None | R | N | |
| | | By now 521 stopped, 529 pulsed to operate 534 and release 491, 494 to release, 531, 517, 519. | | | |
| | 543 | Step 483 | | | 10 / 11 |
| 16 | 542 | None | R | N | |
| | 543 | Step 483 | | | 11 / 12 |
| 17 | 542 | None | R | B | |
| | | Release 467, 468, 469, 470, 471 | | | |
| | 543 | Step 483 | | | 12 / 13 |
| | | Test release of 484, 485, 486, 487 | | | |
| 18 | | Operate 462, 464, 465, 466 | Pat. (cut-in) | | |
| | 542 | Operate 505 to operate 507 | | N | |
| | 543 | Pulse 482 to operate 497—step 483 | | | 13 / 14 |
| 19 | | Operate 462, 463 | Conf. (cut-in) | | |
| | 542 | Operate 506 to release 507 to operate 482 | | B | |
| | | Release 467, 468, 469, 470, 471 | | | |
| | 543 | Confirm cut-in | | | 14 / 14 |
| 20 | 542 | Release 505 to release 482, 506 | R | N | |
| | 543 | Step 483 | | | 14 / 15 |
| 21 | 542 | None | R | N | |
| | 543 | Step 483 | | | 15 / 16 |
| 22 | 542 | None | R | N | |
| | 543 | Step 483 | | | 16 / 17 |
| 23 | 542 | None | R | N | |
| | 543 | Step 483 | | | 17 / 18 |
| 24 | 542 | None | R | N | |
| | 543 | Step 483 | | | 18 / 19 |
| | | Test release of 491, 492, 493, 494, 495, 496, 519, 529 | | | |

TABLE 6—Continued

| Rev. | Seg. | Operations | Mux. chan. | | Position 483 |
|---|---|---|---|---|---|
| | | | A | B | |
| 25 | 542 | None | R | | |
| | 543 | Step 483 | | N | 19 20 |
| 26 | 542 | None | R | | |
| | 543 | Step 483 Operate 545 | | N | 20 21 |
| 27 | 542 | None | R | | |
| | 543 | Step 483 Release 545 and operate 544 to operate 506 | | N | 21 1 |

Prior to the initiation of a switching operation, the wipers of the receiving pattern switch 483 are engaged with their first bank contacts and relays 506 and 544 are operated. The operating circuit for relay 544 may be traced from ground through the right hand break contact of relay 546, conductor 547, wiper 548 and first bank contact of switch 483 and the winding of relay 544 to positive battery. With this relay operated, a circuit is complete from positive battery through resistance 551, the third make contact of relay 544, conductor 552 and the left hand winding of relay 506 to ground, thereby holding this relay operated. Also at this time the regular characters which are received over the multiplex line circuit on all channels are the idle signals representing the letter "X."

*Revolution 1.*—While a regular character is being received over the A multiplex channel, and a normal character is being received over the B multiplex channel, the engagement of brush B8 with segments 542 and 543 accomplishes nothing.

*Revolution 2.*—The engagement of brush B8 with segment 542 at the time when a regular character is being received over the A multiplex channel produces no result.

As brush B6 traverses segments 6 to 10 of the multiplex receiving rings MRR, a blank character is received and stored in relays 467 to 471, inclusive. These relays are positioned on their spacing or break contacts.

The engagement of brush B8 with segment 543 produces no result.

*Revolution 3.*—The pattern signal of the guard character is received over the A multiplex channel and is stored in relays 462 to 466, inclusive, in such a manner that relays 462, 464 and 466 are operated, and relays 463 and 465 are released, moving the armatures controlled by the operated relays to their spacing or make contacts, and the armatures controlled by the released relays to their marking or break contacts.

While the storing of the guard character is being effected, brush B8 engages segment 542 to close a circuit which may be traced from positive battery connected to the solid local ring through segment 542, conductor 553, wiper 554 and first bank contact of switch 483, the second break contacts of relays 467 to 471, inclusive, the right hand winding of relay 505 and resistances 555 and 556 to negative battery. Relay 505 is thus operated and locked from negative battery through resistance 557 and its first left hand make contact and left hand winding to ground. The operation of relay 505 completes a circuit from negative battery through resistance 556 and the third right hand make contact of the relay, the right hand winding of relay 482 and the seventh break contact of relay 507 to ground.

Relay 482 thus is operated. Also, relay 506 is provided with a locking circuit independent of relay 544 which may be traced from ground through the left hand winding and first make contact of relay 506, the second break contact of relay 545, the second right hand make contact of relay 505 and resistance 551 to positive battery.

During the traverse of brush B6 over the B multiplex channel segments of rings MRR on this revolution, usually a normal character is received to operate at least one of the relays 467 to 471 to its marking or make contact, the relay opening the previously described circuit through the spacing or break contacts of these relays. However, a blank character originating at one of the tape transmitters may be received without affecting the operation of the switching apparatus, since this circuit will also be open at the bank contacts associated with wiper 554 of switch 483 which, on the following revolution, will be engaged with its second bank contact. Similarly, a blank instead of a normal character may be received on the B multiplex channel during "Revolutions 5, 8, 11, 18 and 20."

When brush B8 engages segment 543 of the local ring RLR, the confirmation test of the guard character is made. In making this confirmation test and all other similar tests of the decoding and switching apparatus, five conductors multipled to the apparatus in a manner to be described are employed. They comprise conductors 558, 559, 561, 562 and 563. Inasmuch as there are no relay operations effected by the guard character, the first bank contacts of the switch 483 involved in the confirmation test are connected directly to these conductors.

In making a confirmation test, a differentially wound relay 564 is connected in such a manner that one winding is energized substantially directly from the segment 543 and, if the test is completed properly, the other winding of the relay is energized in a manner to neutralize the effect of the first winding and thereby prevent the relay from operating. In the event that the test is not completed, the second winding of the relay is not energized, and the relay is operated by the unbalanced effect produced by the energization of the first winding.

The engagement of brush B8 with segment 543 closes a circuit from positive battery over conductor 565, the first right hand make contact of relay 505, the second make contact of relay 506, conductors 566 and 567, the left hand winding of relay 564, the first make contact of relay 544, conductors 568, 569 and 571, the left hand winding of relay 572 and resistance 573 to negative battery. Also, from the second make contact of relay 506, the circuit branches and is continued through the first right hand break contact of relay 507, the left hand make contact of relay 482, conductor 3 of cables 481a and 481, the second make contact of relay 462, conductor 1 of cables 481 and 481b, the third make contact of relay 506, conductor 574, upward on conductor 563, over conductor 575, the first bank contact and wiper 576 of switch 483, the first right hand make contact of relay 482, conductor 5 of cables 481a and 481, the second break contact of relay 463, conductor 7 of cables 481 and 481b, the fourth make contact of relay 506, conductor 577, upward on conductor 562, conductor 578, the first bank contact and wiper 579 of switch 483, the second right hand make contact of relay 482, conductor 8 of cables 481a and 481, the second make contact of relay 464, conductor 6 of cables 481 and 481b, the fifth right hank break contact of relay 507, conductor 581, upward on conductor 561, conductor 582, the first bank contact and wiper 583 of switch 483, the third right hand make contact of relay 482, conductor 10 of cables 481a and 481, the second break contact of relay 465, conductor 12 of cables 481 and 481b, the second right hand break contact of relay 507, upward on conductor 559, conductor 584, first bank contact and wiper 585 of switch 483, the fourth right hand make contact of relay 482, conductor 13 of cables 481a and 481, the second make contact of relay 466, conductor 11 of cables 481 and 481b, the third right hand break contact of relay 507, downward on conductor 558, conductor 586, and through the right hand winding of relay 564, where the circuit is connected with the circuit through the left hand winding of this relay and extended to negative battery through the left hand winding of relay 572 as described. Thus, it is seen that there is a complete circuit through both windings of the relay 564, thereby producing no response by this relay to the confirmation test of the guard character.

The energization of the left hand winding of relay 572 operates this relay which locks momentarily through its right hand winding and right hand make contact, through the interrupter contacts of the stepping switch 483 and resistance 587 to positive battery. The right hand make contact of relay 572 also energizes the switch stepping magnet 588 to open the interrupter contacts and break the described locking circuit.

As soon as brush B8 becomes disengaged from segment 543, the circuit through the left hand winding of relay 572 also is interrupted, thereby releasing this relay which, by means of the opening of its right hand make contact, deenergizes the stepping magnet 588 of the switch 483, permitting the wipers of the switch to step to their respective second bank contacts. Upon the disengagement of the wiper 548 of the switch 483 from its first bank contact, the operating circuit through the winding of relay 544 is interrupted, releasing this relay. The opening of the third make contact of relay 544 opens the operating circuit through the left hand winding of relay 506, but this relay does not release immediately, since the locking circuit through this winding is still intact through the first make contact of the relay, the second break contact of relay 545, the second right hand make contact of relay 505 to positive battery.

*Revolution 4.*—While a regular character is being received over the A multiplex channel, brush B3 crosses segment 542 to connect positive battery over conductor 553, wiper 554, and second bank contact of switch 483, conductor 589 to the connection of negative battery through resistance 557 to the left hand winding of relay 505. These two potentials neutralize one another to deenergize the relay, permitting its release. The opening of the third right hand make contact of relay 505 deenergizes the right hand winding of relay 482 to release this relay. Also, the opening of the second right hand make contact of relay 505 interrupts the locking circuit through the left hand winding of relay 506 to release this relay.

A blank character is received over the B multiplex channel at this time to release relays 467 to 471, inclusive.

The engagement of brush B8 with segment 543 closes a circuit which may be traced from positive battery over conductor 565, the first right hand break contact of relay 505, the second break contact of relay 544, conductors 568, 569 and 571, the left hand winding of relay 572 and resistance 573 to negative battery. This relay is operated and temporarily locked through its right hand winding as before and energizes the winding of the stepping magnet 588 of switch 483 which, by means of the interrupter contacts controlled thereby, opens the locking circuit of relay 572 to deenergize the stepping magnet and permit the wipers of the switch to step to their third bank contacts.

*Revolution 5.*—The pattern signal for Character 1 is received over the A multiplex channel and operates relays 462, 464, 465 and 466 and releases relay 463.

The engagement of brush B3 with segment 542 closes the circuit through the second break contacts of relays 467 to 471, inclusive, for the operation of relay 505. This circuit is the same as a corresponding circuit traced under "Revolution 3," with the exception that wiper 554 of switch 483 is engaged with its third bank contact. The operation of relay 505 closes a circuit which may be traced from positive battery through resistance 551, the second right hand make contact of relay 505, the second break contact of relay 545, the first break contact of relay 506, and the right hand winding of relay 507 to ground, resulting in the operation of this relay.

A normal character is received on the B multiplex channel to open the circuit through the second break contacts of relays 467 to 471.

The engagement of brush B8 with segment 543 closes a circuit which may be traced from positive battery over conductor 565, the first right hand make contact of relay 505, the second break contact of relay 506, the left hand winding of relay 482, conductor 571, the left hand winding of relay 572 and resistance 573 to negative battery. Relay 572 is operated to prepare for the stepping of the wipers of switch 483 upon the disengagement of brush B8 from segment 543. Relay 482 is also operated for the duration of the engagement of the local brush with segment 543.

The operation of relay 482 completes a circuit or circuits, depending upon the settings of relays 462 to 466, inclusive, for the operation of the first group of decoding relays comprising relays 484 to 487, inclusive, in accordance with the pattern signal of Character 1 received. In this case, relay 463 is in its marking position, indicating that relay 484 of the first group of decoding relays is to be operated, and relays 464, 465 and 466 are in their spacing positions, indicating that the other three relays 485, 486 and 487 of the first group of decoding relays are not to be operated. The operating circuit for relay 484 may be traced from positive battery through the right hand winding of the relay, conductor 2 of cables 591 and 591a, the third bank contact and wiper 576 of switch 483, the first right hand make contact of relay 482, conductor 5 of cables 481a and 481, the second break contact of relay 463, conductor 7 of cables 481 and 481b, and the fourth break contact of relay 506 to ground. As soon as relay 484 is operated, it is locked through a circuit extending from positive battery through the right and left hand windings of the relay, the first left hand make contact, conductor 592, the fifth break contact of relay 524, the fifth break contact of relay 519, conductor 593 and the break contact of relay 594 to ground. It may be seen that similar operating circuits for relays 485, 486 and 487 are all incomplete at the right hand break contacts of relays 464, 465 and 466, respectively. After this operation, the wipers of switch 483 are stepped to their respective fourth bank contacts.

*Revolution 6.*—The confirmation signal for Character 1 is received on the A multiplex channel and results in the operation of relays 462 and 463 and the release of relays 464, 465 and 466.

When brush B8 engages segment 542, a circuit is completed from positive battery over conductor 553, wiper 554 and fourth bank contact of switch 483, the left hand make contact and left hand winding of relay 507, the right hand winding of relay 506 and resistances 555 and 556 to negative battery. Relay 506 is operated, and relay 507 is held operated during the engagement of the brush with the segment. However, as soon as this connection is broken, relay 507 releases for the reason that its previous locking circuit through the right hand winding is opened at the first break contact of relay 506. The release of relay 507 closes a circuit from ground through its seventh right hand break contact, the right hand winding of relay 482, the third right hand make contact of relay 505 and resistance 556 to negative battery, thereby operating relay 482.

A blank character is received over the B multiplex channel at this time to release relays 467 to 471, inclusive.

As brush B8 engages segment 543, the confirmation test for Character 1 is made. In making this test, positive potential is connected to the left hand winding of relay 564, as previously described under "Revolution 3." Also, in this case, the positive potential which is applied to the left hand winding of this relay is connected through the first right hand break contact of relay 507, the left hand make contact of relay 482, conductor 3 of cables 481a and 481, the second make contact of relay 462, conductor 1 of cables 481 and 481b, the third make contact of relay 506, the sixth break contact of relay 507, conductor 4 of cables 481b and 481, the second make contact of relay 463, conductor 5 of cables 481 and 481a, the first right hand make contact of relay 482, wiper 576 and fourth bank contact of switch 483, conductor 1 of cables 591a and 591, the second left hand make contact of relay 484, downward on conductor 562, conductor 577, the fourth make contact of relay 506, conductor 7 of cables 481b and 481, the second break contact of relay 464, conductor 8 of cables 481 and 481a, the second right hand make contact of relay 482, wiper 579 and fourth bank contact of switch 483, conductor 3 of cables 591a and 591, the second left hand break contact of relay 485, downward on conductor 561, conductor 596, the second left hand break contact of relay 486, conductor 5 of cables 591 and 591a, the fourth bank contact and wiper 583 of switch 483, the third right hand make contact of relay 482, conductor 10 of cables 481a and 481, the second break contact of relay 465, the second break contact of relay 466, conductor 13 of cables 481 and 481a, the fourth right hand make contact of relay 482, wiper 585 and fourth bank contact of switch 483, conductor 7 of cables 591a and 591, the second left hand break contact of relay 487, downward on conductor 558, over conductor 586 and through the right hand winding of relay 564 where it joins the circuit through the left hand winding of this relay and is continued through the first break contact of relay 544, the first break contact of relay 545 and resistance 573 to negative battery. Thus, in this case, it is seen that both windings of relay 564 neutralize one another to prevent the relay from operating in response to the completion of the confirmation test.

It will be noted that, in order to complete the circuit through the right hand winding of relay 564, it is necessary to establish a complete path through the contacts of all of the relays and the contacts of the stepping switch 483 which are involved in the operation of one or more of the relays in a switching group under the control of the storage relays of the A multiplex channel. Such a circuit includes these contacts in a series connection so that, if there is even one faulty contact, or if one or more of the relays are not in their proper positions, it is impossible to complete the circuit through the right hand winding of relay 564, thereby resulting in the operation of this relay to stop transmission over the circuit from the sending station in a manner similar to that disclosed in the copending Pierson et al. case referred to and also herein in the section entitled "Automatic system control."

*Revolution 7.*—While a regular character is being received on the A multiplex channel, the engagement of brush B8 with segment 542 closes a circuit from positive battery, over conductor 553, wiper 554 and fourth bank contact of switch 483 and the left hand break contact of relay 507 to the junction of the circuit through the left hand winding and the left hand make contact of relay 505 and resistance 557, thereby neutralizing the negative battery connected to the resistance and releasing relay 595. As a result, relays 482 and 506 are released as described under "Revolution 4."

A blank character is received over the B multiplex channel to release relays 467 to 471, inclusive.

The engagement of brush B8 with segment 543 advances the wipers of switch 483 from their fourth to their fifth bank contacts in the manner described under "Revolution 4." The stepping of the wipers completes a circuit which may be traced from ground through the right hand break contact of relay 546, conductor 547, wiper 548 and fifth bank contact of switch 483, the winding of relay 490, the first right hand make contact of relay 484, the first right hand break contacts of relays 485, 486, and 487, and resistance 597 to positive battery, effecting the operation of relay 490. It will be noted that this relay is invariably operated at this time during a switching operation for effecting a new connection between a subscriber and a subchannel, since at least one of the relays 484, 485, 486 and 487 will be operated for aiding in establishing a part of the connection. By means of the make contact of this relay, ground is connected to the circuit leading from the armature for a purpose to be described under "Revolution 8."

*Revolution 8.*—The pattern signal for Character 2 is received over the A multiplex channel and effects the operation of relays 462, 463, 464 and 466 and the release of relay 465.

Upon the engagement of brush B8 with segment 542 relay 505 is operated to effect the operation of relay 507 in the manner described under "Revolution 5" with the exception that wiper 554 of switch 483 is at this time in engagement with its fifth bank contact.

A normal character is received on the B multiplex channel to open the circuit through the second break contact of relays 467 to 471.

When, during the engagement of brush B8 with segment 543, relay 482 is operated as described under "Revolution 5," a circuit is closed for the operation of relay 491. This circuit may be traced from positive battery through the right hand winding of relay 491, conductor 14 of cables 591 and 591a, the fifth bank contact and wiper 583 of switch 483, the third right hand make contact of relay 482, conductor 10 of cables 481a and 481, the second break contact of relay 465, conductor 12 of cables 481 and 481b and the second right hand make contact of relay 507 to ground. As soon as relay 491 is operated, it is locked from positive battery through its right and left hand windings, its first left hand make contact, conductors 598 and 599, the first break contact of relay 533, the first break contact of relay 529, conductor 593 and the break contact of relay 594 to ground.

It should also be noted that relays 488 and 489, if and when operated, are locked through their first left hand make contacts independently of any other relays. Thus, when either one or both of these relays is operated under the control of one or both of relays 463 or 464, the condition is maintained until it is desired to reposition these relays. In the present case it is required for the selection of the subchannel group designated for illustration that both relays be released. Since this was the condition assumed, these relays are unaffected in the present case. But, in order to describe the action of these relays under other conditions, suppose for the moment that prior to the operation of relay 482, relay 488, for example, was operated and locked. Also assume that relay 489 is released but, in order to select a subscriber group other than the one selected for illustration, the operation of this relay and the release of relay 488 are required. In order to effect the release of relay 488 and the operation of relay 489, storage relay 463 must be operated and storage relay 464 must be released. Then, with the operation of relay 482, a circuit is completed from positive battery through resistance 601, the sixth make contact of relay 507, conductor 4 of cables 481b and 481, the second make contact of relay 463, conductor 5 of cables 481 and 481a, the first right hand make contact of relay 482, wiper 576 and its fifth bank contact, conductor 10 of cables 591a and 591, the left hand winding and first left hand make contact of relay 488 to ground. The energization of the left hand winding of this relay neutralizes the effect of the energized right hand winding, thereby effecting the release of the relay under the control of the operated storage relay 463. Another circuit is closed by the operation of relay 482 which may be traced from positive battery through the right and left hand windings of relay 489, conductor 12 of cables 591 and 591a, the fifth bank contact and wiper 579 of switch 483, the second right hand make contact of relay 482, conductor 8 of cables 481a and 481, the second break contact of relay 464, conductor 7 of cables 481 and 481b, and the fourth break contact of relay 506 to ground. In this manner relay 489 may be operated under the control of the released storage relay 464.

To resume consideration of the assumed conditions, that is, for the selection of subscriber group I, relays 488 and 489 are released by the operation of relays 463 and 464 as described. The ground which is applied by the make contact of relay 490 to the contacts of relays 488 and 489 is extended through the right hand break contact of relay 488 and the second right hand break contact of relay 489 over conductor 602 to the left hand terminal of the winding of relay 515. Since the other terminal of this relay is also connected to ground, there is no response thereby at this time.

Upon the disengagement of brush B8 from segment 543, the wipers of switch 483 are advanced to their sixth bank contacts in the manner described under "Revolution 5." The disengagement of wiper 548 of switch 483 from its fifth bank contact removes the ground from the winding and contact of relay 490. This relay is not released, however, since ground is also applied to the contact and winding through the winding of relay 515. This latter relay, however, is now operated, since the short circuit is removed from around its winding.

The operation of relay 515 controls the starting of the stepping switch 508. In order to describe this action, it may be well to consider the conditions existing just prior to the operation of the relay. Negative battery is applied through a relatively low resistance 603 and the interrupter contacts of switch 508, the left hand winding of relay 517, the second break contact of relay 515, to the anode of tube 512 and to one side of a condenser 604. The other side of the condenser is connected to ground and, since the resistance in the circuit from the negative battery is relatively low, the condenser is charged to approximately the full negative potential of the battery connected to resistance 603. This negative potential is applied through a relatively high resistance 605, to the control grids of stepping tubes 511. Also connected to these grids is another source of negative potential through a resistance 606, having a value substantially equal to that of resistance 605. The cathodes of the tubes 511 are both connected to negative potential of a lesser value than those connected to the grids. Consequently, these tubes are held non-conducting under these conditions. The negative potential which is connected through resistance 603 is also connected through the left hand winding of relay 517 and a relatively high resistance 607 to the grid of an auxiliary control tube 512. There is also connected to this grid a second negative potential through resistance 608, having a value substantially equal to that of resistance 607. The cathode of this tube is connected to negative potential of a lesser value than those connected to its grid, and consequently this tube is also maintained non-conducting.

Upon the operation of relay 515, the connection between the condenser 604 and the negative potential derived through resistance 603 is interrupted, and the condenser starts to dissipate the negative charge and to accumulate a positive charge derived from a source of positive potential connected through a relatively high resistance 611. Because of the presence of the relatively high resistance in this positive charging circuit, the rate of change of the potential on the condenser 604 is relatively slow. It will be noted that the operation of relay 515 has no effect upon the control circuit of the auxiliary tube 512 at this time. When the potential to which the condenser 604 is being charged reaches a value such that the potential applied to the grids of tubes 511 rises to a predetermined value above the cut-off point, the tubes become conducting to the extent necessary to operatively energize the winding of the stepping magnet 612 of the switch 508. It will be noted that the space current for the tubes is derived from the positive battery connected to this stepping magnet winding.

The energization of the stepping magnet opens the interrupter contacts and disconnects the negative battery through the relatively low resistance 603 from the network of resistances controlling the auxiliary tube 512. The positive potential that is applied to the grid of tube 512 through a resistance 613, which is low relative to the equal resistances 607 and 608 and high relative to the resistance 603, then has more effect upon the grid of tube 512 than has the negative potential derived through the resistance 608. This tube becomes conducting and completes a circuit from negative battery connected to its cathode through the space discharge path of the tube to the condenser 604. Thus, a relatively low impedance discharge path to negative battery is provided for the condenser 604 which substantially instantaneously assumes a negative charge sufficient to depress the grid-to-cathode potentials of the tubes 511 below the cut-off point, thereby rendering these tubes non-conducting and releasing the stepping magnet 612 of the switch 508. The wipers of the switch are thus advanced to their next bank contacts and negative battery is again connected through the interrupter contacts and is effective to overcome the positive battery applied to the grid of tube 512 through resistance 613 to render this tube non-conducting. This causes the disconnection of negative battery from the condenser 604 which again begins to accumulate a positive charge through the previously described circuit.

It will be noted that, after the wipers of switch 508 are advanced to their next bank contacts, there is produced a time lag before the stepping magnet 612 is again operatively energized. This delayed action is accomplished by means of the relatively slow charging of the condenser 604 to positive potential. The purpose of this arrangement is to insure that the wipers of the switch 508 make the proper test of the settings of relays 484 to 487, inclusive, required, and which is to be described.

The wipers of the switch 508 are stepped successively over their bank contacts from whatever point they happen to be resting after the last preceding operation thereof until they become engaged with their respective contacts which are associated with the subchannel to be selected in accordance with the setting of the relays 484 to 487, inclusive. Wipers 614 and 615 of switch 508 are connected respectively to the first and second make contacts of relay 515. As long as these wipers are engaged with contacts other than those associated with the subchannel to be selected, the circuits from one bank of contacts to the other are open. When these wipers step onto the bank contacts associated with the subchannel to be selected, there is a complete circuit between the first bank contacts associated with these two wipers through the contacts of relays 484 to 487, inclusive.

Since it is assumed that subchannel 1 is to be selected, the engagement of wipers 614 and 615 with their first bank contacts closes a circuit which may be traced from positive battery through the first make contact of relay 515, wiper 614 and first bank contact of switch 508, conductor 616, the second right hand break contact of relay 486, the second right hand make contact of relay 484, the second right hand break contact of relay 485, the third right hand break contact of relay 487, conductor 617, the first bank contact and wiper 615 of switch 508, the second make contact of relay 515, and resistance 607 to the grid of tube 512. It is seen that the effect of the circuit through the contacts of relay 515, the wipers and bank contacts of switch 508 and the contacts of relays 484 to 487, inclusive, is to short-circuit resistance 613. The potential of the grid of tube 512 is thus raised to a value with respect to its negtaive cathode sufficient to maintain conduction in the tube. This will be appreciated, even though negative potential through resistance 603 and the left hand winding of relay 517 is also connected to the upper terminal of resistance 607, when it is considered that the positive potential which is also connected to this terminal is applied thereto by the described circuit without the inclusion therein of any appreciable resistance. Consequently, the effect of the negative potential is substantially neutralized by the positive potential allowing the grid of the tube 512 to be raised substantially to or above the cathode potential.

With the tube 512 continuously conducting, negative potential is maintained on the condenser 604, thereby depressing the grid-to-cathode potentials of the tubes 511 below the cut-off point. These tubes are then maintained non-conducting to prevent the further energization of the stepping magnet 612 to effect any further stepping operations of the wipers of switch 508.

Also, upon the closure of the described test circuit, positive potential is applied to the left hand terminal of the left hand winding of relay 517 and, since the interrupter contacts of the stepping switch 508 will have been closed by this time, the other terminal of this winding is connected to negative battery through resistance 603, thereby effecting the operation of relay 517. The operating circuit of the stepping magnet 612 thus is opened at a second point at the second break contact of relay 517. With the operation of this relay, no further operations of this apparatus are effected until some subsequent switching operation occurs.

*Revolution 9.*—The confirmation signal for Character 2 is received over the A multiplex channel and operates relays 462 and 465 and releases relays 463, 464 and 466.

The engagement of brush B8 with segment 542 operates relay 506, which releases relay 507, which in turn operates relay 482 in the manner described under "Revolution 6," with the exception that wiper 554 of switch 483 is engaged with its sixth bank contact.

A blank character is received over the B multiplex channel and releases relays 467 to 471, inclusive.

The engagement of brush B8 with segment 543 makes the confirmation test of Character 2. This test is made in the manner similar to the test made and described under "Revolution 6," with the exception that the contacts of relays 488, 489, 491 and 492 and wipers 576, 579, 583 and 585 of switch 483 in cooperation with their respective sixth bank contacts are employed together with the common relay apparatus.

*Revolution 10.*—While a regular character is being received on the A multiplex channel, the engagement of brush B8 with segment 542 releases relay 505, which in turn releases relays 482 and 506. This operation is the same as a corresponding operation described under "Revolution 7," with the exception that wiper 554 of switch 483 is engaged with its sixth bank contact.

A blank character is received over the B multiplex channel to release relays 467 to 471, inclusive.

The engagement of brush B8 with segment 543 advances the wipers of the switch 483 to their seventh bank contacts in the manner described under "Revolution 4."

*Revolution 11.*—The pattern signal for Character 3 is received over the A multiplex channel and effects the operation of relays 462, 463, 465 and 466 and the release of relay 464.

The engagement of brush B8 with segment 542 operates relay 505, which in turn operates relay 507. These operations are the same as corresponding operations described under "Revolution 5," with the exception that wiper 554 of switch 483 is engaged with its seventh bank contact.

A normal character is received over the B multiplex channel to position relays 467 to 471, inclusive, in some combination representative of the received character.

The engagement of brush B8 with segment 543 operates relay 482 for the duration of the engagement to operate relay 494. This circuit may be traced from positive battery through the right hand winding of the relay, conductor 20 of cables 591b and 591a, the seventh bank contact and wiper 579 of switch 483, the second right hand make contact of relay 482, conductor 8 of cables 481a and 481, the second break contact of relay 464, conductor 7 of cables 481 and 481b and the fourth break contact of relay 506 to ground. It may be seen that the operating circuits for relays 493, 495 and 496 are incomplete at the second break contacts of relays 463, 465 and 466, respectively, thereby preventing the operation of the former relays. Relay 494 after operation is locked from positive battery through its right and left hand windings, its first left hand make contact and over a circuit including conductor 599 similar to that described in connection with the locking of relay 491 under "Revolution 8" to ground at the break contact of relay 594.

Relays 491, 492 and 493 are used to condition the cathodes of a horizontal row of vacuum tubes comprising the tube network 530. Only the tubes appearing at the corners of this network are illustrated herein, but it will be understood that the network comprises seven horizontal rows of seven tubes each. There is omitted from the network the tube which would appear at the center thereof so that the network comprises a total of 48 tubes, such as the tube 531.

In this case, with relay 491 operated and relays 492 and 493 released, a circuit is established from negative battery through resistance 618, the right hand make contact of relay 491, the first right hand break contact of relay 492, the second right hand break contact of relay 493 to conductor 619. Connected to this conductor are the cathodes of the top row of vacuum tubes including the tube 531. It will be seen that other horizontal rows of tubes are similarly conditioned by other operative combinations of the relays 491, 492 and 493.

Normally, there is connected to the grids of each vertical row of vacuum tubes in the network 530 negative potential of a higher value than that connected at any time to the cathodes of the tubes. For example, in the left hand vertical row of tubes negative potential is connected through relatively high resistances 620 and 621 to the grids of all the tubes in this row. Similar connections are made through other like resistances to the grids of other vertical rows of tubes.

With relay 494 operated and relays 495 and 496 released, ground is connected through the right hand make contact of relay 494, the first right hand break contact of relay 495, the second right hand break contact of relay 496 and conductor 622 to the junction of resistances 620 and 621. The negative potential connected to resistance 620 is thus effectively short-circuited, and the grids of the left hand vertical row of tubes are raised to ground potential. It will be seen that the tube lying at the intersection of the horizontal row of operatively conditioned cathodes and the vertical row of operatively conditioned grids is the tube 531. All other tubes, including the remaining six in the left hand vertical row, are not completely conditioned for operation. Hence, tube 531 is rendered conducting for use at a later step in the series of connecting operations described under "Revolution 13."

After brush B8 becomes disengaged from segment 543, the wipers of switch 483 are advanced to their eighth bank contacts in a manner similar to that described under "Revolution 5."

*Revolution 12.*—The confirmation signal for Character 3 is received over the A multiplex channel and effects the operation of relays 462 and 464 and the release of relays 463, 465 and 466.

The engagement of brush B8 with segment 542 operates relay 506, which releases relay 507, which in turn operates relay 482. These operations are the same as the corresponding operations described under "Revolution 6," with the exception that wiper 554 of switch 483 is engaged with its eighth bank contact.

A blank character is received over the B multiplex channel and effects the release of relays 467 to 471, inclusive.

The engagement of brush B8 with segment 543 makes the confirmation test of Character 3 in a manner similar to that of other confirmation tests, such as that described under "Revolution 6." In this case, however, the contacts of relays 493 to 496, inclusive, and wipers 576, 579, 583 and 585, together with their respective eighth bank contacts, are employed.

*Revolution 13.*—While a regular character is being received on the A multiplex channel, brush B8 engages segment 542 to release relay 505 which effects the release of relays 482 and 506 in the manner described under "Revolution 7," with the exception that wiper 554 of switch 483 is engaged with its eighth bank contact.

A normal character is received over the B multiplex channel during this revolution to operate at least one of the relays 467 to 471 to its marking or make contact.

The engagement of brush B8 with segment 543 advances the wipers of switch 483 to their ninth bank contacts in the manner described under "Revolution 4."

It will be remembered that the stepping action of switch 508 is purposely retarded in the manner and for the purpose described. By the time that wiper 548 of switch 483 is moved into engagement with its ninth bank contact, however, the stepping of switch 508 normally will have been completed and relay 517 will have been operated in the manner described so that the stepping of the wipers of switch 483 at this time initiates a series of operations culminating in the connection of the subscriber's receiving line to the subchannel apparatus. But, in view of the fact that the start of this series of operations also depends upon the operation of relay 517, which may be delayed, additional time is allowed for the relay operation by strapping together the ninth and tenth bank contacts associated with wiper 548 of switch 483. Consequently, the switch wipers may be advanced to their tenth bank contacts and still effect the initiation of the series of operations referred to when relay 517 does operate.

For the purpose of the present description, however, assume that prior to the engagement of wiper 548 with its ninth bank contact, relay 517 is operated. A circuit is then completed from ground through the right hand break contact of relay 546, conductor 547, wiper 548 of switch 483 and its ninth bank contact, conductors 623 and 624, the first make contact and right hand winding of relay 517, the winding of relay 519 and resistance 625 to positive battery. Relay 519 is operated, and relay 517 is prevented from releasing at this time.

The operation of relay 519 at its fifth break contact opens the locking circuit for relays 484 to 487, inclusive. Thus, relay 484, which is the only one of this group of relays operated, is released and opens the operating circuit through the windings of relays 490 and 515, permitting these relays to release. The release of relay 515 restores the control circuits of tubes 511 and 512 to their normal idle conditions. The operation of relay 519 also starts the stepping operation of one of the subscriber connecting switches 521 or 522.

It may be well to examine the condition of the circuits employed for the control of tubes 523 and 528 prior to the operation of relay 519. There is a connection from negative battery through a relatively high resistance 626 to the control grids of tubes 523. There is another connection to these control grids through resistance 627 which has a value substantially equal to that of resistance 626, resistance 628 which has a value approximately half that of resistances 626 and 627, the fourth break contact of relay 519 to negative battery connected to the third armature of relay 529. Since the cathodes of tubes 523 are connected to negative battery, which may have a value of approximately one-half of that of the battery connected to resistance 626, the grid-to-cathode potentials of the tubes are held below the cut-off point, thereby rendering the tubes non-conducting.

A condenser 629 is at this time in a state of substantial discharge, the upper plate being connected through the third break contact of relay 529 to negative battery and the lower plate being connected through a resistance 631, which preferably has a value substantially five times that of resistance 628, the fourth break contact of relay 519, to the negative battery connected to the third armature of relay 529. Consequently, the control grid of tube 528 has applied thereto substantially the full negative potential connected to the condenser 629 and, since the cathode of this tube is connected to ground, this tube also is non-conducting.

When relay 519 operates, negative potential is disconnected at the fourth break contact of the relay from resistance 628. Positive potential connected through a relatively low resistance 632 becomes effective at this time by acting through resistances 626 and 627 to raise the potentials of the grids of tubes 523 sufficiently above the cut-off points to render the tubes conducting to the extent necessary to operatively condition the stepping magnet 633 of switch 521. This circuit may be traced from positive battery through the winding of the stepping magnet 633, the interrupter contacts, the second left hand break contact of relay 534, the first bank contact and wiper 634 of switch 508, the second make contact of relay 519 and the space discharge paths of the tubes 523 in parallel to negative battery.

The wipers of switch 521 are stepped successively over their respective bank contacts by means of the described stepping circuit until wiper 635 engages its first bank contact. A circuit is then completed from the negative battery connected to the cathode of tube 531 of the network 530 by means of the contacts of relays 491, 492 and 493, through the space discharge path of the tube, conductor 1 of cables 636*a* and 636, the first bank contact and wiper 635 of switch 521, the first bank contact and wiper 637 of switch 508, the third make contact of relay 519 and resistance 627 to the control grids of the tubes 523. The grid-to-cathode potentials of these tubes are thus depressed below the cut-off point, rendering the tubes non-conducting and preventing further stepping of the wipers of switch 521.

While the tubes 523 are conducting during the stepping of switch 521, the potential at the point of junction of resistance 638 with the circuit from the plates of tubes 523 is maintained negative with respect to ground due to the relatively low impedance of the space discharge paths through the tubes to negative battery as compared to that through the stepping magnet 633 to positive battery. The current flowing to this point from positive battery through resistances 632, 631 and 638 produces a negative potential at the grid of tube 528 because resistance 631 is large relative to resistance 638. This tube, therefore, is maintained in its non-conducting state during the previously described operation. When the tubes 523 are rendered non-conducting to disconnect negative battery from the junction point, the potential thereof becomes substantially that of the positive battery connected to stepping magnet 633. As a consequence, the potential of the grid of tube 528 becomes sufficiently positive to render this tube conducting. At the same time condenser 629 is given a charge so that the lower plate thereof is positive with respect to the upper plate.

The operative conditioning of tube 528 operates relay 529 through the winding of which space current is derived from positive battery. Negative battery is disconnected at the third break contact of relay 529 from the condenser 629 so that it may become more positively charged for the purpose of prolonging the conductive condition of the tube 528. The purpose of such an arrangement is to provide ample time for the completion of operations effective upon the actuation of relay 529.

Negative potential is connected through the third make contact of relay 529, over conductors 639 and 641 to the control grids of tubes 523, thereby holding these tubes non-conducting independently of the network tube 531. At the first break contact of relay 529 the locking circuit for relays 491 and 494 is interrupted, allowing these relays to release and to render the tube 531 non-conducting. The release of relay 494 closes a circuit from ground through the right hand break contact of the relay, the second right hand break contact of relay 495, the fourth right hand break contact of relay 496 and conductor 642 to the junction point between resistance 625 and the winding of relay 519. This ground effectively short-circuits the windings of relays 517 and 519, thereby effecting their release.

The operation of relay 529 also completes a circuit from negative battery through the third make contact, conductor 643, the second make contact of relay 529, wiper 644 and first bank contact of switch 589, the left hand winding of relay 534, wiper 645 and first bank contact of switch 521, the winding of relay 646 and resistance 647 to positive battery, thereby effecting the operation of relays 534 and 646. These relays are locked through a circuit which may be traced from positive battery through resistance 647, the winding of relay 646, the first bank contact and wiper 645 of switch 521, the left hand winding of relay 534, resistance 648, the first left hand make contact of relay 534, the third left hand break contact of relay 536 and rectifier 649 to ground. The rectifier is poled to offer a high resistance to the flow of current through resistance 648 and the locking circuit from the negative battery connected to the contacts of relay 529 while this relay is operated. Such a current, if permitted to flow, would adversely affect the operating circuit of relays 534 and 646 and, in addition, would tend to prevent a change of polarity at the bank contacts associated with wiper 645 of switch 521 for a purpose to be described in the section of the specification entitled "Receiving subscriber to subchannel connection," subtitle (3).

Figure 23:
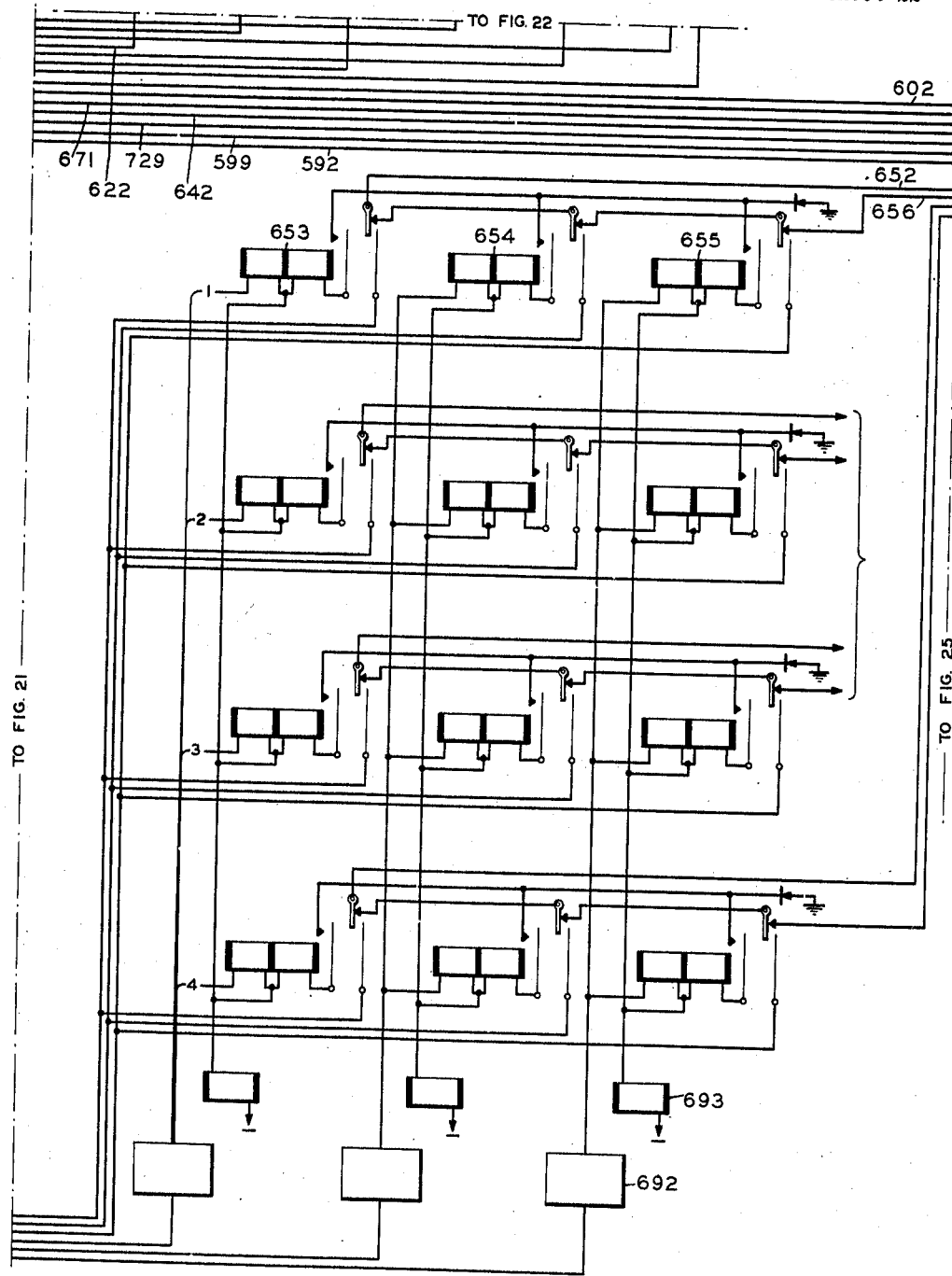
Figure 24:
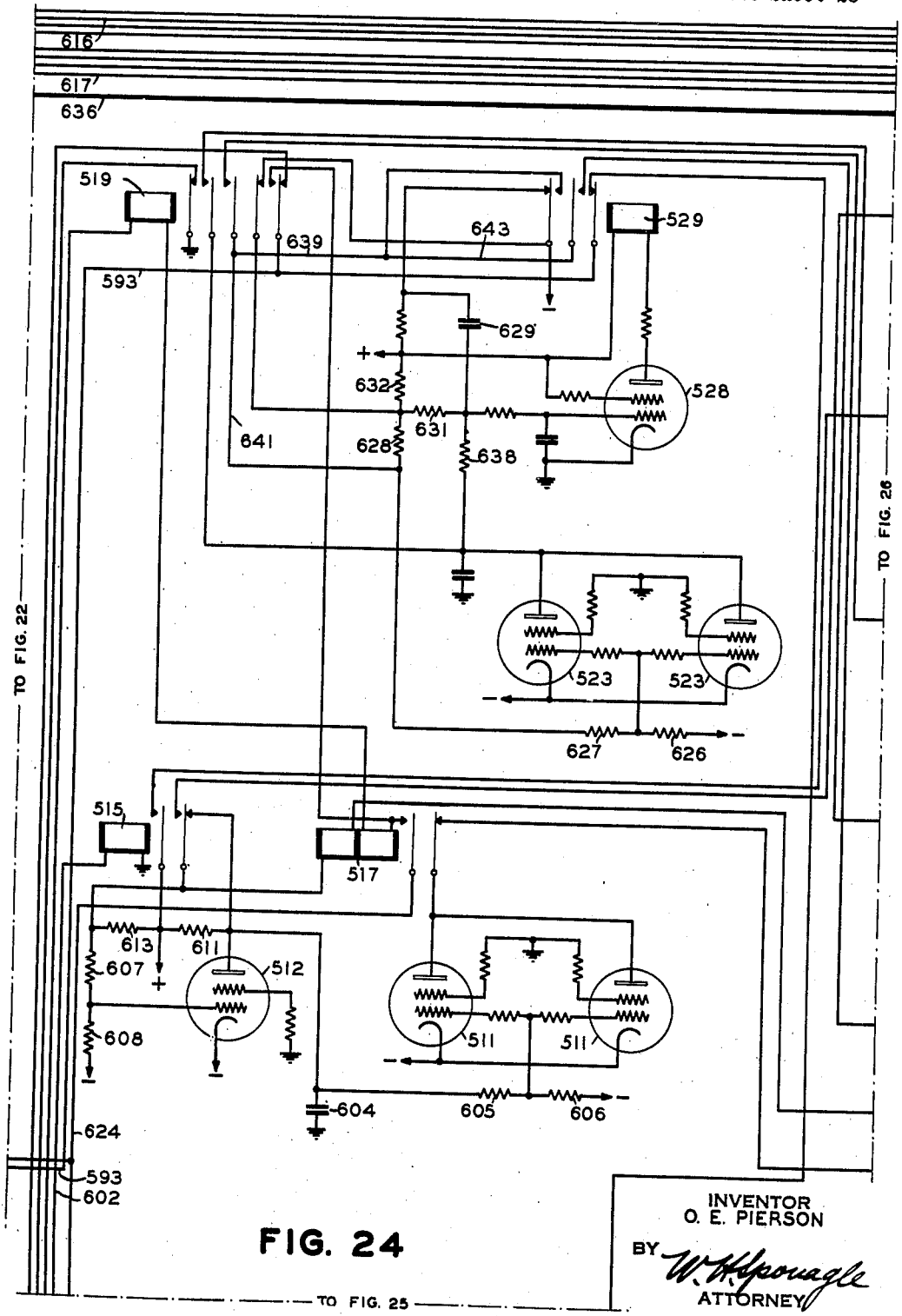
Figure 25:
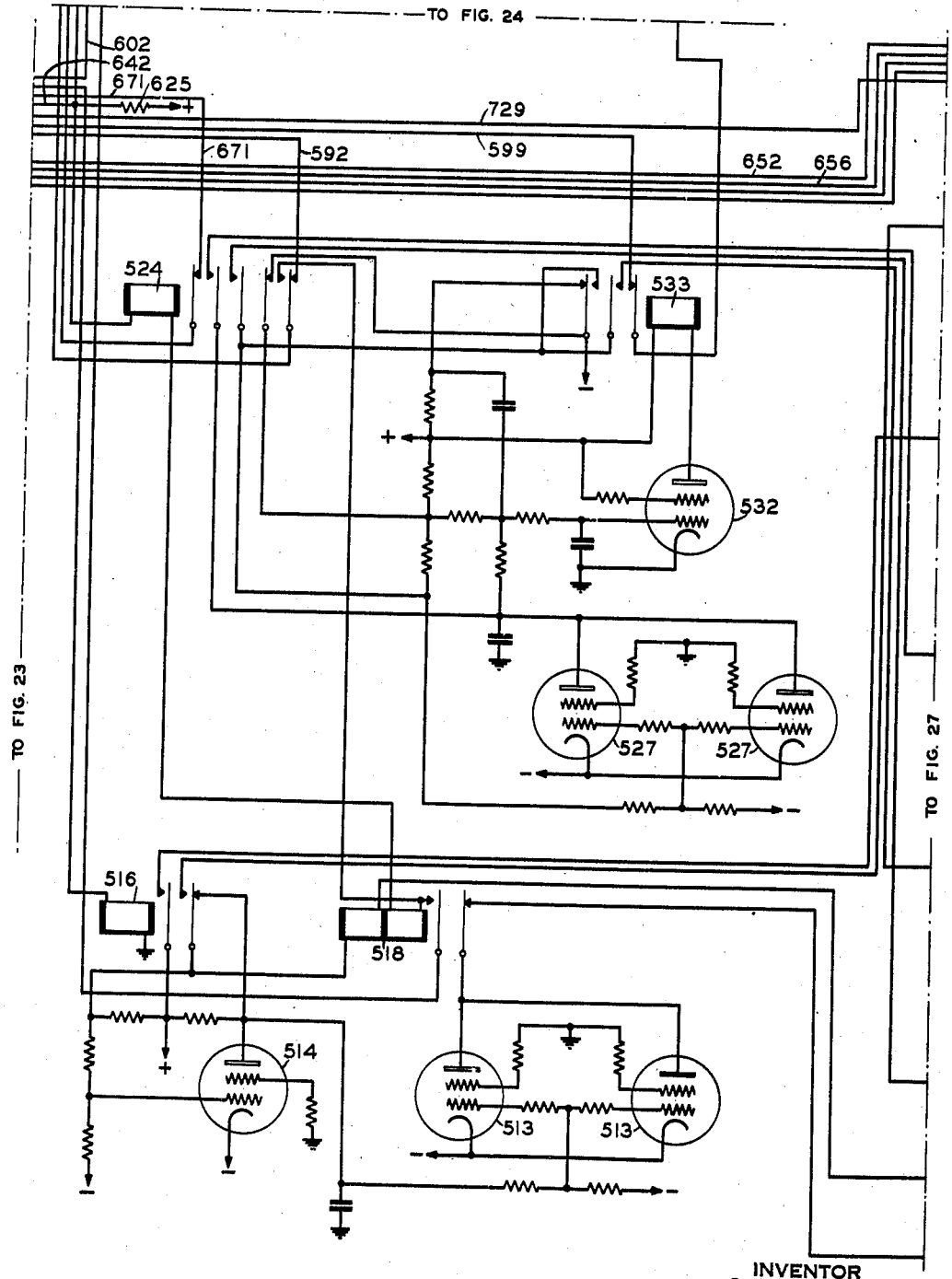
Figure 26:
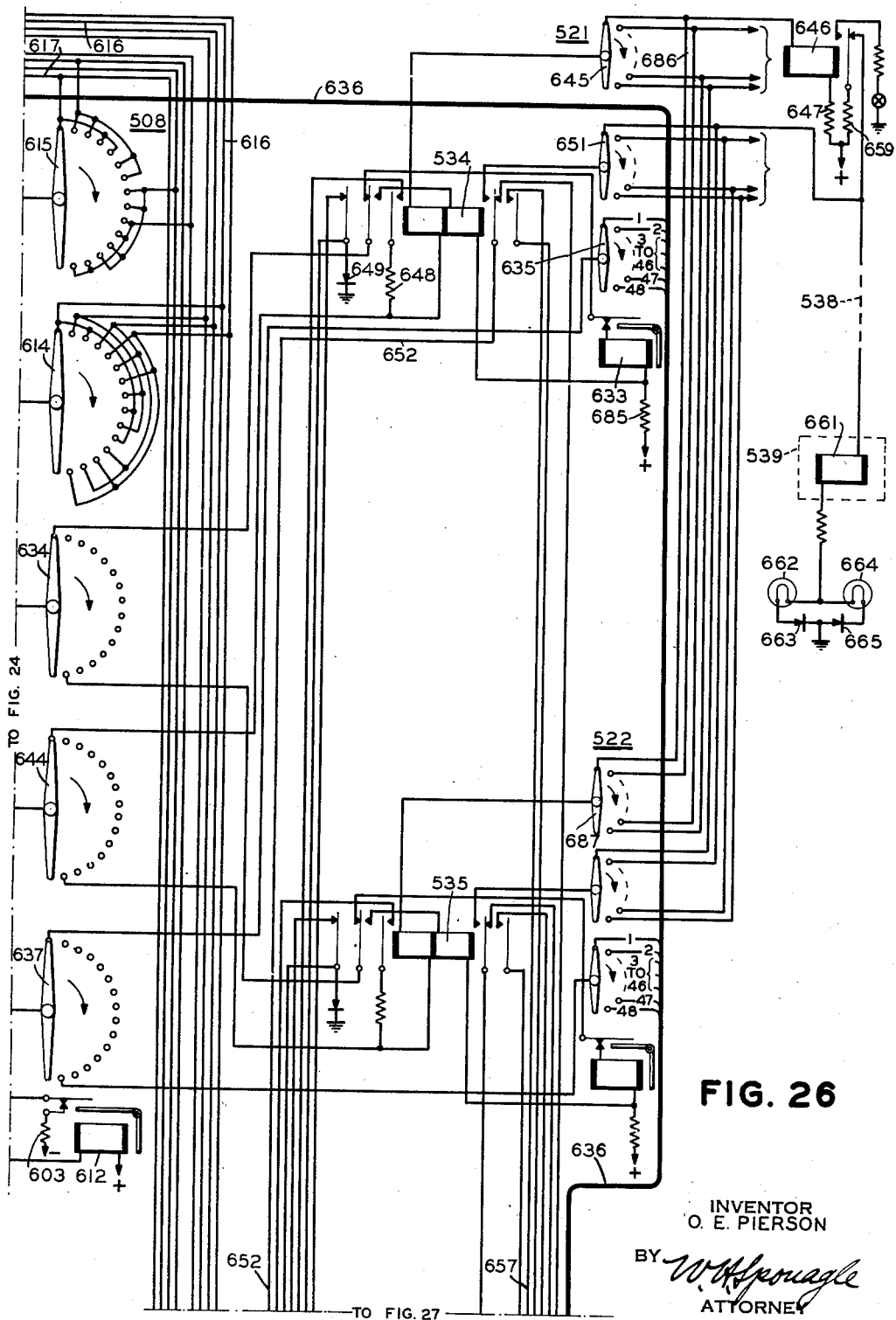
Figure 27:
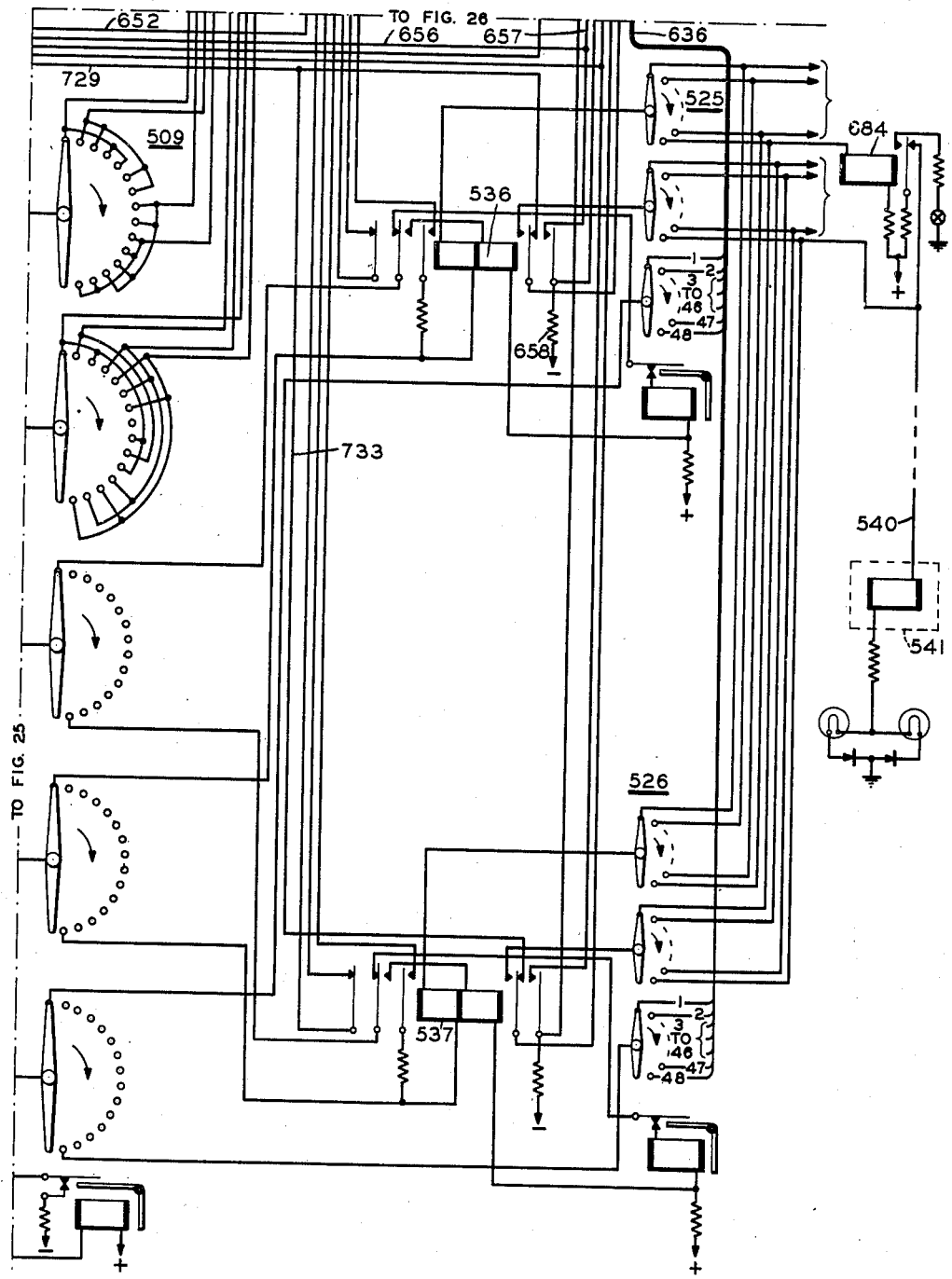

The operation of relay 534 completes a circuit from the line 538 associated with subscriber 1 of group I through the first bank contact and wiper 651 of switch 521, the first right hand make contact of relay 534 and conductor 652 to the relay chain mixer apparatus associated with subchannel 1 which is shown diagrammatically in Fig. 23. Conductor 652 is connected through the second break contacts of relays 653, 654 and 655 over conductor 656, upward on conductor 657, the second right hand make contact of relay 534 and resistance 658 to negative battery. Concurrently with the connection of this negative battery to the subscriber's line 538, the positive idle or standby battery hitherto connected to the subscriber's line through resistance 659 and the break contact of relay 646 is disconnected by the operation of this relay.

Also, it will be observed that prior to the operation of relays 534 and 646 the positive standby battery connected through resistance 659 is conducted through the winding of the selector magnet 661 of the subscriber's receiving apparatus 539, lamp 662 which, for example, may be red, and rectifier 663 to ground. When the connection to the subchannel apparatus is effected and relays 534 and 646 are operated in the manner described, negative potential connected to the subscriber's line 538 is conducted through a lamp 664 which may be colored green and a rectifier 665 to ground. The extinguishing of the red light 662 and the lighting of the green light 664 is an indication to the subscriber that his receiving apparatus is about to function.

As soon as relay 519 releases, the negative potential connected to the third armature of relay 529 is connected by means of the fourth break contact of relay 519 to the junction point of resistances 531 and 532. Thus, there is established a circuit to negative battery from the lower plate of condenser 629 to charge this plate to a negative potential with respect to ground. This circuit includes the relatively high resistance 631 and is connected to negative battery at the third armature of relay 529. After the condenser has become charged sufficiently negative to depress the grid-to-cathode potential of the tube 528, relay 529 is released and the apparatus for stepping the switch 529 is restored to normal.

The series of operations starting with the operation of relay 519 and ending with the release of relay 529 requires very little time for completion, since the stepping of the switch 521 is effected very rapidly. Also, this series of operations is illustrative of but one of several typical operations encountered under the varying conditions of the system operation. In order not to interrupt the continuity of this section of the specification, the operation of this apparatus under the other conditions will be considered later in the specification in the section entitled "Receiving subscriber to subchannel connection."

*Revolutions 14, 15 and 16.*—While regular characters are being received over the A multiplex channel and normal characters over the B multiplex channel during these revolutions of the multiplex distributor, no operations are performed by the successive engagements of brush B8 with segment 542.

The engagements of brush B8 with segment 483 during these revolutions of the distributor step the wipers of the switch 483 over their tenth and eleventh bank contacts in the manner described under "Revolution 4" so that, at the end of "Revolution 16," the wipers are engaged with their twelfth bank contacts.

*Revolution 17.*—During the receipt of a regular character over the A multiplex channel, no operations are effected by the engagement of brush B8 with segment 542.

A blank character is received over the B multiplex channel to effect the release of relays 467 to 471, inclusive.

The engagement of brush B8 with segment 543 advances the wipers of switch 483 to their thirteenth bank contacts in the manner described under "Revolution 4."

The engagement of wiper 548 of switch 483 with its thirteenth bank contact closes a circuit from ground through the right hand break contact of relay 546, over conductor 547, wiper 548 and thirteenth bank contact of switch 483, to the right hand terminal of the left hand winding of relay 667. The left hand terminal of this winding is connected by conductor 668 and resistance 597 to positive battery. However, if relays 484 to 487, inclusive, are released properly, this positive potential is also connected through the first right hand break contact of the relays and the first break contact of relay 667 to the right hand terminal of the left hand winding of this relay. In this case, the relay is not operated but, if one or more of the relays 484 to 487, inclusive, is not properly released, the last described circuit is incomplete, thereby effecting the operation of relay 667, which is effective to stop transmission over the circuit in the manner described in detail in the copending Pierson et al. case referred to, and which will be referred to in a section of this specification entitled "Automatic system control." The purpose of making this test is to insure that relays 484 to 487 are properly released so that they can respond correctly to the next group of switching signals transmitted from the sending station.

*Revolution 18.*—The pattern signal for the first subchannel group is received over the A multiplex channel and effects the operation of relays 462, 464, 465 and 466 and the release of relay 463.

The engagement of brush B8 with segment 542 effects the operation of relay 505, which in turn operates relay 507 in substantially the same manner as that described under "Revolution 5," with the exception that wiper 554 of switch 483 is engaged with its thirteenth bank contact.

A normal character is received over the B multiplex channel to set the storage relays 467 to 471, inclusive, in some combination other than that resulting from the reception of a blank character.

The engagement of brush B8 with segment 543 operates relay 482 for the duration of the engagement. A circuit is thus closed from positive battery through the right and left hand windings of relay 497, conductor 30 of cables 591c, 591b and 591a, the thirteenth bank contact and wiper 576 of switch 483, the first right hand make contact of relay 482, conductor 5 of cables 481a and 481, the second break contact of relay 463, conductor 7 of cables 481 and 481b and the fourth break contact of relay 506 to ground. Relay 497 operates and locks from positive battery through its right hand winding and first left hand make contact over conductor 669 and the break contact of relay 594 to ground. The operation of relay 497 conditions the receiving relay chain mixer for the inclusion of subchannel 1 in its connecting operations.

Upon the disengagement of brush B8 from segment 543, the wipers of switch 483 are advanced to their fourteenth bank contacts in the manner described under "Revolution 5."

*Revolution 19.*—The confirmation signal for the first subchannel group is received and effects the operation of relays 462 and 463 and the release of relays 464, 465 and 466.

The engagement of brush B8 with segment 542 operates relay 506 which releases relay 507, which in turn operates relay 482 in the manner described under "Revolution 6," with the exception that wiper 554 of switch 483 is engaged with its fourteenth bank contact.

A blank character is received over the B multiplex channel and releases relays 467 to 471, inclusive.

The engagement of brush B8 with segment 543 makes the confirmation test of the first subchannel group in the manner described under "Revolution 6," with the exception that the contacts of relays 497, 498, 499 and 501 and wipers 576, 579, 583 and 585, together with their respective fourteenth bank contacts are employed.

*Revolution 20.*—While a regular character is being received over the A multiplex channel, the engagement of brush B8 with segment 542 releases relay 505, which effects the release of relays 482 and 506 in the manner described under "Revolution 7," with the exception that wiper 554 of switch 483 is engaged with its fourteenth bank contact.

A normal character is received over the B multiplex channel to open the circuit through the second break contacts of relays 467 to 471.

The engagement of brush B8 with segment 543 advances the wipers of switch 483 to their fifteenth bank contacts in the manner described under "Revolution 4."

*Revolutions 21, 22, 23 and 24.*—During these revolutions regular characters are received over the A multiplex channel and normal characters over the B multiplex channel.

No operations are performed by the engagements of brush B8 with segment 542.

The successive engagements of brush B8 with segment 543 steps the wipers of switch 483 over their sixteenth, seventeenth and eighteenth bank contacts so that, at the end of "Revolution 24," the wipers are engaged with their nineteenth bank contacts.

At this time the release of relays 491 to 496, inclusive, 519 and 529 is tested. A circuit is closed for this purpose which may be traced from ground through the right hand break contact of relay 546, conductor 547, wiper 548 and nineteenth bank contact of switch 483, the right hand winding of relay 667, conductor 670 and resistance 618 to negative battery. If relays 491 to 493, inclusive, 519 and 524 are released properly, there is a second circuit from negative battery through resistance 618, the right hand break contact of relay 491, the second right hand break contact of relay 492, the fourth right hand break contact of relay 493, conductor 671, the first break contact of relay 524, and the first break contact of relay 519 to ground. Hence, it is seen that the right hand winding of relay 667 is short-circuited, thereby preventing the operation of this relay. It may be seen also that the proper release of relays 494 to 496, inclusive, is tested incidentally when it is remembered that it was the release of all of these relays which effected the release of relays 519 and 517.

*Revolutions 25 and 26.*—Regular characters are received over the A multiplex channel and normal characters over the B multiplex channel during these revolutions.

The engagements of brush B8 with segment 542 do not effect any operations.

The engagements of brush B8 with segment 543 advance the wipers of switch 483 from their nineteenth to their twenty-first bank contacts. At this time a circuit is closed from ground through the right hand break contact of relay 546 over conductor 547, wiper 548 and twenty-first bank contact of switch 483 and the winding of relay 545 to positive battery, thereby effecting the operation of this relay.

The purpose of operating relay 545 at this time is to prepare the receiving apparatus for the reception and confirmation of a final guard character if it is sent. It was assumed, however, that such a character was not sent, and consequently this portion of the description will be continued upon that assumption. The operation of the receiving apparatus following the reception of a final guard character will be described subsequently in this section.

*Revolution 27.*—Normally, a regular character is received over the A multiplex channel and a normal character over the B multiplex channel.

The engagement of brush B8 with segment 542 does not effect the operation of any of the receiving apparatus.

The engagement of brush B8 with segment 543 steps the wipers of switch 483 from their twenty-first to their first bank contacts in the manner described under "Revolution 4." The disengagement of wiper 548 from its twenty-first bank contact opens the operating circuit for relay 545 and this relay releases. The engagement of this wiper with its first bank contact closes the operating circuit described in the paragraph preceding "Revolution 1" of this section of the specification to operate relay 544. The operation of this relay operates relay 506 in the manner described in the paragraph referred to.

Thus, the receiving switching apparatus is restored to its normal idle condition which is maintained until another blank character is received over the B multiplex channel as a result of the completion of the common test circuit or the automatic starting apparatus at the sending station becoming effective to initiate another series of operations such as that described.

If, during "Revolution 26" of the multiplex distributor, a blank character is received over the B multiplex channel while relay 545 is operated, the confirmation testing apparatus is employed to check the reception of the final guard character. It will be remembered that with the switches at the sending station engaged with their twenty-first bank contacts the generation of a blank character by some of the subchannel apparatus which happens to be connected to the B multiplex channel at the time causes the sending station apparatus to detect the blank character and to send the final guard character on the following revolution of the multiplex distributor.

The final guard character is received over the A multiplex channel during "Revolution 27" and effects the operation of relay 462 and the release of relays 463 to 466, since this character is the letter "V" in which the first impulse is spacing and the remaining impulses are marking.

While this is occurring, brush B8 engages segment 542 to close the circuit for the operation of relay 505 as described under "Revolution 5," with the exception that wiper 544 is engaged with its twenty-first bank contact. This time, however, the operation of relay 505 does not operate relay 507 for the reason that the previously described circuit for accomplishing this result is incomplete at the second break contact of relay 545. Instead, there is completed a circuit which may be traced from positive battery through resistance 551, the second right hand make contact of relay 505, the second make contact of relay 545, conductor 552, and the left hand winding of relay 506 to ground. The operation of relay 505 also completes the circuit described under "Revolution 6" to operate relay 482.

The engagement of brush B8 with segment 543 makes the confirmation test of the final guard character set up in the storage relays 462 to 466, inclusive, by connecting positive battery over conductor 565, the first right hand make contact of relay 505, the second make contact of relay 506, conductors 566 and 567, and through the left hand winding of relay 564. Before tracing the remainder of this circuit, the circuit through the confirmation apparatus will be traced. This circuit continues from the second make contact of relay 506, through the first right hand break contact of relay 507, the left hand make contact of relay 482, conductor 3 of cables 481a and 481, the second make contact of relay 462, conductor 1 of cables 481 and 481b, the third make contact of relay 506, conductor 574, upward on conductor 563, conductor 673, the twenty-first bank contact and wiper 576 of switch 483, the first right hand make contact of relay 482, conductor 5 of cables 481a and 481, the second break contacts of relays 463 and 464, conductor 8 of cables 481 and 481a, the second right hand make contact of relay 482, wiper 579 and twenty-first bank contact of switch 483, conductor 474, the twenty-first bank contact and wiper 583 of switch 483, the third right hand make contact of relay 482, conductor 10 of cables 481a and 431, the second break contacts of relays 465 and 466, conductor 13 of cables 481 and 481a, the fourth right hand make contact of relay 482, wiper 585 and twenty-first bank contact of switch 483, conductor 475, downward on conductor 558, over conductor 586, and through the right hand winding of relay 564 where it joins the circuit traced through the left hand winding of this relay. This common circuit may be further traced through the first break contact of relay 544, the first make contact of relay 545, conductors 569 and 571 and the left hand winding of relay 572 to negative battery through resistance 573. Since the confirmation test is completed, relay 564 does not operate and relay 572 is energized to effect the stepping of the wipers of switch 483 to their first bank contacts. Relay 545 is released in the manner described and, at its second make contact, interrupts the operating circuit of relay 506. But it is seen that the circuit from ground through the left hand winding and first make contact of relay 506 is immediately completed at the second break contact of relay 505 so that the former relay is not released. The engagement of wiper 548 of switch 483 with its first bank contact operates relay 544 in the manner described.

If, while the operations described in the preceding paragraph are occurring, a blank character is not received over the B multiplex channel, relays 467 to 471 will be set in some combination other than that resulting from the reception of a blank character so that at least one of them, for example, relay 471, is operated. Upon the engagement of brush B8 with segment 542 on the following revolution of the distributor, a circuit is closed from positive battery over conductor 553, wiper 554 and first bank contact of switch 483, the second make contact of relay 471, conductor 676 to the junction of resistance 557 and the first left hand make contact and left hand winding of relay 595. This winding is deenergized to release the relay which, at its third right hand make contact, interrupts the circuit through the right hand winding of relay 482 to effect its release. Thus, it is seen that the receiving switching apparatus is again restored to its normal idle condition following the confirmation test of the final guard character.

The system is provided with facilities for insuring that no more than a predetermined interval of time may occur between successive series of operations of the sending and receiving pattern switches. The apparatus for providing the automatic starting of the sending pattern switches after the lapse of a predetermined period of time following the preceding series of operations of these switches has been described. The receiving apparatus is arranged to detect a failure of the sending apparatus to initiate such a series of operations and to interrupt operation of the system.

Whenever relay 572 is operated to advance the wipers of switch 483, a circuit is momentarily closed by the make-before-break contact of this relay. This circuit may be traced from negative battery through resistance 677, the make-before-break contact of relay 572 and resistance 678 to the grid of a vacuum tube 679. Also connected between the grid and cathode of this tube is a condenser 681. Since the potential applied to the grid of the tube is of negative polarity and the cathode of the tube is connected to ground, the tube is rendered non-conducting and condenser 681 is given a negative charge. The charging circuit is through relatively low resistances and, even though closed for only short periods of time, the condenser is substantially completely charged upon each operation of relay 572. During the time that the charging circuit is open, the negative charge on the condenser is slowly dissipated through the relatively high resistance 682. The timing of the discharge circuit for the condenser 681 is set to be slightly longer than the timing of the tube 349 at the sending station. Consequently, if the pattern switches are not started by the apparatus for effecting a change in the system or by the apparatus for automatically starting these switches, the charge on the condenser 681 will be dissipated sufficiently after the lapse of a predetermined time to operatively condition the tube 679. When this tube becomes conducting, it derives its space current from positive battery through the right hand winding of relay 683 which is operated and, by means of apparatus controlled thereby, stops the system in a manner to be described in a later section of the specification entitled "Automatic system control."

RECEIVING SUBSCRIBER TO SUBCHANNEL CONNECTION

When it is desired to effect a connection between the apparatus of one of the subchannels and a subscriber's receiving apparatus, a number of different operating conditions may be encountered resulting from previous connections. There are in general four typical conditions. They are: (1) the subscriber is disconnected and the subchannel is disconnected; (2) the subscriber is disconnected and the subchannel is connected to another subscriber in the same group; (3) the subscriber is disconnected and the subchannel is connected to a subscriber in another group; and (4) the subscriber is connected to another subchannel and the subchannel is connected to another subscriber. There are, of course, other possible combinations of the above enumerated typical conditions which it will not be necessary to describe, since they are all based on the four typical conditions.

(1) *Subscriber disconnected—Subchannel disconnected.*—One condition of this type is that encountered in the preceding description under "Revolution 13" in which case subchannel 1 was connected to subscriber 1 of Group I.

It may be necessary, however, to connect subchannel 1 to any other subscriber in any of the four groups such as subscriber 48 of group IV. In this case there are operated relay 484 in response to the pattern signal of Character 1, relays 488, 489, 491 and 492 in response to the pattern signal of Character 2, and relays 493, 494, 495 and 496 in response to the pattern signal of Character 3. Switch 509 is operated under the control of tubes 513 and 514 and of relays 516 and 518. When the wipers of this switch are engaged with their first bank contacts, relay 524 is operated to initiate the stepping action of switch 525 under the control of tubes 527 to step the wipers thereof into engagement with their forty-eighth bank contacts. Then relay 533 is operated to effect the operation of relays 536 and 684, thereby connecting the receiving apparatus 541 of subscriber 48 of group IV to the apparatus of subchannel 1.

If subchannel 15 is to be connected to subscriber 1 of group I, relays 484 to 487 are operated. The wipers of switch 508 are stepped to their fifteenth bank contacts where a circuit is closed between wipers 614 and 615 through the contacts of relays 484 to 487, thereby stepping the switch in the manner described under "Revolution 13." When relay 519 is operated, the wipers of switch 522 are advanced until they become engaged with their first bank contacts. Relay 529 is then operated to operate relays 535 and 646, thereby completing a connection between the receiving apparatus 539 of subscriber 1 of group I to the apparatus of subchannel 15.

The connection of subchannel 15 to subscriber 48 of group IV is effected by the operation of relays 484 to 487 to select subscriber 15, relays 488 and 489 to select group IV and relays 491 to 496 to select subscriber 48, and the advancement of the wipers of switch 509 to their fifteenth bank contacts. The operation of relay 524 operates switch 526 until its wipers become engaged with their forty-eighth bank contacts, after which relay 533 is operated to effect the operation of relays 537 and 684, thereby completing a connection between the receiving apparatus 541 of subscriber 48 of group IV and the apparatus of subchannel 15.

(2) *Subscriber disconnected—Subchannel connected to other subscriber in same group.*—It is assumed that subscriber 1 of group I is disconnected so that relay 646 is released and that subchannel 1 is connected to some other subscriber in group I. In this case relay 534 is operated and locked in series with a relay corresponding to 646 associated with the subscriber connected to subchannel 1. Also, wipers of switch 521 are engaged with the bank contacts associated with the other subscriber. The operation of switch 508 is the same as that described under "Revolution 13." For a connection involving subchannel 1, relay 484 is operated so that the wipers of switch 508 come to rest on their first bank contacts. The operation of relay 519 closes a circuit from the anodes of tubes 523 through the second make contact of relay 519, wiper 634 and first bank contact of switch 508, the second left hand make contact and right hand winding of relay 534, and resistance 685 to positive battery. The flux generated in the right hand winding of relay 534 is in opposition to that generated in the left hand winding, thereby effecting deenergization and release of this relay. At the same time the relay corresponding to relay 646 associated with the subscriber previously connected to subchannel 1 is released. Upon the release of relay 534, the previously described circuit through the stepping magnet 533 of switch 521 is completed, thereby advancing the wipers of this switch until they becomes engaged with their first bank contacts. The operation of relay 529 then reoperates relay 534 and operates relay 646 to complete a circuit from the receiving apparatus 539 of subscriber 1 of group I to the apparatus of subchannel 1.

(3) *Subscriber disconnected—Subchannel connected to subscriber in other group.*—It is assumed that subscriber 1 of group I is disconnected and that subchannel 1 is connected to subscriber 48 of group IV. In this case it is desired to connect subchannel 1 with subscriber 1 of group I. The connection between subchannel 1 and subscriber 48 of group IV is made by the operation of relays 536 and 684 with the wipers of switch 525 engaged with their forty-eighth bank contacts. It is seen that the locking circuit for relays 536 and 684 includes the first left hand make contact of relay 536 and the third left hand break contact of relay 534. After the wipers of switch 508 are stepped to their first bank contacts, relay 519 is operated to initiate the stepping action of switch 521. Upon the engagement of the wipers of this switch with their first bank contacts, relay 529 is operated to operate relays 534 and 646. The operation of relay 534 interrupts the locking circuit for relays 536 and 684, thereby releasing these relays and breaking the connection between subchannel 1 and subscriber 48 of group IV. It is seen that the disconnection of the previously established circuit is made substantially concurrently with the establishment of the new connection between subchannel 1 and subscriber 1 of group I by the operation of relays 534 and 646.

(4) *Subscriber connected to other subchannel—Subchannel connected to other subscriber.*—It is assumed that subscriber 1 of group I is connected to subchannel 15. In this case relays 535 and 646 are operated and locked in series and the wipers of switch 522 are engaged with their first bank contacts. It is also assumed that subchannel 1 is connected to subscriber 48 of group IV, in which case relays 536 and 684 are operated and locked in series and the wipers of switch 525 are engaged with their forty-eighth bank contacts. It is desired to connect subchannel 1 with subscriber 1 of group I. The wipers of switch 508 are advanced to their first bank contacts and relay 519 is operated to initiate the stepping of the wipers of switch 521. After these wipers are stopped in engagement with their first bank contacts, relay 529 is operated and completes the operating circuit for relay 534. The operation of this relay opens the locking circuit for relays 536 and 684, thereby releasing these relays and disconnecting subscriber 48 of group IV from subchannel 1. The completion of the operating circuit for relay 534 is effected by the connection of negative battery by relay 529 through the left hand winding of relay 534 and the wiper 645 to the first bank contact of switch 521. This bank contact is at negative potential with respect to ground by reason of the previously referred to action of the rectifier 649 in preventing the shunting of the negative battery connected to the contacts of relay 529. This negative potential is also applied by conductor 636 and the first bank contact and wiper 637 of switch 522 to the left hand winding of relay 535. At the same time positive battery is also connected to this point from the previous connection through the winding of relay 646. Consequently, these two polarities either neutralize one another or produce an effective reversal of polarity upon the winding of relay 535, thereby releasing the relay. By the release of relay 535 the previous connection between subscriber 1 of group I and subchannel 15 is also broken, and by the operation of relay 534 the new one between this subscriber and subchannel 1 is established substantially concurrently.

RECEIVING RELAY CHAIN MIXER

After the connection of subscriber 1 of group I to subchannel 1 has been made in the manner described, the engagement of brush B8 with segments 689 and 691 is effective to operate relay 655 through switching circuits 692 which correspond to switching circuits shown in detail at the sending station. Relay 693 is also operated at this time in series with the right hand winding of relay 655. Relay 694 is operated by means of a circuit extending from ground through the right hand make contact of relay 497, the winding of relay 694, the third right hand break contact of relay 695, the first right hand break contact of relay 696 to positive battery.

If it is assumed that only one subchannel is in operation at this time, the message signals which are received over the C multiplex channel are stored temporarily by relays 472 to 476, inclusive. The armatures of these relays are connected respectively by conductors 5, 8, 11, 14 and 17 of cable 698 to segments of the start-stop local transmitting rings STR. The marking and spacing contacts of these relays are connected respectively to the lower and upper windings of the retransmitting relay 479. The lower winding of this relay is also connected by conductor 20 of cable 698 to a rest segment of the start-stop transmitting ring STR, and the upper winding of relay 479 is also connected by conductor 2 of cable 698 to a start segment of ring STR. This relay is of the banking type so that its armature remains in contact with either its left or right hand contact, depending upon whether the upper or lower winding was last energized.

Normally, following the retransmission of a message signal to the subscriber's receiving apparatus, brush B7 engages the rest segment of the C channel and connects ground through conductor 20 of cable 698 to energize the lower winding of the retransmitting relay 479 to position the armature on its right hand contact. Following the storage of a message signal in the C multiplex channel storage bank, brush B7 engages the start segment of the C channel and connects ground over conductor 2 of cable 698 to energize the upper winding of relay 479 and thereby move the armature to its left hand contact. The circuit which previously had been closed from negative battery through the right hand contact of relay 479, the second make contact of relay 655, the second break contacts of relays 654 and 653, conductor 652, the first right hand make contact of relay 534, wiper 651 and first bank contact of switch 521, subscriber's line 538, selector magnet 661, lamp 664 and rectifier 665 to ground is opened to transmit a start impulse to the subscriber's receiving apparatus. As brush B7 continues its traverse of the ring STR, the windings of relay 479 are energized in accordance with the settings of the contacts of relays 472 to 476 so that the message signal is retransmitted to the subscriber's receiving apparatus.

As more subscribers become connected to the system, additional subchannels are utilized. When three or more subchannels are in operation at the same time, all three multiplex channels are used for transmission of message signals, and the relay chain mixer functions in the manner described in the section under "Sending relay chain mixer" to divide the lane time substantially equally among the operating subchannels. Relays 477 and 478 are used respectively in conjunction with the A and B multiplex channel storage relays to retransmit received signals under the control of the start-stop transmitting rings STR to the connected subscriber's receiving apparatus in the same manner as relay 479 retransmits the signals received over the C multiplex channel. It should be noted in this connection that relay 478, which is associated with the B multiplex channel over which the blank characters employed with the switching signaling are received, functions to retransmit these characters to the receiving apparatus of any subscriber which happens to be connected to the B multiplex channel at the time such a character is received. However, the receiving apparatus is effective to delete these characters. When the A multiplex channel is employed for the transmission and reception of the switching signals, the upper winding of relay 477 is prevented from operating the armature of the relay for the retransmission of spacing signals to the subscriber's receiving apparatus. The operating circuit for this winding includes the second left hand break contact of relay 505 which is operated as described whenever the A multiplex channel is used for switching signaling purposes. Consequently, relay 477 is not effective to retransmit these switching signals to any of the subscriber receiving apparatus.

OTHER RECEIVING SWINGING SIGNALING

If it is assumed that only suscriber 1 of group I is operating over subchannel 1 and that, at the sending station, this subscriber stops sending, the switching signaling apparatus is started as described in the section entitled "Other sending switching signaling." When the wipers of the receiving pattern switch 483 are engaged with their thirteenth bank contacts, relays 462 to 466 are operated to their make or spacing contacts in response to the pattern signal received in which all of the impulses are spacing to represent the disconnection of all of the subchannels of the first subchannel group. The engagement of brush B3 with segment 542 operates relays 505 and 507 in the manner described to complete a circuit through the left hand winding of relay 497 from positive battery and including the sixth right hand make contact of relay 507 and the second make contact of relay 463. The two windings of relay 497 are thus energized in opposition to release the relay. With the opening of the right hand make contact of this relay, relay 694 is also released. When the brush B3 engages segments 639 and 691, relays 655 and 693 are released in a manner similar to that of relays 324 and 392 at the sending station, as described in the section entitled "Other sending switching signaling." Thus it is seen that the receiving apparatus of subchannel 1 is disconnected from the multiplex apparatus concurrently with the disconnection of the sending apparatus of this subchannel. The connection between the receiving apparatus of subscriber 1 of group I to the subchannel apparatus is not disturbed, being completed through the second break contacts of relays 653 to 655 to the negative battery connected to resistance 658.

If subscriber 1 of group I again begins to transmit before the connection between his sending apparatus and the apparatus of subchannel 1 is broken, the receiving pattern switch 483 is again started in response to signals received over the line circuit as described. When the wipers of this switch reach their thirteenth bank contacts, the operations described under "Revolution 18" of the section entitled "Receiving switching signaling" are repeated and result in the reoperation of relays 497, 694, 655 and 693 whereby the receiving apparatus of subchannel 1 is reconnected to the multiplex apparatus and the subscriber's receiving apparatus is restored to the control of the retransmitting relay 479.

SUPERVISORY SYSTEM CONTROL

The system embodying the instant invention is provided with facilities for controlling the operation of the system in much the same manner as the system disclosed in the copending case of Pierson et al. previously referred to. These facilities include "Home stop" apparatus for stopping transmission from one station to the other under the control of an attendant at the first station. "Distant stop" facilities are also provided to enable an operator at the receiving station to stop transmission from the sending station into the receiving station. Certain of these facilities are also interconnected with apparatus for effecting the automatic interruption of transmission in both directions over the circuit in the event of some failure of the apparatus to respond properly to the switching signals. These latter facilities will be considered in the section of the specification entitled "Automatic system control."

*Home stop.*—When, during the operation of the system, it is desired to stop transmission from the sending to the receiving station, an attendant at the sending station may accomplish this result. The apparatus principally involved in effecting this operation is shown in Fig. 12. It is assumed that the system is operating with one or more subscribers connected to the subchannel apparatus, and the latter is connected by means of the relay chain mixer to the multiplex transmitting apparatus. In this case certain of the relays corresponding to relays 129 and 131 are operated as a result of subscriber connections to the subchannel apparatus. Also, certain of the relays corresponding to relays 365, 444, etc., are operated and locked, and relay 437 is also operated. It is also assumed that the wipers of the switches 165 and 166 are at rest on their first bank contacts, as shown.

At this time the attendant desiring to stop transmission from the sending station operates the home stop switch key 699. This key is of the locking type so that it remains in its operated position until manually restored. The closure of the right hand make contact of this switch connects ground over conductor 701, the second right hand break contact of relay 368, conductor 3 of cable 366, resistance 702 to the grid of tube 349, thereby discharging condenser 373 and conductively conditioning the tube to effect the operation of relay 351. This operation is known as the completion of the common test circuit, previously described, which results in the starting of the switches 165 and 166.

It is assumed that in traversing bank contacts 1 to 9 the switching code mechanism is not operated so that no switching signals, other than the receiving switch starting signal, are transmitted over the line circuit, and the operation of none of the receiving apparatus for making a change in the subchannel and subscriber connections is effected. Of course, it should be borne in mind that it is possible to effect a change in these connections, if such a change is called for. In such a case, the appropriate group test is completed to cause the necessary switching signals to be transmitted in the manner described in the section entitled "Sending switching signaling."

With the wipers of switches 165 and 166 engaged with their tenth bank contacts, the engagement of brush B4 with segment 353 operates relay 357 in the manner described under "Revolution 16" in the section entitled "Sending switching signaling," since the group test is completed to the ground connected to the right hand make contact of switch 699 through wiper 384 and tenth bank contact of switch 166.

The engagement of brush B4 with segment 356 operates relay 358 to prepare for the transmission of a blank character over the B multiplex channel on the following revolution of the multiplex distributor.

During the following revolution of the multiplex distributor, with the wipers of switches 165 and 166 engaged with their eleventh bank contacts, relay 357 is released when brush B5 engages segment 352.

Also, a blank character is transmitted over the B multiplex channel, and the engagement of brush B4 with segment 353 operates relays 359 and 361, as previously described.

Relay 358 is released by the engagement of brush B5 with segment 354.

The engagement of brush B4 with segment 355 operates relay 364 for the duration of the engagement. The operation of this relay closes a circuit from negative battery through the fourth make contact of the relay, wiper 369 and eleventh bank contact of switch 166, conductor 10 of cable 366, the left hand make contact of the home stop key 699, conductors 703 and 704 and the left hand winding of relay 368 to ground. This relay is operated and locked from ground through its right hand make contact and right hand winding and resistance 705 to positive battery.

During the following revolution of the multiplex distributor, a pattern signal representative of the supervisory system control apparatus condition is transmitted over the A multiplex channel. The pattern signal, as before, is transmitted with the first impulse spacing. The second impulse is also sent spacing for the reason that relay 168 is operated by means of a circuit including wiper 404 and eleventh bank contact of switch 165, conductor 25 of cable 427 and the first left hand make contact of relay 368 to ground. The third impulse of the pattern signal is also sent spacing for the reason that the relay 169 is operated by means of a circuit including wiper 405 and eleventh bank contact of switch 165, conductor 27 of cable 427 and the third break contact of relay 706 to ground. The fourth and fifth impulses of the pattern signal are sent marking for the reason that relays 170 and 171 are not operated, the circuits being open at the eleventh bank contacts associated with wipers 406 and 407 of switch 165.

On the revolution of the multiplex distributor following the transmission of the pattern signal, the confirmation signal is sent. The first impulse of this signal is sent spacing as usual. The second and third impulses are sent marking for the reason that relays 168 and 169 are not operated, since the respective circuits through wipers 404, 405 and the twelfth bank contacts are open respectively at the first left hand break contact of relay 368 and the third make contact of relay 706. The fourth and fifth impulses of the confirmation signal character are sent spacing for the reason that relays 170 and 171 are both operated by circuits extending to ground at the twelfth bank contacts associated with wipers 406 and 407 of switch 165.

Before considering the results produced by the reception of the pattern and confirmation signals transmitted as described, the results produced by the operation of relay 368 at the sending end will be considered. The opening of the second left hand break contact of relay 368 releases relay 437 immediately so that the impulse generated by the engagement of brush B5 with segments 438 and 439 which follows closely upon the operation of relay 368 will be diverted by means of the released contacts of relay 437 to prevent the operation of the relays of the mixer ordinarily controlled thereby. The closure of the second left hand make contact of relay 368 operates relay 296 through an obvious circuit. Also, the opening of the third left hand break contact of relay 368 opens the common and group test circuits associated with the regular switching apparatus, thereby insuring that the switches 165 and 166 will not be operated to send pattern and confirmation signals during the remainder of their cycles of operation. The opening of the second right hand break contact of relay 368 opens the described test circuit through the right hand make contact of the home stop key 699.

The operation of relay 296 opens the locking circuits of the relay chain mixer control relays such as relays 365 and 442 to 444, inclusive, thereby effecting the release of any of these relays which may be operated. Also, at the second break contact of relay 296 the locking circuits of the relays corresponding to relays 129 and 131 are opened, thereby effecting the release of all such relays. Relay 342 is prevented from being operated by the opening of the first break contact of relay 296.

The release of the control relays such as relay 365, etc., prepares for the release of connecting relays such as relays 322, 323, 324, etc., in the manner described in the section entitled "Other sending switching signaling." With the connecting relays released, further stepping of the tape transmitters such as transmitter 152 is prevented. The subchannel connections of all subscribers having unsent tape are maintained, however, by the continued operation of all relays such as relays 145 to 148. The manner in which this is effected will be described in the section entitled "Miscellaneous features."

Following the transmission of the pattern and confirmation signals representative of the home stop condition, the wipers of switches 165 and 166 are stepped uninterruptedly over their remaining bank contacts, finally stopping in their normally idle positions in engagement with the respective first bank contacts in the manner described.

By referring to the figures comprising the receiving station of the system, the reception of the pattern and confirmation signals for effecting a home stop of the system will be considered. Operation of switch 483 is initiated in the manner described. With the wipers of the switch engaged with their eleventh bank contacts, relays 462, 463 and 464 of the A multiplex channel storage bank are operated and relays 465 and 466 are released in response to the pattern signal.

Upon the engagement of brush B8 with segment 543, relay 695 is operated by means of a circuit similar to that described under "Revolution 5" of the section entitled "Receiving switching operation," with the exception that this time the wiper 576 of switch 483 is engaged with its eleventh bank contact and the circuit includes conductor 25 of cables 591a, 591b and 591d and both windings of relay 695, terminating in ground. It will be noted that the operation of relay 464 does not effect the operation of relay 707 at this time, as normally would be expected, for the reason that the operating circuit for this relay terminates in positive battery through the fifth right hand make contact of relay 507.

Before considering the results of the operation of relay 695, the circuit for making the confirmation test effective upon the receipt of the confirmation signal during the following revolution of the multiplex distributor will be traced, since this circuit is somewhat different from other confirmation circuits previously described. Relays 462, 465 and 466 are operated and relays 463 and 464 are released by the received confirmation signal. Upon the engagement of brush B8 with segment 543, the confirmation test circuit is closed through the left hand winding of relay 564 in the manner previously described. The circuit through the right hand winding of this relay may be traced from the second make contact of relay 506, through the first right hand break contact of relay 507, the left hand make contact of relay 482, conductor 3 of cables 481a and 481, the second make contact of relay 462, conductor 1 of cables 481 and 481b, the third make contact of relay 506, conductor 574, downward on conductor 563, conductor 708, the left hand make contact of relay 695, conductor 26 of cables 591d, 591b and 591a, the twelfth bank contact and wiper 576 of switch 483, the first right hand make contact of relay 482, conductor 5 of cables 481a and 481, the second break contacts of relays 463 and 464, conductor 8 of cables 481 and 481a, the second right hand make contact of relay 482, wiper 579 and twelfth bank contact of switch 483, conductor 28 of cables 591a, 591b and 591d, the left hand break contact of relay 707, upward on conductor 561, conductor 581, the fourth right hand break contact of relay 507, conductor 9 of cables 481b and 481, the second make contact of relay 465, conductor 10 of cables 481 and 481a, the third right hand make contact of relay 482, wiper 583 and twelfth bank contact of switch 483, conductor 709, the twelfth bank contact and wiper 585 of switch 483, the fourth right hand make contact of relay 482, conductor 13 of cables 481a and 481, the second make contact of relay 466, conductor 11 of cables 481 and 481b, the third right hand break contact of relay 507, downward on conductor 558 and over conductor 586 through the right hand winding of relay 564 where it joins the circuit through the left hand winding of this relay and is continued to negative battery through resistance 573 over the circuit previously described.

When relay 695 operates, it is locked from ground through the left hand winding and first right hand make contact of the relay to positive battery. The operating circuit for relay 694 is opened at the third right hand break contact of relay 695 to produce the immediate release of this relay in order to prevent the impulse generated by the engagement of brush B8 with segments 689 and 691, following closely upon the operation of relay 695, from operating any of the relay chain mixer relays in a manner similar to the corresponding arrangement described in connection with the operation of the sending station apparatus. The engagement of the second right hand make contact of relay 695 closes a circuit from positive battery, through the winding of relay 594 to ground, thereby effecting the operation of this relay.

Upon the opening of the break contact of this relay, the locking circuits for all of the switching signaling decoding relays such as relays 484 to 487, inclusive, and 491 to 496, inclusive, are interrupted. By the time that the wipers of switch 483 have been advanced sufficiently to cause the operation of relay 594 in response to the reception of a home stop signal, the decoding relays will have been released in the manner described. However, the opening of the locking circuits for these relays provides added insurance against their premature subsequent operation and locking so that, when the system is restored to normal, the decoding relays will all be in their released positions ready to respond to the switching signals. The opening of the break contact of relay 594 also interrupts the locking circuits for the mixer control relays such as relays 497 to 499, inclusive, and relays 501 to 504, inclusive. The release of all of these relays also removes ground from the operating circuit of relay 694, thereby opening this circuit at a second point.

Thus, it is seen that, at the receiving station, the connections between the subchannel apparatus and the multiplex receiving apparatus are interrupted, thereby cutting off the receiving apparatus from the line circuit. But here also it should be noted that the connections between the subchannel apparatus and the receiving apparatus of the subscribers are not affected in any way, since any relays such as relays 534 to 537, inclusive, which may have been operated are maintained in this condition, and the wipers of the stepping switches such as 521, 522, 525 and 526 are maintained in connection with their bank contacts. This condition is incidental, however, since it will be demonstrated presently that, upon the resumption of operation, switching signals will be sent to effect these connections. Where the proper connections exist, the signals serve to confirm the conditions.

As soon as it is desired to resume operation of the system, the attendant at the sending station restores the home stop key 699 to its normal unoperated position. The engagement of the right hand break contact of this switch closes a circuit from ground through the second left hand break contact of relay 711 and the second right hand make contact of relay 368 to conductor 3 of cable 365 to close the common test circuit described for the operation of the tube 349 and the relay 351 to initiate a cycle of operation of the switches 165 and 166. When wiper 369 of switch 166 is engaged with its eleventh bank contact, relay 364 is operated by the engagement of the brush B4 with segment 355. The closure of the fourth make contact of relay 364 connects negative battery through wiper 369 and the eleventh bank contact of switch 166, over conductor 10 of cable 366, the left hand break contact of the home stop key 699, the first left hand break contact of relay 711 to the junction of resistance 705 and the right hand winding of relay 368. Thus, the positive battery which is also connected to this point is neutralized and effects the release of relay 368. There is effected the release of relay 296 by the opening of the second left hand make contact of relay 368 and the restoration to normal of the common and group test circuits by the engagement of the third left hand break contact of this relay.

With the wipers 404 to 407, inclusive, of switch 165 engaged with their eleventh bank contacts, the pattern signal representative of the restoration of the home stop key to normal is set up on the A channel of the multiplex apparatus. Relay 167 is operated to send the first impulse of this signal spacing as before. Relay 168 is not operated for the reason that the operating circuit is open at the first left hand make contact of relay 368, thereby sending the second impulse of this signal marking. Relay 169 is operated as before to send the third impulse of the signal spacing for the reason that its operating circuit is closed to ground at the third break contact of relay 706. The fourth and fifth impulses of the signal are sent marking, since relays 170 and 171 are not operated, their circuits being open at the eleventh bank contacts associated with wipers 406 and 407 of switch 165.

When the wipers of switch 165 are advanced to their twelfth bank contacts, the confirmation signal is set up on the A channel of the multiplex apparatus in the familiar manner so that this character is sent with the first, second, fourth and fifth impulses spacing and the third impulse marking.

No further operations of the sending apparatus are effected during the remainder of this traverse of the bank contacts by the wipers of switches 165 and 166.

At the receiving station upon the reception of the pattern signal representing the restoration of the home stop key at the sending station to its normal unoperated position relays 462 and 464 are operated and relays 463, 465 and 466 are released.

When the wipers of switch 483 are engaged with their eleventh bank contacts so that wiper 576 is in connection with conductor 25 of cable 591a, brush B8 engages segment 543 to operate relay 482. A circuit previously described applies ground through the fourth break contact of relay 506 to the right hand winding of relay 695 so that this winding becomes energized in opposition to the left hand locking winding of this relay to effect its release. Upon release, the operating circuit for relay 594 is interrupted at the second right hand make contact of relay 695, thereby effecting the release of the former relay, which restores ground to the locking circuits of the switching signaling decoding relays and the relay chain mixer control relays. Also, at the third right hand break contact of relay 695, the operating circuit for relay 694 is restored to the control of the mixer control relays such as 497, etc.

The reception of the confirmation signal operates relays 462, 463, 465 and 466 and releases relay 464 so that when brush B8 engages segment 543 on the next revolution a confirmation test is made in the usual manner to check the release of relay 695.

While the wipers of switch 483 are stepping over their remaining bank contacts, no further operations of the receiving apparatus are effected.

After the sending station apparatus has been restored to its normal condition following the restoration of the home stop key 699, the switching signaling apparatus starts to restore the connections between the multiplex transmitting apparatus and the subchannel apparatus so that message transmission over this circuit may be resumed. This reconnection is done in precisely the same manner as the similar connection described in detail previously in this specification. It is to be noted that for the establishment of each connection the switches 165 and 166 are required to make a complete traverse of their bank contacts.

In response to the reception of the switching signals sent from the sending station for the reestablishment of the previously existing connections between the multiplex apparatus and the subchannel apparatus, the receiving decoding and switching apparatus is operated in the manner described previously in the specification to reestablish corresponding connections at the receiving station.

*Distant stop.*—The attendant at one station may desire to stop transmission from the distant station to his station. It should be borne in mind that a system of this character, as previously mentioned, is ordinarily operated over a circuit in the well-known duplex manner. In this case each station is provided with transmitting and receiving apparatus. Consequently, an attendant at the station in which the detailed receiving apparatus of this disclosure is located is provided with a distant stop switch key such as the key 712 illustrated in Fig. 12 to control transmitting apparatus such as that shown in detail at the sending station of this disclosure. This key is of the locking type so that it remains in its operated position until manually restored. Upon the operation of this key, ground is connected by means of the left hand make contact through the second break contact of relay 706 to conductor 3 of cable 366 to close the common test circuit whereby relay 351 is operated to start a cycle of operation of the switches 165 and 166.

When wiper 384 of switch 166 is engaged with its eleventh bank contact, and brush B4 engages segment 355 to operate relay 364, a circuit is closed from negative battery through the first make contact of the relay, the left hand break contact of relay 381, the second break contact of relay 382, conductor 383, wiper 384 and eleventh bank contact of switch 166, conductor 4 of cable 366, the right hand make contact of switch 712 and the right hand winding of relay 706 to ground, thereby operating this relay which locks through its first make contact and left hand winding to positive battery through resistance 713. The operation of this relay effects the generation of a pattern signal representative of the operation of the distant stop key in which the first impulse is spacing and the other impulses are marking. The confirmation signal which is sent when the wipers of switch 165 are engaged with their twelfth bank contacts is a signal in which all impulses are sent spacing.

When the pattern and confirmation signals are received at the other end of the system by the receiving apparatus located, in this instance, at the station illustrating the transmitting apparatus, a relay corresponding to relay 707, shown in the detailed receiving apparatus of this disclosure, is operated in a manner similar to the operation of any of the other switching or control relays previously described. In this case the operating circuit includes the second break contact of relay 464, wiper 579 and eleventh bank contact of switch 483 and conductor 27 of cables 591a, 591b and 591d. The relay 707 is locked from ground through its right hand make contact and its left hand winding to positive battery.

Having described the operation of relay 707 in response to a distant stop signal, reference will be made to the transmitting apparatus for the description of the control of this apparatus effected by such a relay.

Figure 19:
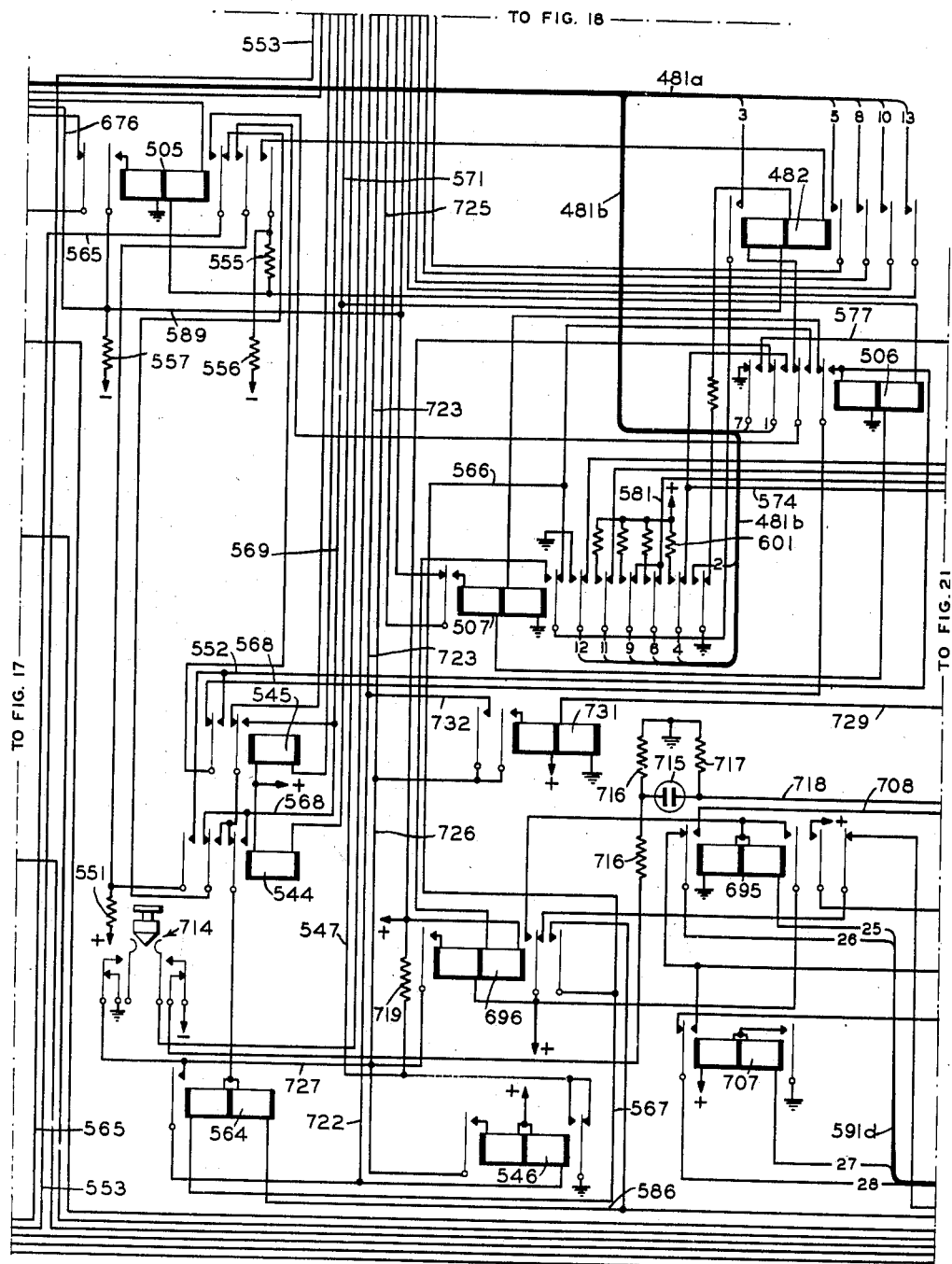
Figure 20:
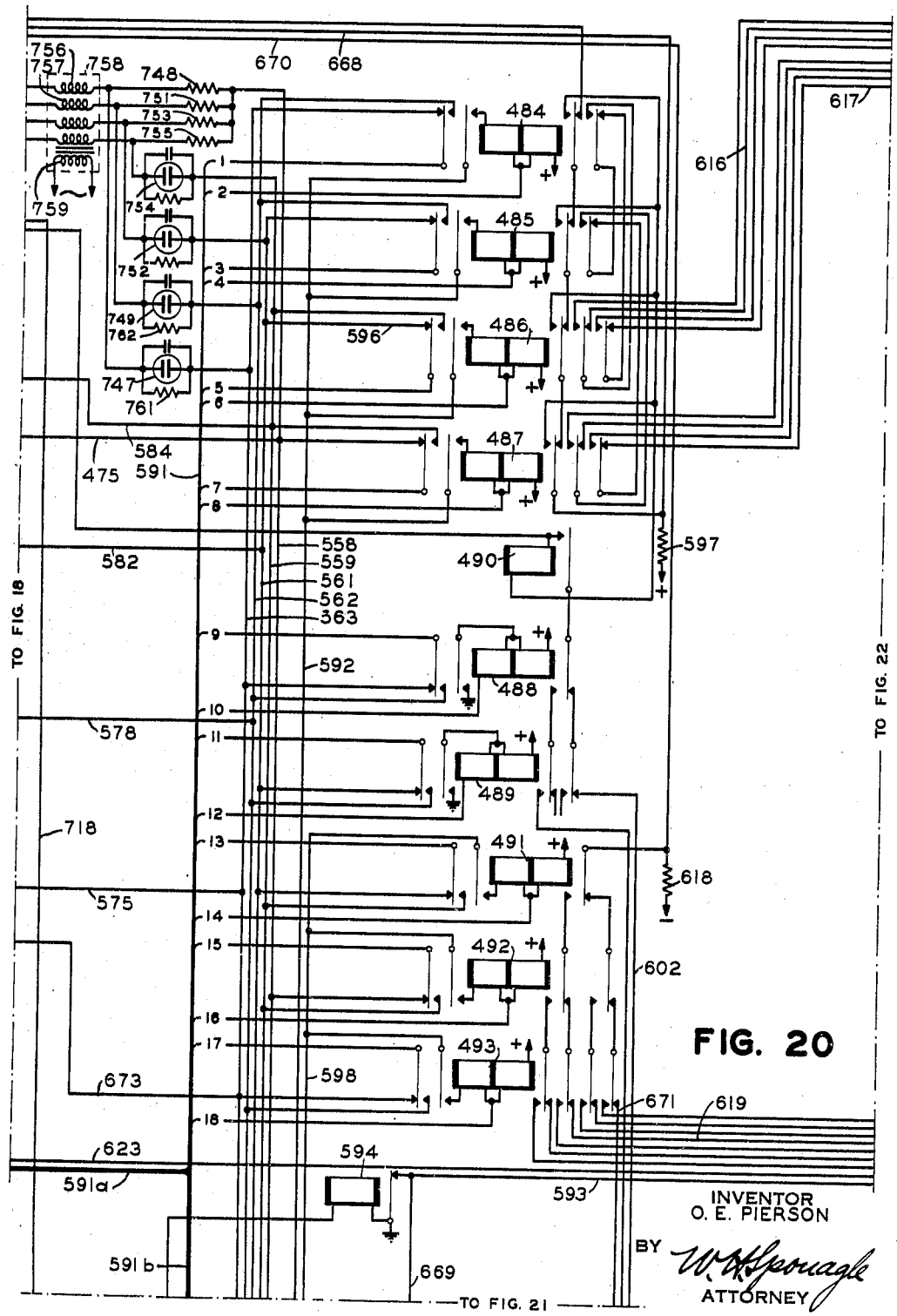
Figure 21:
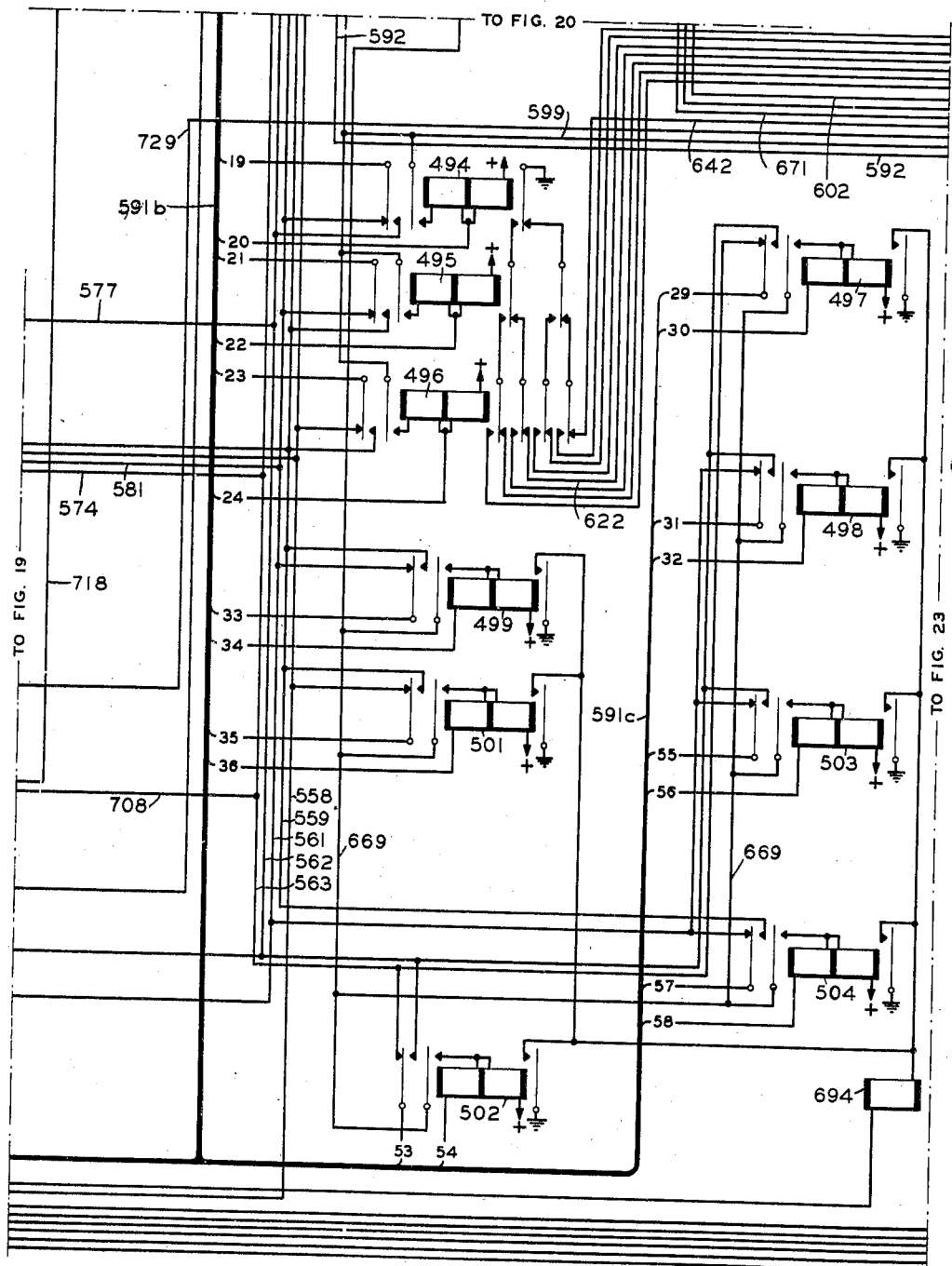
Figure 22:
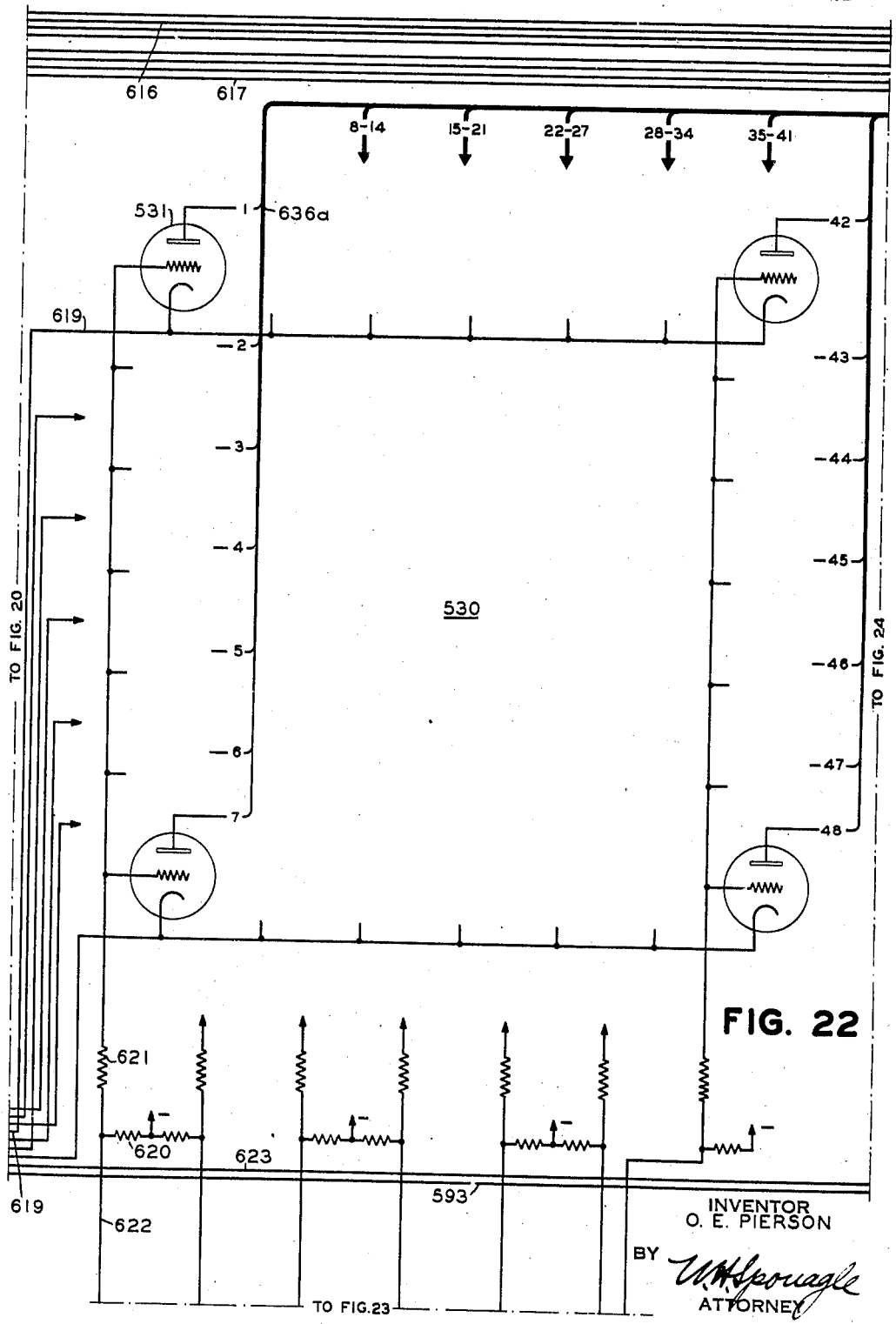

Here, relay 711, Fig. 12, corresponds to relay 707, Fig. 19, and is operated and locked in the manner described. The effect of the operation of relay 711 upon the transmitting apparatus is to apply ground through the right hand break contact of the home stop key 699, the second left hand make contact of relay 711, conductor 701 and the second right hand break contact of relay 368 to conductor 3 of cables 366 to close the common test circuit, effecting the operation of relay 351 to start the switches 165 and 166 upon a cycle of operation. When wiper 369 of switch 166 is engaged with its eleventh bank contact, the operation of relay 364 by the engagement of brush B4 with segment 355 closes a circuit from negative battery through the fourth make contact of relay 364 and including conductor 19 of cable 366, the left hand break contact of the home stop switch key 699, the first left hand make contact of relay 711 and conductors 703 and 704 to the left hand winding of relay 368. This relay is operated and locked as in the previous case resulting from the operation of the key 699. Following the operation of relay 368, pattern and confirmation signals representative of a home stop condition are transmitted from the sending station to the receiving station, and the sending station subchannel apparatus is disconnected from the multiplex apparatus in the manner described in this section under "Home stop."

At the receiving station the corresponding disconnections of the receiving subchannel apparatus from the multiplex apparatus are effected in a similar manner.

When it is desired to restore the circuit to normal, the attendant at the station originating the distant stop signal releases the distant stop key, which in this case corresponds to the key 712 shown in Fig. 12. The sending pattern and control switches associated with the stop signal originating station are again started to effect the release of the relay corresponding to relay 706 and to effect the transmission from that station to the other station of pattern and confirmation signals representative of the restored condition of the circuit. These signals upon reception are utilized to release relay 711 corresponding to relay 707, which in turn initiates another cycle of operation of the switches 165 and 166 to effect the release of relay 368 and the transmission of pattern and confirmation signals representative of the restoration of the sending apparatus to normal. The reception of these signals by the receiving apparatus effects the restoration of this apparatus to normal in the manner described in this section under "Home stop."

AUTOMATIC SYSTEM CONTROL

Failure to complete the confirmation test of the received signals in the manner described results in the operation of relay 564 of Fig. 19. The operation of this relay closes a circuit for the operation of relay 546 which initiates a cycle of operations resulting in the complete shutdown of the system in both directions. The operation of relay 546 resulting from an incomplete confirmation circuit is called a "pattern failure." This relay may also be operated as a result of other events occurring at the receiving station in a manner which will be described subsequently in this section of the specification. For convenience, however, all operations of this relay are called pattern failures, even though some of them are of a somewhat different nature. In order to follow this portion of the description, it again will be necessary to keep in mind that each station connected to the terminals of the multiplex line is provided with complete transmitting and receiving apparatus. Inasmuch as some of the relays employed in the automatic control of the system are associated with both transmitting and receiving equipment, some of these relays have been duplicated in the instant disclosure. Generally speaking, relays which are operated by means of signals received over the line circuit are shown with the receiving apparatus. Of course, where these relays are used to control some of the receiving equipment, these circuits are shown. However, some of the relays which are operated by signals received over the line circuit are used to control the transmitting apparatus, and such relays are shown at the receiving station for the details of the operating circuits and also at the transmitting station for the details of the circuits controlled thereby. Rather than attempt to trace in detail the series of operations resulting from the detection of a pattern failure from beginning to end, the various steps will be described in a general manner in the sequence in which they occur. For this purpose the station at which the transmitting apparatus is shown will be designated the "East" station, and that at which the receiving apparatus is shown will be referred to as the "West" station. Reference then will be made to the appropriate figure or figures for a detailed description of the various operating and controlled circuits.

Assume that, during the reception of the switching signals at the West station described in the section entitled "Receiving switching operation," the wipers of switch 483 are engaged with any even-numbered bank contacts, such as the fourth bank contacts, as in "Revolution 6" of the section of the specification referred to above. Also assume that for one reason or another relay 484 is not operated as it should be. When the confirmation test is made, this error is detected by the failure to complete the operating circuit through the right hand winding of relay 564, thereby resulting in the operation of this relay. Relay 546 is immediately operated to start the pattern and control switches associated with the sending apparatus at the West station. Preparations also are made to send an eastbound pattern stop signal when these switches reach their third bank contacts. When this pattern stop signal is transmitted, the sending subchannel apparatus at the West station is disconnected from the multiplex apparatus, thereby stopping transmission over the circuit in an eastward direction.

The pattern stop signal which is transmitted from the West station by sending the first impulse of every pattern and confirmation signal marking instead of spacing is received by the receiving apparatus of the East station. Relay 382 is operated while the wipers of the receiving pattern switch are engaged with their third bank contacts. The receiving subchannel apparatus at the East station is immediately disconnected from the receiving multiplex apparatus to conform with the disconnection of the corresponding sending apparatus at the West station. Following the operation of relay 382, relays 403 and 368 are operated. Relay 368 stops transmission from the East station sending apparatus and relay 403 prepares for the transmission of a pattern stop signal over the circuit in a westward direction. This signal is repeatedly sent with every pattern and confirmation signal for the remainder of the cycle of operation of switches 165 and 166. Of course, the signals will represent non-operating conditions, since the sending apparatus is disconnected. The same is true of the pattern stop signal sent in an eastward direction previously referred to.

The westbound pattern stop signal is received by the illustrated receiving apparatus at the West station and results in the operation of relay 696. This relay immediately disconnects the receiving subchannel apparatus from the multiplex apparatus at the West station and operates relay 695. Thus, it is seen that transmission over the system in both directions is completely interrupted and remains in this condition until the system is restored to normal by manual operations effected by the attendants at the two stations.

The following description is for the detailed operating and control circuits of the relays referred to in the foregoing paragraphs. When relay 564 operates in response to the failure of the confirmation test to be completed, a circuit is closed from ground through the left hand break contact of a switch key 714, the make contact of relay 564 and the right hand winding of relay 546 to positive battery. This relay is operated and locked from battery through its left hand winding and left hand make contact and the left hand break contact of the key 714 to ground.

In order to enable an attendant to localize the trouble which caused the failure, a series of neon lamps is provided, each of which is associated with one of the groups of apparatus controlled by the switching signals or by the subchannel cut-in signals. One such signal is shown herein associated with the first group of switching relays 484 to 487, inclusive. A glow-discharge device such as a neon lamp 715 is connected with one terminal to an intermediate point of a potentiometer or voltage divider 716, one end of which is connected to ground, and the other end of which is connected through the right hand break contact of the key 714 to negative battery. The other terminal of the lamp 715 is connected through a resistance 717 to ground. This terminal is also connected by conductor 718 to the fourth bank contact associated with wiper 548 of switch 483. This circuit is open except while the wiper is engaged with this bank contact so that ordinarily there is impressed upon the lamp 715 a voltage which is insufficient to cause a breakdown but which, after the glow discharge has been started, is sufficient to maintain the discharge.

When wiper 548 is engaged with its fourth bank contact during the confirmation test of the relays 484 to 487, the circuit from the lamp 715 is extended over conductor 547 to ground at the right hand break contact of relay 546. Also connected to this contact is a resistance 719 to which is connected positive battery. It is seen that this positive potential is short-circuited while the right hand armature of relay 546 is engaged with either its make or its break contact so that the lamp 715 remains unoperated. Upon the operation of relay 546, however, while the right hand armature is travelling from its break to its make contact, the short circuit is removed momentarily from the positive battery, thereby causing it to become effective to raise the potential applied to the lamp 715 sufficiently to initiate discharge. Even though this high potential is almost immediately removed, the lamp remains operated as an indication to the attendant that the pattern failure occurred while the wipers of switch 483 were engaged with their fourth bank contacts.

In order to describe the effects produced by the operation of relay 546 upon the transmitting apparatus, reference will be made to Fig. 12 where there is shown relay 381 which corresponds to relay 546. If it is assumed that at the time the pattern failure is detected at the West station the sending pattern and control switches at that station are engaged with their first bank contacts, the operation of relay 381 causes relay 357 to be operated when brush B4 engages segment 355. The operating circuit for this relay is similar to that described under "Revolution 1" of the section entitled "Sending switching operation," with the exception that, instead of being completed to ground at the contacts of relay 351, in this case it is completed to ground through the second right hand make contact of relay 381. Switches corresponding to switches 165 and 166 are started in the manner described and, when wiper 377 is engaged with its third bank contact, as described under "Revolution 4" of the section entitled "Sending switching operation," and relay 364 is operated by the engagement of brush B4 with segment 355, relays 368 and 403 are operated. The circuit may be traced from negative battery through the first make contact of relay 364, the left hand make contact of relay 381 and the left hand windings of relays 403 and 368 to ground. Relay 368 is locked in the manner described, and relay 403 is locked from battery through its right hand winding and first right hand make contact and the left hand break contact of switch key 721 to ground.

The operation of the relay corresponding to relay 368 immediately disconnects the sending subchannel apparatus from the multiplex apparatus at the West station in the manner described under "Home stop" of the section entitled "Supervisory system control." The operation of the relay corresponding to relay 403 removes the ground at its left hand break contact from the circuit controlling the relay corresponding to 167 so that the first impulse of every pattern and confirmation signal transmitted from the West station is sent marking instead of spacing. These signals are termed herein pattern stop signals.

In order to describe the manner in which relay 382 at the East station is operated in response to a received pattern stop signal, reference will be made to Fig. 19 where there is shown a corresponding relay 696. At any time when relays 505 and 507 are operated while the wipers of switch 483 are engaged with odd-numbered bank contacts, the operation of relay 482 upon the engagement of brush B8 with segment 543 closes a circuit which may be traced from positive battery through the right hand winding of relay 696, the first right hand make contact of relay 507, the left hand make contact of relay 482, conductor 3 of cables 481a and 481, the second break contact of relay 462, conductor 2 of cables 481 and 481b and the seventh right hand make contact of relay 507 to ground. Relay 696, when operated, is locked from positive battery through its left hand winding and left hand make contact to ground through the left hand break contact of key 714. Relay 694 is immediately released by the opening of its operating circuit at the first right hand break contact of relay 696, thereby disconnecting the receiving subchannel apparatus from the multiplex apparatus at the East station. A circuit is closed from positive battery through the first right hand make contact of relay 696 and the left hand winding of relay 695 to ground, thereby operating this relay, which controls the receiving circuits described in the section entitled "Supervisory system control." The closure of the second right hand make contact of relay 696 connects the terminals of the windings of relay 564 together, thereby preventing this relay from responding to incomplete confirmation tests at the East station.

Relay 382, when operated at the East station, also prepares for the operation at that station of relays 368 and 403. When relay 364 is operated, the circuit is closed from negative battery through the first make contact of the relay, the left hand break contact of relay 381, the second make contact of relay 382 and the left hand windings of relays 403 and 368 to ground. The operation of relay 368 disconnects the sending subchannel apparatus from the multiplex apparatus at the East station in the manner described. The operation of relay 403 prepares for the transmission of pattern stop signals from the East station to the West station.

These pattern stop signals are received at the West station which originally detected the pattern failure and are effective to cause the operation of relay 696 in the manner described whereby the receiving subchannel apparatus is disconnected from the multiplex apparatus at the West station, thereby completing the interruption of transmission in both directions over the line L.

When it is desired to restore the circuit to normal operation, the attendants at their respective stations operate switch keys 721 and 714. With reference to the sending apparatus illustrated, the operation of switch key 721 opens the locking circuits of relays 403, 331 and 382, thereby releasing these relays. Relay 368 is released in the manner described under "Home stop" in the section entitled "Supervisory system control."

With reference to the receiving station apparatus, the operation of key 714 opens the locking circuits of relays 696 and 546, thereby effecting the release of these relays. Relay 695 is released in the manner described under "Home stop" in the section entitled "Supervisory system control." The operation of key 714 also restores the lamp 715 to its normal unoperated condition by momentarily opening the holding circuit therefor.

When relay 667 is operated in response to a detection of the failure of some of the switching signaling apparatus to be released in the manner described, the operation of relay 546 is effective to stop the system in the same manner as it is stopped as a result of a pattern failure. In this case relay 546 is operated by a circuit which may be traced from positive battery through the right hand winding of the relay, conductors 722, 723 and 724, the second make contact of relay 667, conductors 725, 726 and 727 and the left hand break contact of the switch key 714 to ground. Once operated, relay 667 is locked by means of a circuit from positive battery through resistance 591, conductor 668, the left hand winding and first make contact of the relay to ground at the left hand break contact of key 714.

In the event that switch 483 is not started in response to a signal received from the sending apparatus within the predetermined time for which the tube 679 is set, relay 683 is operated to close a circuit for the operation of relay 546 which may be traced from positive battery through the right hand winding of the latter relay, conductors 722, 723 and 728, the second left hand make contact of relay 683, conductors 725, 726 and 727 and the left hand break contact of key 714 to ground. Relay 683 is locked in a circuit extending from positive battery through the left hand winding and first left hand make contact of the relay to ground at the left hand break contact of key 714.

In case there is a condition, arising from some failure of the receiving apparatus to respond properly, in which some of the subchannel apparatus is not connected to the apparatus of one of the subscribers, one of the relays such as relays 534 to 537 is not operated when it should be. Assume, for example, that sub-channel I is connected to the multiplex apparatus in the manner described and that it should be connected to one of the subscribers of group I, but is not. In this case relays 534 and 536 are released. In accordance with the previous description, one such relay should be operated to complete the connection between the subchannel apparatus and the apparatus of one of the subscribers of this group. As soon as transmission is started over subchannel I, the first character received will contain one or more marking impulses. A circuit will then be complete from one of the retransmitting relays, for example, relay 479, from negative battery through the right hand contact of the relay, the second right hand make contact of relay 655, the second right hand break contacts of relays 654 and 653, conductor 652, the first right hand break contact of relay 534, the first right hand break contact of relay 536, conductor 729 and the right hand winding of relay 731 to ground. This relay is locked by a circuit which may be traced from positive battery through the left hand winding and first make contact of the relay, conductors 726 and 727 and the left hand break contact of key 714 to ground. The operation of relay 731 completes the operating circuit for relay 546 which may be traced from positive battery through the right hand winding of the relay, conductors 722 and 732, the second make contact of relay 731 to ground at the left hand break contact of key 714. It is seen, therefore, that with the operation of relay 546 preparations are made to stop the system as a result of this type of failure.

Relay 731 is also subject to the control of the subscriber connecting relays of other groups, such as group IV, by means of conductor 733 and similar contacts of relays 537 and 535.

MISCELLANEOUS FEATURES

In describing the connection of a subscriber's sending apparatus to the sending subchannel apparatus in the section of the specification entitled "Sending subscriber to subchannel connection," reference was made to the function of resistance 236 in delaying the response of the tube 134 so that under certain conditions a false or premature operation of relay 127 is avoided. If it is assumed that the wipers of switch 142 are positioned as shown and relay 146 is operated, bank contact 734 is at ground potential by reason of its connection to negative battery through the right hand make contact and right hand winding of relay 116 and resistance 221 to negative battery and through wiper 222 and the third left hand make contact of relay 146 to positive battery through a resistance corresponding to resistance 227 at the apparatus of subchannel 15. This ground is also connected to bank contact 213 of switch 141. If, while this switch is operating to effect a connection between another subscriber and subchannel 1, relay 146 is released to disconnect the line of subscriber 1 of group I from the subchannel apparatus at the time that wiper 212 of switch 141 is engaged with bank contact 213, the positive potential is disconnected from this contact and for an instant the contact is at negative potential, since it requires some time, even though small, for the release of relay 116 to disconnect the negative battery. In this case the stepping tubes 136 are rendered non-conducting momentarily to stop the wipers of switch 141 on their first bank contacts. As soon as the contacts of relay 116 open, however, bank contact 213 is again restored to ground potential so that the tubes 136 are again conductively conditioned to resume the stepping operations of switch 141. For this reason it is desirable to delay the operation of tube 134, since otherwise the selected subchannel might be connected to a non-calling subscriber. This delay is effected by the resistance 236 included in the charging circuit of condenser 238. It reduces the charging rate sufficiently to prevent the tube 134 from becoming conductively conditioned until after the elapse of an interval longer than that required for the release of relay 116.

As soon as tube 134 effects the operation of relay 127, this condition is maintained locally for a limited predetermined time by the condenser 238. In order for the subscriber to hold the connection to the subchannel apparatus for a longer time, it is necessary for him to transmit at least one character, unless, before the expiration of the original period, the switching signaling is completed to the point at which relay 129 is operated, in which case the connection is retained until broken in response to a call by another subscriber in the manner described. Since each character transmitted contains at least one spacing impulse, that is, the start impulse, relay 305 at the subchannel apparatus is released at least once to close a circuit which may be traced from positive battery through the break contact of the relay and the winding of relay 735 to ground. The momentary operation of this relay closes a circuit from positive battery through the second left hand make contact of relay 145, the make contact of relay 735, conductors 736 and 232 to the grid of the tube 134. Thus, this tube is reconditioned for another limited predetermined period of operation, and during this period the tape 315 normally will be stepped through the transmitter 152 to cause the engagement of the pins thereof with the first normal character perforated therein in response to the character sent by the subscriber.

This causes the operation of relay 321 in the manner described to close a circuit from ground through its first left hand make contact, conductor 737 to one terminal of a resistance 738. This resistance is connected in series with another resistance 739 and the circuit extended through the second left hand make contact of relay 145 to positive potential. The junction of resistances 738 and 739 is, therefore, at a positive potential which is applied through resistance 741 and conductors 736 and 232 to the grid of the tube 134. This latter condition obtains as long as the tape contains normal characters for engagement by the pins of the transmitter, thereby maintaining relay 127 operated as long as the subscriber is busy. It will be noted that, as soon as relay 365 is operated to connect the subchannel apparatus to the relay chain mixer, the circuit from resistance 738 is also connected to ground through the fourth left hand make contact of the relay.

When the subscriber is finished sending and the prepared tape stepped through the transmitter 152, relay 321 is released upon the detection of the first blank character following the message characters in the tape. It is not until relay 365 is released, however, during the disconnection of the subchannel apparatus from the multiplex apparatus that ground is removed from the terminal of resistance 738. With relay 319 of the subchannel apparatus released, negative potential is connected through the left hand break contact of the relay, the left hand winding of relay 326 and conductor 737 to the terminal of resistance 738. The value of this resistance is approximately one-third of that of resistance 739 so that, if the value of the negative potential connected to resistance 738 is substantially equal to the positive potential connected to resistance 739 at the second left hand make contact of relay 146, the junction of the two resistances is at a negative potential which is applied through the relatively high resistance 741 to the grid of tube 134. Ultimately, the condenser 238 is discharged through the resistance 741, and the tube 134 is rendered non-conducting to release relay 127.

Once relay 129 is operated, and it ordinarily will be before the expiration of the first operative period of the tube 134, the subscriber retains his connection to the subchannel even though he does not start to send within the first operative period of the tube 134, unless some other subscriber is connected to the subchannel in the meantime. This connection is maintained by the continued operation of relay 145. It is only possible to short-circuit the winding of this relay to effect its release when both relays 127 and 129 are released. With relay 129 operated, the short-circuiting ground is disconnected at the first right hand break contact of the relay, thereby preventing its connection to the winding of relay 145 even though the first left hand break contact of relay 127 closes as a result of the failure of the subscriber to start sending immediately. If for some reason there is a delay in the transmission of the switching signals for the establishment of the receiving connection and the calling subscriber fails to start sending before the expiration of the first operative period of the tube 134, relay 129 will not have been operated by the time that relay 127 is allowed to release. Consequently, the winding of relay 145 is short-circuited by means of the described circuit and releases to open the connection between the calling subscriber and the subchannel apparatus.

The present system is provided with means for maintaining a connection between a subscriber and a selected subchannel irrespective of the busy or idle condition of the subscriber's transmitting apparatus at the time that another subscriber is seeking connection to the system. In other words, there is provided, in effect, a manually controlled semi-permanent connection between a subscriber and a particular subchannel. If it is desired to hold a particular subscriber on a particular subchannel, then at the time that such a connection exists the semi-permanent connection may be made. For example, assume that subscriber 1 of group I is connected to subchannel 1. Relay 145 is operated and the subscriber is transmitting so that relay 127 is operated. At this time switch 742 is closed, thereby connecting positive battery through the second left hand make contact of relay 145 permanently to the grid of tube 134. With this connection the subchannel apparatus may become idle in the manner described without effecting the release of relay 127. Thereafter, when another subscriber places a call, subchannel 1 will not be selected, since the operation of relay 127 conditions the subchannel selecting test circuit in such a manner that subchannel 1 is made unavailable.

In case it is immaterial which subscriber is connected to a particular subchannel, and it is only desired to hold connected to a selected subchannel the first subscriber which becomes connected thereto, switch 742 may be closed at any time prior to the connection of the subchannel to a subscriber. At the completion of the first connecting operation involving subchannel 1, when relay 145 is operated, the tube 134 is conditioned for permanent operation in the manner described.

When the system is stopped in any of the described ways which result in the operation of relay 293, all of the relays corresponding to relays 129 and 131 associated with subscribers having previous connections with the subchannel apparatus are released. Where a subscriber is not sending and the tape in which his signals had been stored has been stepped through the subchannel tape transmitter, the connection between such a subscriber and the subchannel apparatus is broken by the release of one of the connector relays corresponding to relays 145 to 148, inclusive. This is seen, since in each case both of the relays corresponding respectively with relays 127 and 129 will be released to short-circuit the winding of the connector relay and thereby effect its release.

Where a subscriber is either sending or the tape which he has previously prepared has not been completely stepped through the transmitter, the relay corresponding to relay 127 is not released. Irrespective of whether he has stopped sending or not, the stepping of the tape is interrupted with the pins engaging a normal character, thereby maintaining relay 321 operated. Ground is connected through the first left hand make contact of this relay to resistance 738 to maintain the grid of tube 134 positive and thereby maintain the tube conductive to keep the relay corresponding to relay 127 operated.

Facilities are also provided for determining the particular subchannel connected to a particular subscriber. For this purpose a group of neon lamps such as 743 is provided for each group of 48 subscribers. There are as many neon lamps in a group as there are subchannels which, in this case, is 15. These lamps are controlled by means of push-button keys such as 228 and 229, of which there is one for each subscriber. Assume that subscriber 1 of group I is connected to subchannel 1, in which case relays 116 and 145 are operated, and the wipers of switch 141 are engaged with their first bank contacts, as shown. A potentiometer comprising resistances 744 and 745 is connected between positive potential and ground. A connection is made from the junction of these resistances to one terminal of lamp 743 in such a manner that the potential at this point is below the striking potential of the lamp. The other terminal of the lamp 743 is connected by means of the first right hand make contact and third left hand make contact of relay 145 and wiper 212 of switch 141 to bank contact 213. Normally the potential at this point is either ground or positive, depending upon the operation of the counter actuating mechanism. In either case the potential applied to the lamp 743 is insufficient to operate it.

When the key 228 is operated to its left hand contact, resistance 221 is shunted by resistance 231 by means of a circuit which may be traced through the left hand contact of key 228 and the right hand contacts of all other similar keys associated with the other subscribers of the group similar to key 229 and the second left hand break contact of relay 123. The effect of this operation upon the locking winding of relay 116 is merely to increase the current therethrough temporarily, but the effect upon the bank contact 213 of switch 141 is to produce a negative potential thereat which is applied to the left hand terminal of the lamp 743. The effective potential impressed across the terminals of this lamp then is sufficient to cause a glow discharge therein. If the subscriber happens to be sending at the moment, the operation of the counter 217 by the subchannel apparatus changes the potential at the bank contact 213 of switch 141 in such a manner that the effective potential upon the lamp 743 is decreased, causing the lamp to be extinguished momentarily. Consequently, as long the key 228 is operated to its left hand contact and the subscriber is sending at the time, the lamp 743 flickers. However, since this lamp is associated with subchannel 1, whether the illumination is steady or intermittent, the attendant receives an indication that subscriber 1 of group I is at the time connected with subchannel 1. The other keys enable an attendant to determine similar connections between any of the other subscribers. Each lamp, such as 743, is shunted by a condenser 746 for the purpose of by-passing transient voltages caused by the operation of the character counters.

Similar facilities may be provided with the receiving apparatus by connecting a neon lamp to wiper 645 of switch 521 through an added make contact of relay 534 to be operated under the control of a push-button key for shunting resistance 647. Like connections would be made to all other corresponding apparatus.

In order for the testing circuit employed in conjunction with the confirmation signals at the receiving station to be of value, it is essential that the five conductors forming an important part of the confirmation circuits be clear of all extraneous connections such as grounds, crosses between conductors, etc. Consequently, periodic tests are made to determine the electrical conditions of these conductors. For this purpose a group of neon lamps is employed as indicators, and the conductors are subjected to test potentials under the control of one of the wipers of the switch 483.

One of the neon lamps 747 is connected between conductor 563 and a resistance 748. Another lamp 749 is connected between conductor 562 and a resistance 751. Another lamp 752 is connected between conductor 561 and resistance 753. Another lamp 754 is connected between conductor 559 and a resistance 755. The other terminals of resistances 748, 751, 753 and 755 are connected by means of conductors 558 and 586 and the right hand winding of relay 564 to ground through resistance 573 and the source of negative potential connected thereto. The junction points of the lamps and the resistances are connected to terminals of four secondary windings such as 756 and 757 of a transformer 758. The other terminals of these secondary windings are connected to any convenient odd-numbered bank contacts associated with wiper 548 of switch 483. Since this wiper is connected to ground at the right hand break contact of relay 546, while it is being operated over its bank contacts, it is possible to impress the potential induced in one of the secondary windings of the transformer across one of the resistances referred to at times when pattern signals are being received, at which times the confirmation test conductors are not employed for the purpose described. The primary winding 759 of the transformer is connected to any convenient source of alternating current. This source and the design of the transformer are such that the voltage appearing across the terminals of any of the secondary windings is substantially twice the value necessary to cause a glow discharge in any one of the neon lamps.

When the wiper 548 of switch 483 is engaged with its third bank contact, the voltage of the secondary winding 756 is impressed across the resistance 748. If conductor 563 is electrically free from all of the other conductors and is not connected to a low resistance ground or to any other extraneous source of potential, there is no response by the lamp 747. If it is assumed, however, that this conductor is connected to a relatively low resistance ground, then there is a complete circuit energized by the voltage drop across the resistance 748 which may be traced from the right hand terminal of the resistance, over conductor 558 which has a connection to ground through the negative battery connected to resistance 573, through the assumed low resistance ground connected to conductor 563, resistance 761 to the left hand terminal of resistance 748. The voltage drop across resistance 761 is applied to the terminals of the neon lamp 747 and is of a value sufficient to initiate a glow discharge in the lamp if the resistance of the assumed ground is sufficiently low.

The operation of this lamp is an indication to an attendant that there is a fault involving conductor 563. The exact nature of this fault may not be determined readily at this time, but by further observation the attendant may be able to characterize and localize the fault so that it may be corrected. If, during the remainder of the cycle of operation of the switch 483, there is no other indication observable, the attendant is able to eliminate conductors 559, 561 and 562 from any possible involvement with conductor 563. It is obvious that, if conductor 563 is connected to some extraneous source of potential regardless of polarity, the indication will be the same. Also, it may be crossed with conductor 558, in which case the lamp 747 is operated by means of the connection of conductor 563 to ground through resistance 573 and negative battery.

If it is assumed that conductors 563 and 562 are crossed, when potential is impressed across the resistance 748, there is a complete circuit which may be traced from the right hand terminal of resistance 748, through resistance 751, resistance 762, through the short circuit existing between conductors 562 and 563, resistance 761 to the left hand terminal of resistance 748. The potential impressed across this resistance by the secondary winding 756 is sufficient to produce voltage drops across resistances 761 and 762 of magnitudes sufficient to operate lamps 747 and 749. This, then, is an indication to an attendant that a cross or short circuit between conductors 562 and 563 exists. It should be noted that, when wiper 548 of switch 483 engages its seventh bank contact, secondary winding 757 of the transformer is effective to impress a voltage across resistance 751. In this case this potential is applied to the described series circuit and results in the reoperation of lamps 747 and 749.

If more than two conductors become short-circuited together, a somewhat similar indication is given. Assume that conductors 561, 562 and 563 are short-circuited when wiper 548 of switch 483 is engaged with its third bank contact. The voltage which is then impressed across resistance 748 energizes a circuit comprising the lamp 747 in series with a parallel connection of lamps 749 and 752. Consequently, lamp 747 is illuminated brightly, and the other two lamps are lighted less brightly. Obviously, a cross between other conductors will operate the lamps in a similar manner with varying brilliancy, depending upon the character of the short circuit and upon the position of switch wiper 548.

Faults occurring to conductor 558 alone are not indicated by the neon lamps. Most of these faults are indicated in other manners. It should be obvious from the foregoing description that, even when the operating circuit of the neon lamps includes the right hand winding of relay 564, the current which circulates in the circuit is very small, much less than that required to operate the relay. Consequently, even though there is some slight energization of this winding at a time when the left hand winding is not energized, there is no interruption of the circuit such as that occurring when this relay is operated, resulting from a pattern failure or from any of the other described failures. If conductor 558 becomes grounded or connected to positive battery through a sufficiently low resistance, however, the right hand winding of relay 564 is energized to the extent necessary to operate the relay to stop the system in the manner described.

The nature of the invention may be determined from the foregoing description of an illustrative embodiment thereof, it being understood that numerous changes may be made therein with the scope of the appended claims without departing from the spirit of the invention.

What is claimed is:

1. In a multichannel telegraph system wherein a plurality of subchannels when busy share the transmission time of a lane of traffic, a plurality of subscribers' stations associated in pairs with opposite ends of said lane of traffic, and means to place any one of said pairs of subscribers' stations in communication over any one of said subchannels.

2. In a multichannel telegraph system, a lane of traffic, a plurality of subscribers' stations including transmitting apparatus, a plurality of subchannels including signal receiving and retransmitting apparatus, switching means for connecting the transmitting apparatus of any of said subscribers' stations to the receiving apparatus of any of said subchannels, and means for connecting successively to said lane of traffic the retransmitting apparatus of only those of said subchannels having operating receiving apparatus.

3. In a telegraph system, a lane of traffic, a plurality of subchannels, means for operatively or inoperatively conditioning said subchannels, means dependent upon the operative conditioning of said subchannels for associating the subchannels with said lane of traffic, means for dividing the transmission time of said lane among said associated subchannels, a plurality of subscribers' stations each having signaling apparatus, and means responsive to the signaling apparatus of any of said subscribers' stations to connect that station to an inoperatively conditioned subchannel.

4. In a telegraph system wherein a plurality of communication subchannels are arranged to operate over a lane of traffic in variable numbers and at all times to share the transmission time of said lane, a plurality of pairs of transmitting and receiving devices, and means controlled by any of said transmitting devices for connecting the transmitting device and the associated receiving device to opposite ends of any of said subchannels.

5. In a telegraph system wherein a plurality of communication subchannels are arranged to share the transmission time of a lane of traffic among variable numbers of operative subchannels, a plurality of pairs of transmitting and receiving devices, means controlled by any one of said transmitting devices for connecting the transmitting device to one end of any of said subchannels, and means responsive to signaling over said lane of traffic to connect the associated receiving device to the other end of the subchannel.

6. In a telegraph system wherein a plurality of communication subchannels are arranged to share the transmission time of a lane of traffic among variable numbers of operative subchannels, a plurality of pairs of transmitters and receivers, means controlled by any one of said transmitters for rendering any one of said subchannels operative, and switching means for conditioning the paired receiver for reception from said operative subchannel.

7. In a telegraph system wherein a plurality of communication subchannels are arranged to share the transmission time of a lane of traffic among variable numbers of operative subchannels, a plurality of pairs of transmitters and receivers, means controlled by any one of said transmitters for connecting the transmitter to one end of any inoperative subchannel, means responsive to said transmitter connection for connecting the associated receiver to the other end of said inoperative subchannel, and means controlled by said connected transmitter for rendering said subchannel operative.

8. In a telegraph system wherein a plurality of communication subchannels are arranged to share the transmission time of a lane of traffic among variable numbers of operative subchannels, a plurality of pairs of transmitters and receivers, means controlled by any one of said transmitters for connecting the transmitter to one end of any inoperative subchannel, means responsive to said transmitter connection to send switching signals over said lane of traffic, means controlled by said switching signals for connecting the associated receiver to the other end of said inoperative subchannel, means controlled by said connected transmitter to send other switching signals over said lane of traffic, and means including apparatus responsive to said other switching signals for rendering said subchannel operative.

9. In a telegraph system, a lane of traffic, a relatively large number of subscribers' stations, a relatively small number of subchannels, means responsive to a calling signal from any of said subscribers' stations to connect the calling station with an idle one of said subchannels, and means controlled by the busy or idle condition of said subchannel to switch said subchannel into or out of engagement with said lane of traffic.

10. In a telegraph system wherein a plurality of subchannels are arranged to share the transmission time of a lane of traffic among variable numbers of operative subchannels, a plurality of subscribers' stations, means responsive to a calling signal from one of said subscribers' stations to find an idle subchannel, means responsive to the finding of said subchannel for locating the calling subscriber, and means responsive to the location of the calling subscriber to connect the calling subscriber and the idle subchannel.

11. In a telegraph system, a lane of traffic, a plurality of subscribers' stations including transmitters, a plurality of subchannels including signal repeating apparatus, means for connecting the transmitter of any of said subscribers' stations to the repeating apparatus of any of said subchannels, and means for connecting intermittently to said lane of traffic the repeating apparatus of busy ones of said subchannels.

12. In a telegraph system, a lane of traffic, a plurality of subscribers' stations including telegraphic communication apparatus, a plurality of subchannels including signal repeating apparatus, means for connecting the communication apparatus of any of said subscribers' stations to the repeating apparatus of any of said subchannels, and means for connecting busy subchannels to said lane of traffic in a manner to apportion the transmission time among said busy subchannels.

13. In a telegraph system wherein a plurality of subchannels having signal repeating apparatus are arranged to share the transmission time of a lane of traffic among variable numbers of operative subchannels, a plurality of subscribers' stations, means for connecting any one of said subscribers' stations to any one of said subchannels, means responsive to a calling signal from one of said subscribers' stations to select for connection an unconnected one of said subchannels, means responsive to the failure of said first selecting means to find an unconnected subchannel for selecting a connected but idle subchannel, and means for discontinuing the previous connection of said selected subchannel and for connecting the subchannel to the calling subscriber's station.

14. In a telegraph system wherein a plurality of subchannels are arranged to share the transmission time of a lane of traffic among variable numbers of operative subchannels, a plurality of subscribers' stations, switching means responsive to a calling signal from any one of said subscribers' stations for connecting the calling station to any one of said subchannels, and means operable for establishing a semi-permanent connection between one of said subscribers' stations and the selected one of said subchannels.

15. In an expanding channel telegraph system wherein a plurality of subchannels are arranged when busy to share the transmission time of a lane of traffic, a plurality of subscribers' stations, switching means for connecting one of said subscribers' stations to any one of said subchannels, means for maintaining said connection after said subchannel becomes idle, and means for interrupting said connection while the subchannel is idle and for connecting said subchannel to another one of said subscribers' stations.

16. In an expanding channel telegraph system wherein a plurality of subchannels when busy share the transmission time of a lane of traffic, a plurality of subscribers' stations, switching means for connecting any one of said stations to any one of said subchannels, means to determine the particular subchannel connected to a particular station comprising, indicator means associated with each of said subchannels, and means associated with each of said subscribers' stations and operable after the connection of a subchannel to a subscribers' station for operating the indicator means associated with the connected subchannel.

17. In an expanding channel telegraph system wherein a plurality of subchannels are switched into and out of engagement with a lane of traffic depending upon the busy or idle condition of the subchannels, means for transmitting pattern and confirmation signals over said lane of traffic whenever a change in status of one or more of said subchannels is to be effected, said pattern and confirmation signals normally bearing a predetermined invariable relationship to one another, switching apparatus at the receiving end of said lane of traffic, means responsive to said pattern signals for conditioning said switching apparatus according to the character of the pattern signals, system control means operable to stop transmission over the lane of traffic, means to intermittently condition said system control means for operation, and means responsive to said confirmation signals for checking said relationship and the conditioning of said switching apparatus to nullify said relay conditioning means.

18. In an expanding channel telegraph system wherein a plurality of subchannels are switched into and out of engagement with a lane of traffic depending upon the busy or idle condition of the subchannels, means for transmitting pattern and confirmation signals over said lane of traffic whenever a change in status of one or more of said subchannels is to be effected, said pattern and confirmation signals normally bearing a predetermined invariable relationship to one another, a group of receiving relays having contacts, a plurality of groups of switching relays having contacts, means including said receiving relays responsive to pattern signals for operating said groups of switching relays according to the character of the pattern signals, means including said receiving relays responsive to confirmation signals to form a series circuit through the contacts of said receiving relays and the contacts of one of said groups of switching relays, and means responsive to a discontinuity of said series circuit to stop transmission over the lane of traffic.

19. In an expanding channel telegraph system wherein pattern and confirmation signals are transmitted in pairs to control groups of receiving switching apparatus including apparatus for connecting and disconnecting a plurality of subchannels to and from a lane of traffic, said pattern and confirmation signals normally bearing a predetermined invariable relationship to one another, the combination of means at the receiving end of said lane of traffic to detect discrepancies in said relationship, and means responsive to said detecting means to indicate the apparatus group affected by said discrepancies.

20. In an expanding channel telegraph system wherein switching signals are transmitted over a lane of traffic to control receiving switching apparatus, a plurality of conductors each normally isolated electrically, means for intermittently establishing a circuit linking said conductors to check the accuracy of the received switching signals and the operation of said apparatus, and means for testing periodically said conductors for electrical isolation.

21. In an expanding channel telegraph system wherein a plurality of subchannels when busy share the transmission time of a lane of traffic, a plurality of subscribers' stations having telegraph signal transmitters normally disconnected from said subchannels and incapable of transmitting signals, means responsive to a calling signal from one of said stations for connecting the associated transmitter to one of said subchannels, and means controlled by said connecting means to render the connected subscriber's transmitter operative.

22. In an expanding channel telegraph system wherein switching signals are transmitted over a lane of traffic to control switching apparatus for the connection of a subscriber's receiving apparatus to one of a plurality of operative subchannels, means to automatically stop transmission over the lane of traffic, and means responsive to a condition wherein an operative subchannel is not connected to a subscriber's receiving apparatus for operating said transmission stopping means.

23. In an expanding channel telegraph system wherein a lane of traffic is employed as the transmission medium for both intelligence and switching signals, the latter for the control of apparatus to connect a subscriber's receiving apparatus to any one of a plurality of subchannels, means to automatically stop transmission over the lane of traffic, and means controlled by intelligence signals received by an operative one of said subchannels and responsive to the nonconnection of a subscriber's receiving apparatus to the operative subchannel for operating said transmission stopping means.

24. In a multichannel telegraph system wherein a plurality of communication subchannels share the transmission time of a lane of traffic, a plurality of subscribers' stations, switching means operable to connect any one of said subscribers' stations to any one of said subchannels, means individual to each of said subscribers' stations to count message characters, and means controlled from any one of said subchannels to operate any one of said counters.

25. In a multichannel telegraph system wherein any one of a plurality of subscribers' stations may be connected to any one of a plurality of subchannels and wherein switching signals are transmitted over a lane of traffic representative of any of said connections to control receiving connecting apparatus, a plurality of groups of coding devices operable in various combinations to generate said switching signals, a plurality of circuits one for each of said connections, means for splitting each of said circuits into a plurality of other circuits, similar ones of said other circuits associated with different ones of said first mentioned circuits being connected in multiple to said groups of coding devices, and means in said other circuits to prevent the multiple connections from operating said coding devices in different combinations for each of said first mentioned circuits energized.

26. In a multichannel telegraph system wherein any one of a plurality of subscribers' stations may be connected to any one of a plurality of subchannels and wherein switching signals are transmitted over a lane of traffic representative of any of said connections to control receiving connecting apparatus, selector means at the receiving station to establish a connection to the receiving apparatus of any of said subscribers' stations, a decoding device having a plurality of units one for each of said subscribers' stations, means including an operatively conditioned one of said units to control said selector means, the operative conditioning of said units requiring two operations, means responsive to said switching signals to effect the first of said operations for a first group of said units, means responsive to said switching signals to effect the second of said operations for a second group of said units, and means for arranging the grouping of said units in such a manner that only one at a time of said units is common to both of said groups.

27. In a telegraph system wherein a plurality of subchannels share the transmission time of a lane of traffic among variable numbers of operative subchannels, a plurality of subscribers' stations, automatic switching means normally operable in response to a calling signal from one of said subscribers' stations to connect the calling station with any one of said subchannels, and means associated with one of said subchannels to condition the subchannel for semi-permanent connection to the first one of said subscribers' stations to be connected thereto.

28. In a telegraph system wherein a plurality of subchannels share the transmission time of a lane of traffic among variable numbers of operative subchannels, a plurality of subscribers' stations, switching means responsive to a calling signal from one of said subscribers' stations for connecting semi-permanently the calling station to any one of said subchannels, and means associated with one of said subchannels operable after the establishment of a connection between the subchannel and a subscriber's station for making said connection permanent.

29. In an expanding channel telegraph system wherein a plurality of subchannels when busy share the transmission time of a lane of traffic, a plurality of subscribers' stations, means for connecting any one of said subscribers' stations to any one of said subchannels, means for maintaining said connection after the subchannel becomes idle, and means operable when all of said subchannels are connected to subscriber's stations to interrupt a connection to an idle subchannel and to connect that subchannel to another one of said subscribers' stations.

30. In an expanding channel telegraph system wherein a plurality of subchannels when busy share the transmission time of a lane of traffic, a plurality of subscribers' stations, means to establish individual connections between each of said subchannels and said subscribers' stations up to the limit of the number of subchannels, means for maintaining said connections after the associated subchannels become idle, and means responsive to a call from an additional one of said subscribers' stations to interrupt the connection to an idle one of said subchannels and to connect that subchannel with the calling subscriber's station.

31. In an expanding channel telegraph system wherein a plurality of subchannels when busy share the transmission time of a lane of traffic, a plurality of subscribers' stations, switching means for connecting any one of said stations to any one of said subchannels, means to determine the particular subchannel connected to one of said stations comprising, a visual indicator associated with each of said subchannels, a device associated with each station to modify the potential applied to a circuit associated with an individual station, and means including said switching means and controlled by said device to operate said indicator.

32. In an expanding channel telegraph system wherein a plurality of subchannels when busy share the transmission time of a lane of traffic, a plurality of subscribers' stations, switching means for connecting said stations to any one of said subchannels, means to determine the subchannel to which the station is connected comprising, a lamp associated with each of said subchannels, a switch key associated with said station, and means including said key and said switching means to operate a lamp associated with the connected subchannel.

33. In an expanding channel telegraph system wherein a plurality of subchannels when busy share the transmission time of a lane of traffic, a plurality of subscribers' stations, switching means for connecting any one of said stations with any one of said subchannels, means to determine the identity of the particular subchannel connected to a particular one of said stations comprising, a glow discharge tube associated with each subchannel, a relay associated with each station, means including said switching means to close a holding circuit through one of said relays and to apply a potential to one of said tubes insufficient to cause a discharge therein, a switch key associated with each of said stations, and means including one of said keys to increase the potential in the holding circuit of the relay associated with that key to operate the tube associated with the connected subchannel.

34. In an expanding channel telegraph system wherein a plurality of subchannels are switched into and out of engagement with a lane of traffic depending upon the busy or idle condition of the subchannels, means for transmitting patter and confirmation signals over said lane of traffic whenever a change in status of one or more of said subchannels is to be effected, said pattern and confirmation signals normally bearing a predetermined invariable relationship to one another, switching apparatus at the receiving end of said lane of traffic, means responsive to said pattern signals for conditioning said switching apparatus according to the character of the pattern signals, a relay operable to stop transmission over the lane of traffic, means to intermittently condition said relay for operation, and means responsive to said confirmation signals for checking said relationship and the conditioning of said switching apparatus to counteract said relay conditioning means whereby said relay is not operated.

35. In an expanding channel telegraph system wherein a plurality of subchannels are switched into and out of engagement with a lane of traffic depending upon the busy or idle condition of the subchannels, means for transmitting pattern and confirmation signals over said lane of traffic whenever a change in status of one or more of said subchannels is to be effected, said pattern and confirmation signals normally bearing a predetermined invariable relationship to one another, switching apparatus at the receiving end of said lane of traffic, means responsive to said pattern signals for conditioning said switching apparatus according to the character of the pattern signals, a differential relay operable to stop transmission over the lane of traffic, means responsive to said confirmation signals to check said relationship and the conditioning of said switching apparatus, and means responsive to the successful completion of said checking operation to differentially energize said relay whereby the relay is rendered inoperative.

36. In an expanding channel telegraph system wherein a plurality of subchannels are switched into and out of engagement with a lane of traffic depending upon the busy or idle condition of the subchannels, means for transmitting pattern and confirmation signals over said lane of traffic whenever a change in status of one or more of said subchannels is to be effected, said pattern and confirmation signals normally bearing a predetermined invariable relationship to one another, switching apparatus at the receiving end of said lane of traffic, means responsive to said pattern signals for conditioning said switching apparatus according to the character of the pattern signals, a multiwinding relay operable by the energization of odd numbers of said windings to stop transmission over the lane of traffic, means to intermittently energize an odd number of said windings, means responsive to said confirmation signals to check said relationship and the conditioning of said switching apparatus, and means responsive only to the successful completion of said checking operation to effect the energization of another equal odd number of said windings.

37. In an expanding channel telegraph system wherein a plurality of subchannels are switched into and out of engagement with a lane of traffic depending upon the busy or idle condition of the subchannels, means for transmitting pattern and confirmation signals over said lane of traffic whenever a change in status of one or more of said subchannels is to be effected, said pattern and confirmation signals normally bearing a predetermined invariable relationship to one another, a group of receiving relays having contacts, a plurality of groups of switching relays having contacts, means including said receiving relays responsive to pattern signals for operating said groups of switching relays according to the character of the pattern signals, a plurality of conductors normally isolated electrically from one another and to which the contacts of said groups of switching relays are connected, means including the contacts of said receiving relays responsive to confirmation signals to form a series circuit linking said conductors, and means responsive to a discontinuity of said series circuit to stop transmission over the lane of traffic.

38. In an expanding channel telegraph system wherein a plurality of subchannels are switched into and out of engagement with a lane of traffic depending upon the busy or idle condition of the subchannels, means for transmitting pattern and confirmation signals over said lane of traffic whenever a change in status of one or more of said subchannels is to be effected, said pattern and confirmation signals normally bearing a predetermined invariable relationship to one another, a group of receiving relays having contacts, a plurality of groups of switching relays having contacts, means including said receiving relays responsive to pattern signals for operating said groups of switching relays according to the character of the pattern signals, a plurality of conductors normally isolated electrically from one another and to which the contacts of said groups of switching relays are connected, a relay having its operating circuit connected to one of said conductors, means including the contacts of said receiving relays responsive to confirmation signals to form a series circuit linking said conductors and said relay, and means including said relay responsive to a discontinuity of said series circuit to stop transmission over the lane of traffic.

39. In an expanding channel telegraph system wherein a plurality of subchannels are switched into and out of engagement with a lane of traffic depending upon the busy or idle condition of the subchannels, means for transmitting pattern and confirmation signals over said lane of traffic whenever a change in status of one or more of said subchannels is to be effected, said pattern and confirmation signals normally bearing a predetermined invariable relationship to one another, a group of receiving relays having contacts, a plurality of groups of switching relays having contacts, means including said receiving relays responsive to pattern signals for operating said groups of switching relays according to the character of the pattern signals, a plurality of conductors normally isolated electrically from one another and to which the contacts of said groups of switching relays are connected, means responsive to confirmation signals to connect the contacts of said receiving relays to said conductors to form a series circuit including the contacts of said receiving relays and the contacts of a group of switching relays, a relay having two opposing windings and operable to stop transmission over the lane of traffic, means operable concurrently with said confirmation signal responsive means to energize one winding of said relay, and means including said series circuit to energize the other winding of said relay whereby operation of the relay is prevented.

40. In an expanding channel telegraph system wherein pattern and confirmation signals are transmitted in pairs to control groups of receiving switching apparatus including apparatus for connecting and disconnecting a plurality of subchannels to and from a lane of traffic, said pattern and confirmation signals normally bearing a predetermined invariable relationship to one another, the combination of means at the receiving end of said lane of traffice to detect discrepancies in said relationship, a signal device associated with each of said apparatus groups, and means including said detecting means for operating one of said signal devices to indicate the apparatus group affected by said discrepancy.

41. In an expanding channel telegraph system wherein pattern and confirmation signals are transmitted in pairs to control groups of receiving switching apparatus including apparatus for connecting and disconnecting a plurality of subchannels to and from a lane of traffic, said pattern and confirmation signals normally bearing a predetermined invariable relationship to one another, the combination of means at the receiving end of said lane of traffic to detect discrepancies in said relationship, a relay operable by said detecting means, a signal lamp associated with each of said apparatus groups, and means including said relay for operating one of said lamps to indicate the apparatus group affected by said discrepancy.

42. In an expanding channel telegraph system wherein switching signals are transmitted over a lane of traffic to control receiving switching apparatus, a plurality of conductors each normally isolated electrically, means for intermittently establishing a circuit linking said conductors to check the accuracy of the received switching signals and the operation of said apparatus, a plurality of sources of alternating current, and means for impressing successively said sources of alternating current upon different pairs of said conductors to test the conductors for electrical isolation.

43. In an expanding channel telegraph system wherein switching signals are transmitted over a lane of traffic to control receiving switching apparatus, a plurality of conductors each normally isolated electrically, means for intermittently establishing a circuit linking said conductors to check the accuracy of the received switching signals and the operation of said apparatus, indicating devices associated with certain of said conductors, a plurality of sources of alternating current, and means responsive to the non-isolation of any of said conductors and including one of said sources of alternating current to operate one of said indicating devices.

44. In an expanding channel telegraph system wherein switching signals are transmitted over a lane of traffic to control receiving switching apparatus, a plurality of conductors each normally isolated electrically, means for intermittently establishing a circuit linking said conductors to check the accuracy of the received switching signals and the operation of said apparatus, a plurality of circuits each including a lamp and extending from one of said conductors to the other respective conductors, means for energizing said circuits successively, and means including the lamp in an energized circuit to indicate the non-isolation of the associated conductor.

45. In an expanding channel telegraph system wherein a plurality of subchannels when busy share the transmission time of a lane of traffic, a plurality of subscribers' stations having telegraph signal transmitters normally disconnected from said subchannels, means responsive to a calling signal from one of said stations for connecting the associated transmitter to one of said subchannels, means at said subscribers' stations to prevent transmission from a disconnected transmitter, and means responsive to the completion of said connection for rendering ineffective said transmission preventing means at the connected station.

46. In an expanding channel telegraph system wherein a plurality of subchannels when busy share the transmission time of a lane of traffic, a plurality of subscribers' stations having telegraph signal transmitters normally disconnected from said subchannels, means responsive to a calling signal from one of said stations for connecting the associated transmitter to one of said subchannels, means at said subscribers' stations to shunt the disconnected transmitters, and means controlled from a subchannel and effective upon the connection of the subchannel to the calling subscriber's station to remove said shunt at said station.

47. In an expanding channel telegraph system wherein a plurality of subchannels when busy share the transmission time of a lane of traffic, a plurality of subscribers' stations having telegraph signal transmitters normally disconnected from said subchannels, means responsive to a calling signal from one of said stations for connecting the associated transmitter to one of said subchannels, a unilaterally conducting circuit at each of said subscribers' stations, means controlled by said circuit when energized to render said transmitter ineffective, and means responsive to said connecting means to deenergize the unilaterally conducting circuit at the calling subscriber's station.

48. In an expanding channel telegraph system wherein a plurality of subchannels when busy share the transmission time of a lane of traffic, a plurality of subscribers' stations having telegraph signal transmitters normally disconnected from said subchannels, means responsive to a calling signal from one of said stations for connecting the associated transmitter to one of said subchannels, two parallel circuits at each of said subscribers' stations, a rectifier in each circuit poled to make said circuits alternately conductive depending upon the connection or disconnection to a subchannel of the associated subscriber's station, a relay in the circuit conductive when the subscriber's station is disconnected from a subchannel and operable to render said transmitter ineffective, and means responsive to said connecting means to reverse the polarity of potential applied to said circuits whereby said relay is rendered inoperative.

49. In an expanding channel telegraph system wherein switching signals are transmitted over a lane of traffic to control switching apparatus for the connection of a subscriber's receiving apparatus to one of a plurality of operative subchannels, means to automatically stop transmission over the lane of traffic, a relay associated with each of said subchannels and normally operated during the time of the operative condition of the associated subchannel, and means including an unoperated one of said relays associated with an operative subchannel for operating said transmission stopping means.

50. In an expanding channel telegraph system wherein switching signals are transmitted over a lane of traffic to control switching apparatus for the connection of a subscriber's receiving apparatus to one of a plurality of operative subchannels, means to automatically stop transmission over the lane of traffic, a relay associated with each of said subchannels and normally operable to connect the associated subchannel when operative to a subscriber's receiving apparatus, and means controlled by an unoperated one of said relays associated with an operative subchannel for operating said transmission stopping means.

51. In an expanding channel telegraph system wherein a lane of traffic is employed as the transmission medium for both intelligence and switching signals, the latter for the control of apparatus to connect a subscriber's receiving apparatus to any one of a plurality of subchannels, means to automatically stop transmission over the lane of traffic, a relay included in said connecting apparatus and normally operated to complete a circuit for intelligence signals from an operative one of said subchannels to the receiving apparatus of a subscriber, and means including an unoperated relay and controlled by said intelligence signals to operate said transmission stopping means.

52. In an expanding channel telegraph system wherein a lane of traffic is employed as the transmission medium for both intelligence and switching signals, the latter for the control of apparatus to connect a subscriber's receiving apparatus to any one of a plurality of subchannels, means to automatically stop transmission over the lane of traffic, a relay included in said connecting apparatus and having contacts when operated for transferring intelligence signals from an operative one of said subchannels to a subscriber's receiving apparatus, and means including the unoperated contacts of said relay for transferring intelligence signals from an operative subchannel to operate said transmission stopping means.

53. In a multichannel telegraph system wherein a plurality of communication subchannels share the transmission time of a lane of traffic, a plurality of subscribers' stations, switching means operable to connect any one of said subscribers' stations to any of said subchannels, an electrically operated character counter individual to each of said subscribers' stations, means associated with each of said subchannels for generating impulses corresponding in number to the received message characters, and means including said generating means to operate any of said character counters.

54. In a multichannel telegraph system wherein a plurality of communication subchannels share the transmission time of a lane of traffic, a plurality of subscribers' stations, switching means operable to connect any one of said subscribers' stations to any one of said subchannels, a character counter individual to each of said subscribers' stations and operable in a step-by-step manner in response to electrical impulses, means associated with each of said subchannels and operable cyclically in response to each received message character to generate a series of electrical impulses, and means including said switching means to impress a series of said impulses generated by any of said subchannel apparatus upon the counter of any of said subscribers' stations.

55. In a multichannel telegraph system wherein any one of a plurality of subscribers' stations may be connected to any one of a plurality of subchannels and wherein switching signals are transmitted over a lane of traffic representative of any of said connections to control receiving connecting apparatus, a plurality of groups of coding relays, a plurality of circuits one for each of said connections and energizable one at a time, means for separating each of said circuits into a plurality of branch circuits, similar ones of said branch circuits associated with different ones of said first mentioned circuits being connected in multiple to said groups of coding relays, a rectifier in each of said branch circuits, and means including said rectifiers to prevent a current feed-back from an energized to unenergized multipled branch circuit.

56. In a multichannel telegraph system wherein any one of a plurality of subscribers' stations may be connected to any one of a plurality of subchannels and wherein switching signals are transmitted over a lane of traffic representative of any of said connections to control receiving connecting apparatus, two groups of coding relays, a plurality of primary circuits one for each of said connections, two groups of secondary circuits each group being connected to operate one of said groups of coding relays in various combinations to generate said switching signals, connections from each of said primary circuits to one of said secondary circuits in each group, and a rectifier in each of said connections poled to prevent the energization of more than one secondary circuit in each of said groups.

OSCAR E. PIERSON.